US007761846B2

(12) United States Patent  
Hayles

(10) Patent No.: US 7,761,846 B2  
(45) Date of Patent: Jul. 20, 2010

(54) GRAPHICAL PROGRAMMING METHODS FOR GENERATION, CONTROL AND ROUTING OF DIGITAL PULSES

(75) Inventor: Timothy J. Hayles, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1016 days.

(21) Appl. No.: 11/463,210

(22) Filed: Aug. 8, 2006

(65) Prior Publication Data

US 2007/0044030 A1 Feb. 22, 2007

Related U.S. Application Data

(60) Provisional application No. 60/708,474, filed on Aug. 16, 2005.

(51) Int. Cl.  
*G06F 9/44* (2006.01)  
*G06F 3/048* (2006.01)
(52) U.S. Cl. .................. 717/109; 717/104; 717/105; 717/106; 717/140; 717/121; 715/763
(58) Field of Classification Search .................. 717/104, 717/105, 106, 109  
See application file for complete search history.

(56) References Cited

U.S. PATENT DOCUMENTS

| | | | |
|---|---|---|---|
| 4,796,179 A | 1/1989 | Lehman et al. |
| 4,831,580 A | 5/1989 | Yamada |
| 4,901,221 A | 2/1990 | Kodosky et al. |
| 5,089,973 A | 2/1992 | Furtek |
| 5,210,837 A | 5/1993 | Wiecek |
| 5,237,691 A | 8/1993 | Robinson |
| 5,481,712 A | 1/1996 | Silver et al. |
| 5,481,741 A | 1/1996 | McKaskle et al. |
| 5,576,946 A | 11/1996 | Bender et al. |
| 5,612,866 A | 3/1997 | Savanyo et al. |
| 5,617,327 A | 4/1997 | Duncan |

(Continued)

FOREIGN PATENT DOCUMENTS

EP 1077404 2/2001

OTHER PUBLICATIONS

Wan-Teh Chang, Soonhoi Ha, and Edward A. Lee; "Heterogeneous Simulation—Mixing Discrete-Event Models with Dataflow"; Journal of VLSI Signal Processing; 1997; pp. 127-144; The Netherlands.

(Continued)

*Primary Examiner*—Thomas K Pham  
(74) *Attorney, Agent, or Firm*—Meyertons Hood Kivlin Kowert & Goetzel, P.C.; Jeffrey C. Hood; Mark K. Brightwell

(57) ABSTRACT

A system and method for configuring a target hardware device. The system receives user input selecting instances of circuit-like primitives and instances of dataflow primitives. The user may wire the instances together using wires of various kinds to specify a graphical program. The wires are distinguished into types depending on whether or not they impose dataflow ordering dependencies and depending on the kind of data they are intended to carry. The circuit-like primitives may receive and/or generate digital signals to control the timing of processes or events such as A/D conversion, D/A conversion, digital input, digital output, pulse generation, etc. The circuit-like primitives and the dataflow primitives may communicate with each other through cast primitives and satellite nodes. Program code corresponding to the graphical program may be compiled to a format suitable for configuring a programmable hardware element or some other target device.

31 Claims, 36 Drawing Sheets

U.S. PATENT DOCUMENTS

| | | | |
|---|---|---|---|
| 5,732,277 A * | 3/1998 | Kodosky et al. | 717/125 |
| 5,742,504 A | 4/1998 | Meyer et al. | |
| 5,862,372 A | 1/1999 | Morris et al. | |
| 5,911,070 A | 6/1999 | Solton et al. | |
| 5,940,296 A | 8/1999 | Meyer | |
| 5,966,532 A | 10/1999 | McDonald et al. | |
| 6,053,951 A | 4/2000 | McDonald et al. | |
| 6,219,628 B1 * | 4/2001 | Kodosky et al. | 703/2 |
| 6,366,300 B1 | 4/2002 | Ohara | |
| 6,437,805 B1 | 8/2002 | Soojoodi et al. | |
| 6,453,464 B1 | 9/2002 | Sullivan et al. | |
| 6,802,053 B1 * | 10/2004 | Dye et al. | 717/113 |
| 6,865,429 B1 | 3/2005 | Schneider et al. | |
| 6,880,130 B2 | 4/2005 | Makowski et al. | |
| 6,934,668 B2 * | 8/2005 | Kodosky et al. | 703/2 |
| 6,954,724 B2 * | 10/2005 | Kodosky et al. | 703/2 |
| 6,961,686 B2 * | 11/2005 | Kodosky et al. | 703/2 |
| 7,000,190 B2 | 2/2006 | Kudukoli et al. | |
| 7,010,470 B2 * | 3/2006 | Kodosky et al. | 703/2 |
| 7,043,693 B2 | 5/2006 | Wenzel et al. | |
| 7,062,718 B2 | 6/2006 | Kodosky et al. | |
| 7,076,740 B2 | 7/2006 | Santori et al. | |
| 7,120,876 B2 | 10/2006 | Washington et al. | |
| 7,159,183 B1 | 1/2007 | Kudukoli et al. | |
| 7,200,838 B2 | 4/2007 | Kodosky et al. | |
| 7,210,117 B2 | 4/2007 | Kudukoli et al. | |
| 7,302,675 B2 | 11/2007 | Rogers et al. | |
| 7,340,684 B2 * | 3/2008 | Ramamoorthy et al. | 715/763 |
| 7,506,304 B2 * | 3/2009 | Morrow et al. | 717/109 |
| 2002/0129333 A1 | 9/2002 | Chandhoke et al. | |
| 2003/0034998 A1 | 2/2003 | Kodosky et al. | |
| 2003/0035006 A1 | 2/2003 | Kodosky et al. | |
| 2003/0037316 A1 | 2/2003 | Kodosky et al. | |
| 2003/0046663 A1 | 3/2003 | Rogers et al. | |
| 2003/0058280 A1 | 3/2003 | Molinari et al. | |
| 2003/0071842 A1 | 4/2003 | King et al. | |
| 2003/0071845 A1 | 4/2003 | King et al. | |
| 2004/0034696 A1 | 2/2004 | Joffrain et al. | |
| 2004/0034847 A1 | 2/2004 | Joffrain et al. | |
| 2004/0158812 A1 | 8/2004 | Dye et al. | |
| 2004/0210592 A1 | 10/2004 | Ciolfi | |
| 2004/0230946 A1 | 11/2004 | Makowski et al. | |
| 2005/0028138 A1 | 2/2005 | Case et al. | |
| 2005/0091602 A1 | 4/2005 | Ramamoorthy et al. | |
| 2005/0177816 A1 | 8/2005 | Kudukoli et al. | |
| 2005/0235290 A1 | 10/2005 | Jefferson et al. | |
| 2005/0251789 A1 | 11/2005 | Peck et al. | |
| 2005/0257195 A1 | 11/2005 | Morrow et al. | |
| 2005/0257197 A1 | 11/2005 | Herter et al. | |
| 2006/0225034 A1 | 10/2006 | Peck et al. | |
| 2007/0044030 A1 | 2/2007 | Hayles | |
| 2007/0044071 A1 | 2/2007 | Hayles | |

OTHER PUBLICATIONS

Joseph Buck, Soonhoi Ha, Edward A. Lee and David G. Messerschmitt; "Ptolemy: A Framework for Simulating and Prototyping Heterogeneous Systems"; International Journal in Computer Simulation; 1994; pp. 155-182; vol. 4, No. 2.

Hugo A. Andrade and Scott Kovner; "Software Synthesis from Dataflow Models for G and LabVIEW™"; Proc. IEEE Asilomar Conference on Signals, Systems, and Computers; Nov. 1998; pp. 1705-1709; vol. 2.

Loic Besnard, Patricia Bournai, Thierry Gautier, Nicolas Halbwachs, Simin Nadjm-Tehrani, and Annie Ressouche; "Design of a multi-formalism application and distribution in a data-flow context: an example"; 12th International Symposium on Languages for International Programming; Jun. 1999; pp. 8-30; Athens, Greece.

Stephen Anthony Edwards; "The Specification and Execution of Heterogeneous Synchronous Reactive Systems"; PhD Thesis; 1997; 170 pages; University of California, Berkeley; Retrieved from the Internet: http://ptolemy.eecs.berkeley.edu/papers/97/sedwardsThesis/sedwardsThesis.pdf.

International Search Report and Written Opinion for Application No. PCT/US2007/073265, mailed Apr. 28, 2008.

Pino, et al., "Cosimulating Synchronous DSP Designs with Analog RF Circuits", Hewlett Packard, 1999, 15 pages.

Altium Limited, "Altium Nexar release heads 'LiveDesign-enabled' 2004 products line-uo", Press Release, Feb. 17, 2004, 3 pages.

AXYS Design Automation, Inc., "Product Description for MaxCore", 2002, 2 pages.

AXYS Design Automation, Inc., "Product Description for MaxSim", 2002, 2 pages.

National Instruments, "The Measurement and Automation Catalog 2004", National Instruments, 2004, 3 pages.

The Mathworks, "Stateflow for State Diagram Modeling User's Guide", Version 4, 1997, 6 pages.

The Mathworks, "Simulink Model-Based and System-Based Design", Version 5, Jul. 2002, 598 pages.

Simulink, "Simulink Release Notes", Jun. 2, 2004, 78 pages.

Chandrachoodan, et al., "An Efficient Timing Model for Hardware Implementation of Multirate Dataflow Graphs", IEEE, 2001, pp. 1153-1156.

"Optilab: Image Processing and Analysis Software for the Apple Macintosh II User's Manual", GTFS Inc., 1990, 238 pages.

Rizzo, "Image Analyst and Enhance", MacUser, Jul. 1990, pp. 55-58.

Rosenthal, et al., "Integrated Approach to Machine Vision Application Development", SPIE vol. 1386, Nov. 8, 1990, pp. 158-162.

Villiger, et al., "Self-timed Ring for Globally-Asynchronous Locally-Synchronous Systems", Proceedings of the 9th International Symposium on Asynchronous Circuits and Systems, 2003, IEEE, pp. 1-10.

Automatix, "Vision for Process Feedback and Control", News Release, www.applefritter.com/macclones/automatix/newsrelease, Jul. 3, 2000, 4 pages.

"GUI Definition", www.whatis.com, http://searchvb.techtarget.com/sDefinition/0,290660,sid8_gci213989,000.html, retrieved May 14, 2007, 1 page.

Mort, et al., "Low Cost Image Analysis Workstation Which Is Menu Driven and Extensible", SPIE, vol. 1232, Feb. 4, 1990, pp. 380-389.

Signal Analytics, IPLab User's Guide, 1991, 268 pages.

Gitlow, "X-Ray Vision", MacGuide Magazine, vol. 2, Issue 4, Jun. 1989, pp. 89-94.

Ford, "Optimage Processes Scientific Images", 1994, 1 page.

Signal Analytics Corp., "Signal Analytics Bring Powerful Scientific Image Processing to the Macintosh II", News Release, Feb. 1, 1990, 2 pages.

Signal Analytics Corp., "IPLab: Serious Scientific Image Processing for the Macintosh II", 1992, 4 pages.

Signal Analytics Corp., "IPLab Gives You Unparalleled Value", 1992, 6 pages.

Signal Analytics Corp., "IPLab Brings Affordable Scientific Image Processing to the Macintosh II", estimated 1990, 2 pages.

Automatix, Inc., "A Seminar on Machine Vision & Image Analysis", 1993, 46 pages.

National Instruments, "Measurement and Automation Catalogue 1999", pp. 518-520.

"Ultimage and IPLab Spectrum", MacUser, Jul. 1991, 5 pages.

Magnusson, "State diagram generation", term paper in the graduate course Attribute Grammars, Lund University, Spring 1999, 21 pages.

Vasilache, et al., Translating OMT State Diagrams with Concurrency into SDL Diagrams, University of Tsukuba, Japan, Aug. 28-31, 2000, 7 pages.

"Graphical User Interface (GUI)", The Motive Web Design Glossary, www.motive.co.nz/glossary/gui.php, retrieved May 14, 2007, 2 pages.

National Instruments, "IMAQ Vision Builder Tutorial", Jan. 1999, 73 pages.

"Special Report: Imaging and the Macintosh/Robust Image Databases", Advanced Imaging, Apr. 1991, pp. 18-32.

Bhattacharyya, et al., "Synthesis of Embedded Software from Synchronous Dataflow Specification", Journal of VLSI Signal Processing, vol. 21, 1999, pp. 151-166.

Hunt, "IDF: A graphical dataflow programming language for image processing and computer vision", IEEE, 1990, retrieved from the IEEE database, Jan. 7, 2003, pp. 351-360.

Keddy, et al., "DEDIP: A User-friendly environment for digital image processing algorithm development", IEEE, 1991, retrieved from the IEEE database on Jan. 1, 2003, pp. 733-736.

Konstantinides, et al., "The Khoros Software Development Environment for Image and Signal Processing", 1992 retrieved from http://www.hpl.hp.com/techreports/92/HPL-92-96.pdf on Jan. 7, 2003, p. 1-14.

Sim, et al., "Design and Implementation of the Visual Programming Environment for the Distributed Image Processing", IEEE, 1996, retrieved from IEEE database on Jan. 7, 2003, pp. 149-152.

"Silma Products—Production Pilot", retrieved from Internet on May 24, 2001, www.adept.com/Silma/products/pd-productionpilot.html, 4 pages.

"RoboWorks", Newtonium, retrieved from Internet on Mar. 30, 2002, www.newtonium.com/public_html/Products/RoboWorks/RoboWorks.htm, 3 pages.

National Instruments, "The Measurement of Automation Catalog 2002", 19 pages.

Compumotor, "Motion Architect User Guide", Aug. 1994, 24 pages.

GE Fanuc, "GE Fanuc Automation—Software Solutions", 2002, 8 pages.

GE Industrial Systems, "CIMPLICITY Machine Edition—Motion Developer", Dec. 6, 2001, 4 pages.

GE Fanuc, "GE Fanuc Automation—CIMPLICITY Machine Edition", 2000, 4 pages.

"Motion Builder: Making Motion Control Programming Easy", Servo Catalogue, Parker Automation, undated, pp. 86-87.

Lee, Edwards A. et al, "Ptolemy II, Heterogeneous Concurrent Modeling and Design in Java", Jul. 29, 2004, http://ptolemy.eecs.berkeley.edu/papers/04/ptIIDesignIntro/ptIIdesign1-intro.pdf, 282 pages.

Lee, Edward A., Stephen Neuendorffer, "Actor-Oriented Design of Embedded Hardware and Software Systems", Journal of Circuits, Systems, and Computers, vol. 12, No. 3, World Scientific Publishing Company, 2003, 30 pages.

Lee, Edward A., "Embedded Software", Advances in Computers, vol. 56, Academic Press, London, 2002 34 pages.

Lee, Edward A., Stephen Neuendorffer, "Concurrent Models of Computation for Embedded Software", IEE Proc.-Comput. Digit. Tech., vol. 152, No. 2, Mar. 2005, 12 pages.

U.S. Appl. No. 11/759,991, titled "Diagram with Configurable Wires", filed Jun. 8, 2007, whose inventors are Jeffrey L. Kodosky, Jeffrey N. Correll, David W. Fuller III, Timothy J. Hayles, John R. Breyer, and Jacob Kornerup, 105 pages.

\* cited by examiner receive user input selecting a first graphical primitive having a signal output terminal and a data input terminal, where the first graphical primitive represents a first circuit entity that provides a first digital timing signal at the signal output terminal and receives data at the data input terminal
50

↓ generate first program code for the first graphical primitive, where the first program code is configured as a first loop which write values of the first digital timing signal to a first variable (e.g., a Boolean variable) corresponding to the signal output terminal
52

↓ receive user input connecting an output terminal of a dataflow primitive to the input terminal of a cast primitive with a first wire that imposes a dataflow ordering dependency
54

↓ receive user input connecting a data output terminal of the cast primitive to the data input terminal of the first graphical primitive with a second wire that does not impose a dataflow ordering dependency
56

↓ generate second program code for the cast primitive, where the second program code is configured to receive data from the dataflow node and write the data to a buffer corresponding to the second wire
58

↓ store a program including the first program code, the second program code and third program code corresponding to the dataflow primitive in a memory medium
60

*FIG. 1C*

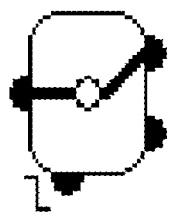    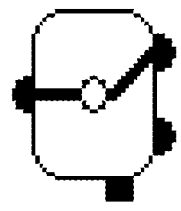    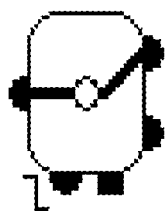
FIG. 18A    FIG. 18B    FIG. 18C
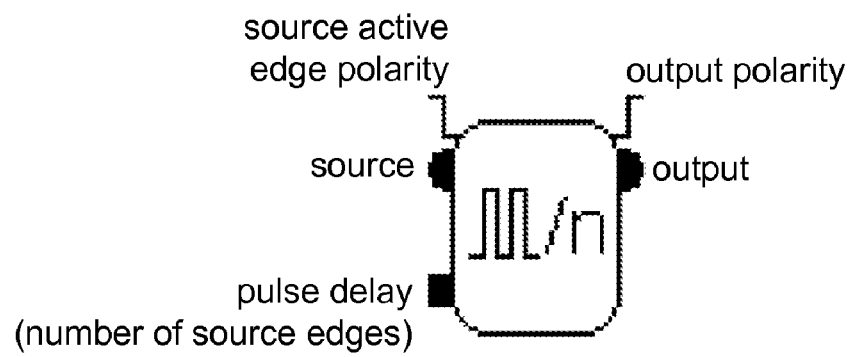
FIG. 19
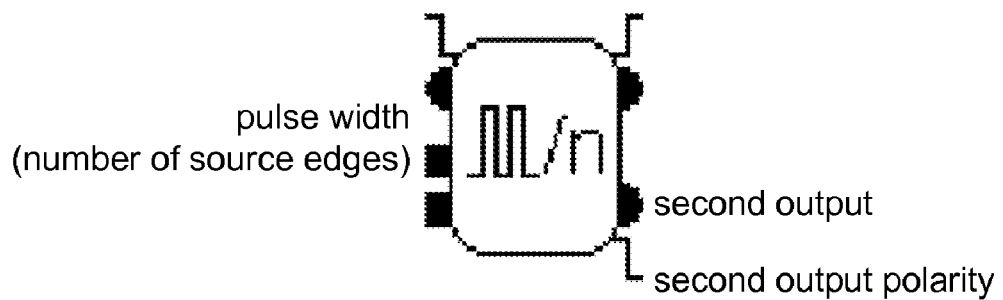
FIG. 20

Code in the False case from FIG. 23

Code in the False Case from FIG. 33

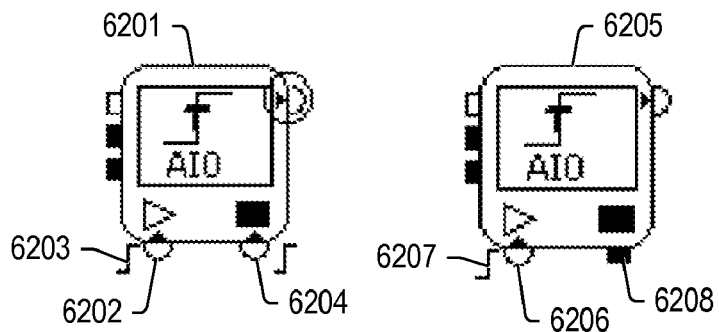
FIG. 62
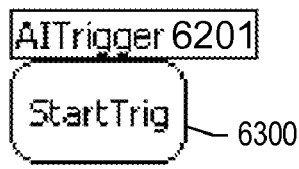
FIG. 63
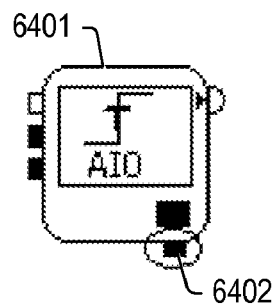 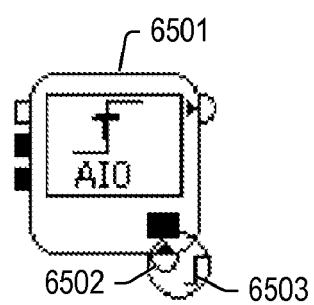
FIG. 64        FIG. 65
FIG. 66

GRAPHICAL PROGRAMMING METHODS FOR GENERATION, CONTROL AND ROUTING OF DIGITAL PULSES

PRIORITY DATA

This application claims priority to U.S. Provisional Application No. 60/708,474, filed on Aug. 16, 2005, entitled "Graphical Programming Methods for Generation, Control and Routing of Digital Pulses", invented by Timothy J. Hayles. This provisional application is hereby incorporated by reference in its entirety.

FIELD OF THE INVENTION

The present invention relates to the field of graphical programming, and more particularly to a system and method for enabling a graphical program to support the generation, control and routing of digital pulses in a hardware device.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

A large amount of research is currently being performed to enable graphical programs to be targeted to different platforms. For example, one area of research is the targeting of graphical programs to programmable hardware devices, such as FPGAs. Examples of efforts to target graphical programs to FPGAs include U.S. Pat. Nos. 6,219,628; 6,608,638; 6,584,601; 6,784,903; among others.

Some graphical program development environments that have been utilized for the creation of graphical programs targeted to programmable hardware devices utilize data flow semantics, i.e., are utilized for creation of data flow graphical programs. A graphical data flow program includes a diagram that includes a plurality of nodes connected by connections or "wires", where the connections indicate that data produced by one node is used by another node.

One example of data flow semantics is that the connections between the nodes indicate that data produced by one node is used by another node. Another example of data flow semantics is that the nodes of the data flow diagram operate such that the order of operations is implied by or controlled by data interdependencies among the nodes.

Another example of data flow semantics is that the nodes of the data flow diagram obey the following semantic principles:

the order of operations is not completely specified by the user;

the order of operations is implied by data interdependencies;

a node in the data flow diagram may execute after all necessary inputs have become available.

However, it would be desirable to provide an improved methodology for creating graphical programs that can be targeted to programmable hardware devices, especially graphical programs that are not necessarily constrained to data flow semantics.

SUMMARY

In one set of embodiments, a method for generating a program using a computer may involve:

receiving user input selecting a first graphical primitive having an output terminal, where the first graphical primitive represents a first circuit entity that provides a first digital timing signal at the output terminal;

generating first program code for the first graphical primitive, where the first program code is configured as a first loop which writes values of the first digital timing signal to a first variable (e.g., a Boolean variable) corresponding to the output terminal;

receiving user input selecting a second graphical primitive having an input terminal, where the second graphical primitive represents a second circuit entity that receives a second digital timing signal;

generating second program code for the second graphical primitive, where the second program code is configured as a second loop;

receiving user input connecting the output terminal of the first graphical primitive to the input terminal of the second graphical primitive with a first wire that does not impose a dataflow ordering dependency between the first program code and the second program code;

updating the second program code, in response to receiving said user input connecting the output terminal of the first graphical primitive to the input terminal of the second graphical primitive, so that the second loop is configured to read the second digital timing signal from the first variable, where the second loop is configured to iterate independently of the first loop; and storing a program including the first program code and the second program code in a memory medium.

In some embodiments, the computer may compile the program to generate programming information for a user-selected target device. For example, the computer may compile the program to generate programming information for a selected programmable hardware element (such as an FPGA), where the programming information is useable to configure the programmable hardware element to implement functionality defined by the program. As another example, the computer may compile the program to generate executable code for one or more processors on a target hardware device.

In some embodiments, the method may further involve: receiving user input connecting a data output terminal of the first graphical primitive or a data output terminal of the second graphical primitive to a data input terminal of a cast primitive with a second wire that does not impose a dataflow ordering dependency; receiving user input connecting an output of the cast primitive to a dataflow primitive with a third wire that does impose a dataflow ordering dependency; and generating third program code for the cast primitive, where the third program code is configured to read data from a buffer corresponding to the second wire and write the data to the third wire. The buffer may be a single-element buffer or a FIFO buffer.

In some embodiments, the method may further involve: receiving user input connecting an output terminal of a dataflow primitive to the input terminal of a cast primitive with a dataflow wire that imposes a dataflow ordering dependency; receiving user input connecting an output terminal of the cast primitive to a data input terminal of the first graphical primitive or a data input terminal of the second graphical primitive through a wire (call it wire W) that does not impose a dataflow ordering dependency; generating third program code for the cast primitive, where the third program code is configured to receive data from the dataflow primitive and write the data to a buffer corresponding to the wire W. The buffer may be a single-element buffer or a FIFO buffer.

In some embodiments, the second graphical primitive may also include an output terminal, where the second loop is also configured to use the second digital timing signal to determine a third digital signal and to write values of the third digital signal to a second variable corresponding to the output terminal of the second graphical primitive.

The first graphical primitive may represent a physical terminal (of a hardware device), a clock generator circuit, a pulse generator circuit, a counter circuit, a multiplexer, a demultiplexer, or any combination thereof.

The second graphical primitive may represent a physical terminal (of a hardware device), a pulse generator circuit, a counter circuit, a digital input circuit, a digital output circuit, an analog trigger circuit, an analog input circuit, an analog output circuit, a multiplexer, a demultiplexer, or any combination thereof.

In another set of embodiments, a method for generating a program using a computer may involve:

receiving user input selecting a first graphical primitive having a signal input terminal and a data output terminal, where the first graphical primitive represents a first circuit entity that receives a first digital timing signal at the signal input terminal and outputs data to the data output terminal;

generating first program code for the first graphical primitive, where the first program code is configured as a first loop which reads values of the first digital timing signal from a first variable (e.g., a Boolean variable) corresponding to the signal input terminal;

receiving user input connecting the data output terminal of the first graphical primitive to a data input terminal of a cast primitive with a first wire that does not impose a dataflow ordering dependency;

receiving user input connecting an output of the cast primitive to a dataflow primitive with a second wire that does impose a dataflow ordering dependency;

generating second program code for the cast primitive, where the second program code is configured to read from a buffer corresponding to the first wire and write to the second wire;

storing a program including the first program code, the second program code and program code corresponding to the dataflow primitive in a memory medium.

The computer may compile the program to generate programming information for a user-selected target device. For example, the program may be compiled to generate programming information for a programmable hardware element, where the programming information is useable to configure the programmable hardware element to implement functionality defined by the program. Alternatively, the program may be compiled to generate executable code for one or more processors on a target hardware device.

The buffer may be a single-element buffer or a FIFO buffer.

The first graphical primitive may represent an analog-to-digital (A/D) conversion circuit that captures samples of an analog signal, where the first digital timing signal is a conversion clock for the A/D conversion circuit, where the data outputted to the data output terminal are the samples of the analog signal.

Alternatively, the first graphical primitive may represent a digital input port that captures samples from a digital bus (including one or more lines), where the first digital timing signal is a clock for the digital input port, where the data outputted to the data output terminal are the samples from the digital bus.

As another alternative, the first graphical primitive may represent an edge counter circuit configured to count edges of the first digital timing signal, where the data outputted to the data output terminal are count values.

As yet another alternative, the first graphical primitive may represent an elapsed time counter configured to count a number of ticks of a base clock intervening between an active edge of a start trigger signal and an active edge of a stop trigger signal, where the first digital timing signal serves as the start trigger signal, the stop trigger signal, or both.

In yet another set of embodiments, a method for generating a program may involve:

receiving user input selecting a first graphical primitive having a signal output terminal and a data input terminal, where the first graphical primitive represents a first circuit entity that provides a first digital timing signal at the signal output terminal and receives data at the data input terminal;

generating first program code for the first graphical primitive, where the first program code is configured as a first loop which write values of the first digital timing signal to a first variable (e.g., a Boolean variable) corresponding to the signal output terminal;

receiving user input connecting an output terminal of a dataflow primitive to the input terminal of a cast primitive with a first wire that imposes a dataflow ordering dependency;

receiving user input connecting a data output terminal of the cast primitive to the data input terminal of the first graphical primitive with a second wire that does not impose a dataflow ordering dependency;

generating second program code for the cast primitive, where the second program code is configured to receive data from the dataflow node and write the data to a buffer corresponding to the second wire;

storing a program including the first program code, the second program code and third program code corresponding to the dataflow primitive in a memory medium.

The computer may compile the program to generate programming information for a user-selected target device. For example, the program may be compiled to generate programming information for a programmable hardware element, where the programming information is useable to configure the programmable hardware element to implement functionality defined by the program. Alternatively, the program may be compiled to generate executable code for one or more processors on a target hardware device.

The buffer may be a single-element buffer or a FIFO buffer.

The first graphical primitive may represent a pulse generator circuit, where the first digital timing signal is an output of the pulse generator circuit, where the data input terminal of the first graphical primitive is a pulse width terminal, a period terminal, a pulses-after-stop terminal, or a delay-after-start terminal.

Alternatively, the first graphical primitive may represent an analog trigger circuit for an analog input signal, where the data input terminal of the first graphical primitive defines a trigger parameter for the analog trigger circuit.

As yet another alternative, the first graphical primitive may represent a multiplexer, where the first digital timing signal is the output of the multiplexer, where the data input terminal is a source selection terminal for the multiplexer.

In some embodiments, a computer-readable memory medium is configured to store program instructions. The program instructions are executable to implement the method X, where method X is any of the method embodiments described herein (or any combination of the method embodiments described herein).

A memory medium is a medium configured for the storage of information. Examples of memory media include various kinds of magnetic media (e.g., magnetic tape, magnetic disk, magnetic strips, and magnetic film); various kinds of optical media (e.g., CD-ROM); various kinds of semiconductor RAM and ROM; various media based on the storage of electrical charge and/or other physical quantities; etc.

In some embodiments, a computer system may be configured to include a processor and a memory medium. The memory medium may be configured to store program instructions. The processor may be configured to read and execute the program instructions. The program instructions may be executable to implement method X, where method X is any of the various method embodiments described herein. The computer system may be realized in any of various forms. For example, the computer system may be a personal computer (in any of its various forms), a computer on a card, a server computer, a client computer, etc.

BRIEF DESCRIPTION OF THE DRAWINGS

A better understanding of the present invention can be obtained when the following detailed description of the preferred embodiment is considered in conjunction with the following drawings, in which:

FIG. 1C illustrates one set of embodiments of a method for generating a program using a computer.

FIGS. 18A-C illustrate three instance of a demultiplexer primitive.

FIG. 19 illustrates various input and output terminals of a pulse generator primitive.

FIG. 20 illustrates the pulse width input terminal and the alternate signal output of the pulse generator primitive.

FIG. 62 illustrates two instances of the analog trigger primitive, one configured to use start and stop triggers, the other configured to use a start trigger and a pulse count stop condition.

FIG. 63 illustrates a satellite node created for the start trigger input of the analog trigger primitive 6201.

FIG. 64 illustrates the stop count terminal of the analog trigger primitive.

FIG. 65 illustrates the stop trigger feature of the analog trigger primitive.

FIG. 66 illustrates a satellite node created for the stop trigger input of the analog trigger primitive 6601.

Figure 1A:
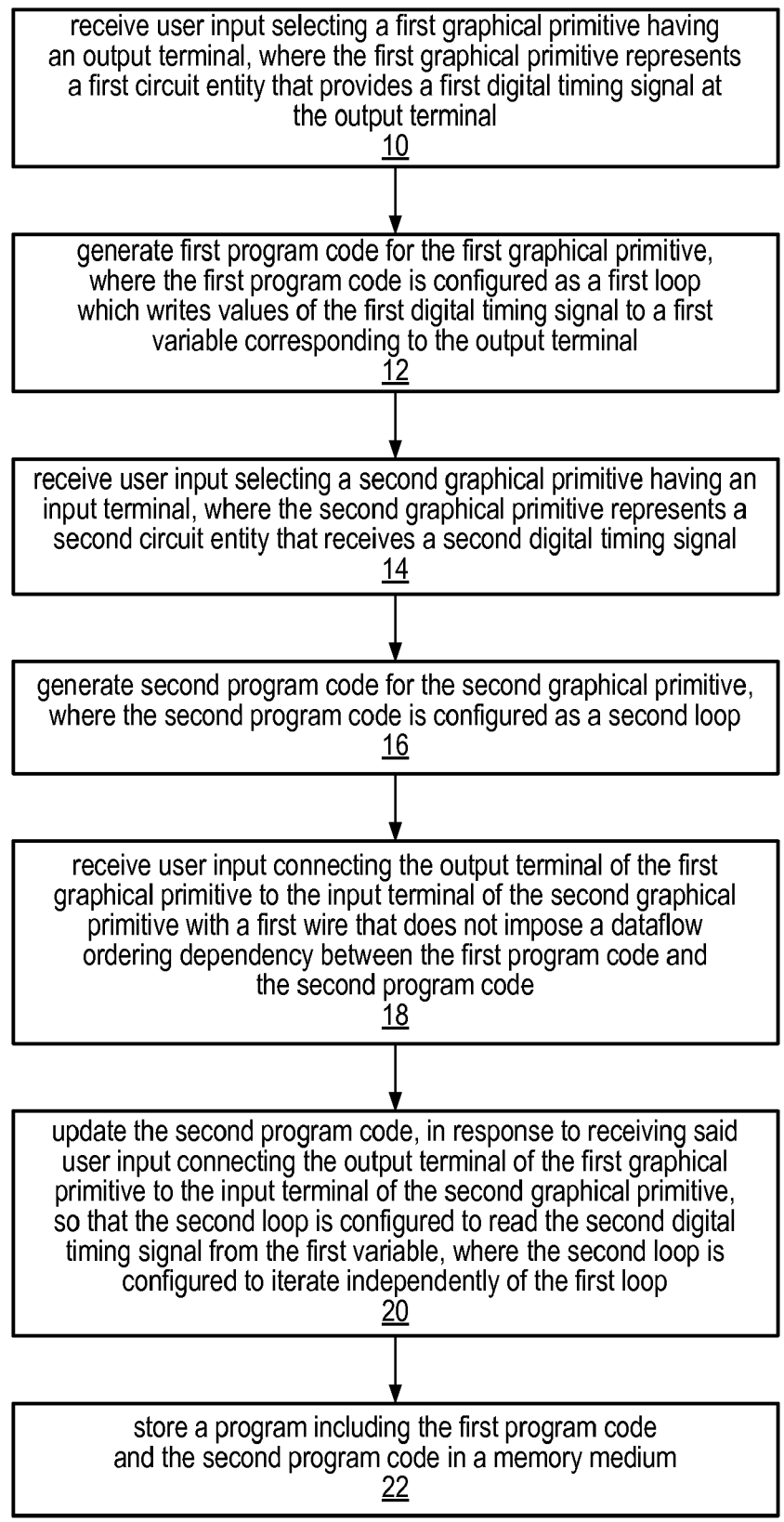
FIG. 1A illustrate one set of embodiments of a method for generating a program using a computer.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The following patents and patent applications are incorporated herein by reference in their entirety:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 11/462,393, filed on Aug. 4, 2006, entitled "Asynchronous Wires for Graphical Programming", invented by Kodosky and Kornerup.

In one set of embodiments, a method for generating a program using a computer may involve the following actions, as illustrated in FIG. 1A.

At 10, the computer may receive user input selecting a first graphical primitive having an output terminal. The first graphical primitive represents a first circuit entity that provides a first digital timing signal at the output terminal.

At 12, the computer may generate (automatically) first program code for the first graphical primitive, where the first program code is configured as a first loop which writes values of the first digital timing signal to a first variable (e.g., a Boolean variable) corresponding to the output terminal.

At 14, the computer may receive user input selecting a second graphical primitive having an input terminal. The second graphical primitive represents a second circuit entity that receives a second digital timing signal.

At 16, the computer may generate (automatically) second program code for the second graphical primitive. The second program code is configured as a second loop.

At 18, the computer may receive user input connecting the output terminal of the first graphical primitive to the input terminal of the second graphical primitive. The connection may be established with a first wire that does not impose a dataflow ordering dependency between the first program code and the second program code.

At 20, the computer may update the second program code in response to receiving said user input connecting the output terminal of the first graphical primitive to the input terminal of the second graphical primitive, so that the second loop is configured to read the second digital timing signal from the first variable. The second loop is configured to iterate independently of the first loop.

At 22, the computer may store a program including the first program code and the second program code in a memory medium.

In some embodiments, the computer may compile the program to generate programming information for a user-selected target device. For example, the computer may compile the program to generate programming information for a selected programmable hardware element (such as an FPGA), where the programming information is useable to configure the programmable hardware element to implement functionality defined by the program.

As another example, the computer may compile the program to generate executable code for one or more processors on a target hardware device.

In some embodiments, the method may further involve: receiving user input connecting a data output terminal of the first graphical primitive or a data output terminal of the second graphical primitive to a data input terminal of a cast primitive with a second wire that does not impose a dataflow ordering dependency; receiving user input connecting an output of the cast primitive to a dataflow primitive with a third wire that does impose a dataflow ordering dependency; and generating third program code for the cast primitive, where the third program code is configured to read data from a buffer corresponding to the second wire and write the data to the third wire. The buffer may be a single-element buffer or a FIFO buffer.

In some embodiments, the method may further involve: receiving user input connecting an output terminal of a dataflow primitive to the input terminal of a cast primitive with a dataflow wire that imposes a dataflow ordering dependency; receiving user input connecting an output terminal of the cast primitive to a data input terminal of the first graphical primitive or a data input terminal of the second graphical primitive through a wire (call it wire W) that does not impose a dataflow ordering dependency; generating third program code for the cast primitive, where the third program code is configured to receive data from the dataflow primitive and write the data to a buffer corresponding to the wire W. The buffer may be a single-element buffer or a FIFO buffer.

In some embodiments, the second graphical primitive may also include an output terminal, where the second loop is also configured to use the second digital timing signal to determine a third digital signal and to write values of the third digital signal to a second variable corresponding to the output terminal of the second graphical primitive.

The first graphical primitive may represent a physical terminal (of a hardware device), a clock generator circuit, a pulse generator circuit, a counter circuit, a multiplexer, a demultiplexer, or any combination thereof.

The second graphical primitive may represent a physical terminal (of a hardware device), a pulse generator circuit, a counter circuit, a digital input circuit, a digital output circuit, an analog trigger circuit, an analog input circuit, an analog output circuit, a multiplexer, a demultiplexer, or any combination thereof.

The first (second) program code is configured to realize the functionality of the first (second) circuit-entity. The first digital timing signal is represented as a stream of Boolean values. The second graphical primitive may interpret transitions in the Boolean stream (i.e., transitions from zero to one and transitions from one to zero) as edges of the digital timing signal. The second graphical primitive may be configured to respond to rising edges (i.e., transitions from zero to one), falling edges (i.e., transitions from one to zero), or all edges (i.e., transitions in either direction).

Figure 1B:
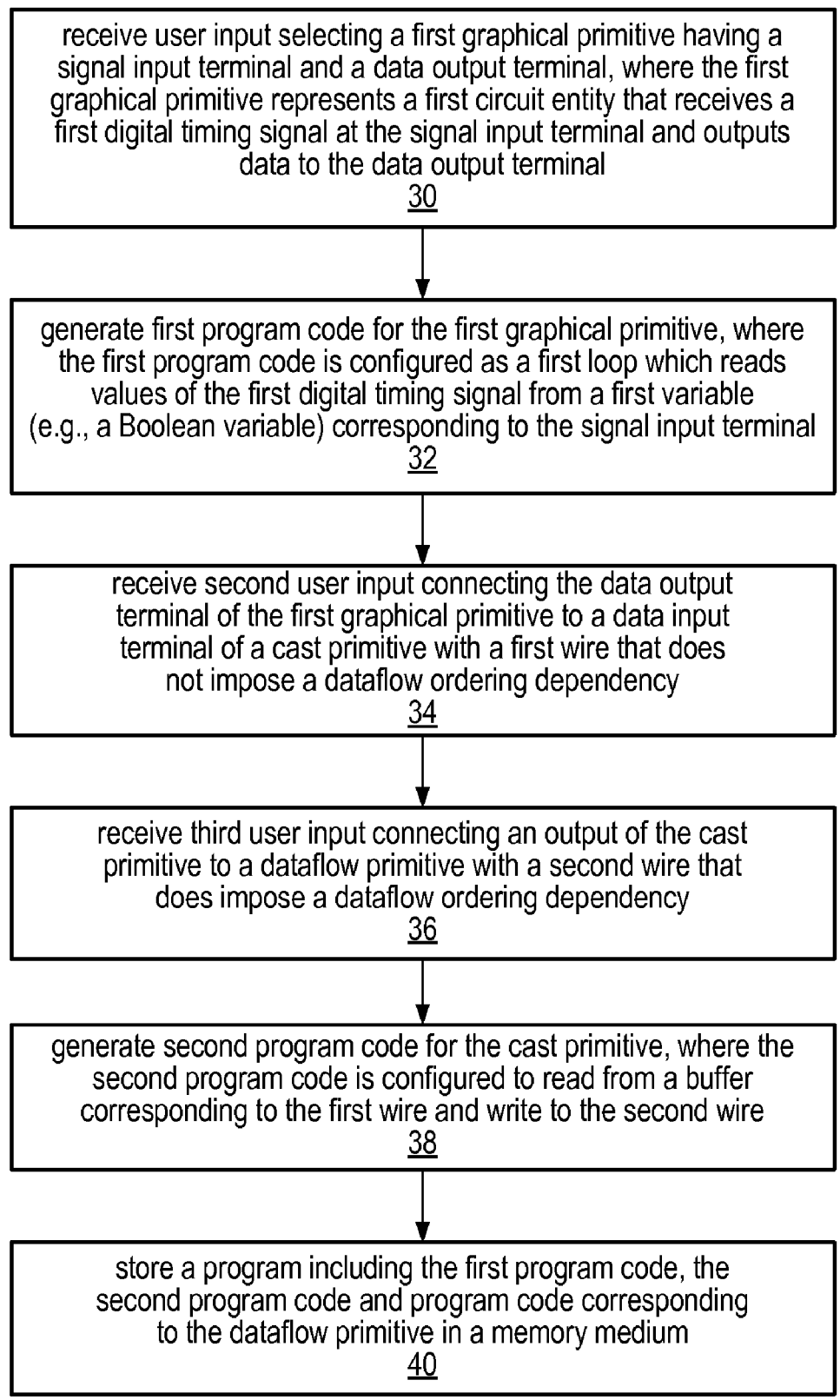
FIG. 1B illustrates one set of embodiments of a method for generating a program using a computer.

In another set of embodiments, a method for generating a program using a computer may involve the following actions, as illustrated in FIG. 1B.

At 30, the computer may receive user input selecting a first graphical primitive having a signal input terminal and a data output terminal. The first graphical primitive represents a first circuit entity that receives a first digital timing signal at the signal input terminal and outputs data to the data output terminal.

At 32, the computer may generate first program code for the first graphical primitive, where the first program code is configured as a first loop which reads values of the first digital timing signal from a first variable (e.g., a Boolean variable) corresponding to the signal input terminal.

At 34, the computer may receive user input connecting the data output terminal of the first graphical primitive to a data input terminal of a cast primitive with a first wire that does not impose a dataflow ordering dependency.

At 36, the computer may receive user input connecting an output of the cast primitive to a dataflow primitive with a second wire that does impose a dataflow ordering dependency.

At 38, the computer may generate second program code for the cast primitive, where the second program code is configured to read from a buffer corresponding to the first wire and write to the second wire.

At 40, the computer may store a program including the first program code, the second program code and program code corresponding to the dataflow primitive in a memory medium.

The computer may compile the program to generate programming information for a user-selected target device. For example, the program may be compiled to generate programming information for a programmable hardware element, where the programming information is useable to configure the programmable hardware element to implement functionality defined by the program. Alternatively, the program may be compiled to generate executable code for one or more processors on a target hardware device.

The buffer may be a single-element buffer or a FIFO buffer.

The first graphical primitive may represent an analog-to-digital (A/D) conversion circuit that captures samples of an analog signal, where the first digital timing signal is a conversion clock for the A/D conversion circuit, where the data outputted to the data output terminal are the samples of the analog signal.

Alternatively, the first graphical primitive may represent a digital input port that captures samples from a digital bus (including one or more lines), where the first digital timing signal is a clock for the digital input port, where the data outputted to the data output terminal are the samples from the digital bus.

As another alternative, the first graphical primitive may represent an edge counter circuit configured to count edges of the first digital timing signal, where the data outputted to the data output terminal are count values.

As yet another alternative, the first graphical primitive may represent an elapsed time counter configured to count a number of ticks of a base clock intervening between an active edge of a start trigger signal and an active edge of a stop trigger signal, where the first digital timing signal serves as the start trigger signal, the stop trigger signal, or both.

In yet another set of embodiments, a method for generating a program using a computer may involve the following actions, as illustrated in FIG. 1C.

At 50, the computer may receive user input selecting a first graphical primitive having a signal output terminal and a data input terminal, where the first graphical primitive represents a first circuit entity that provides a first digital timing signal at the signal output terminal and receives data at the data input terminal.

At 52, the computer may generate first program code for the first graphical primitive, where the first program code is configured as a first loop which write values of the first digital timing signal to a first variable (e.g., a Boolean variable) corresponding to the signal output terminal.

At 54, the computer may receive user input connecting an output terminal of a dataflow primitive to the input terminal of a cast primitive with a first wire that imposes a dataflow ordering dependency.

At 56, the computer may receive user input connecting a data output terminal of the cast primitive to the data input terminal of the first graphical primitive with a second wire that does not impose a dataflow ordering dependency.

At 58, the computer may generate second program code for the cast primitive, where the second program code is configured to receive data from the dataflow node and write the data to a buffer corresponding to the second wire.

At 60, the computer may store a program including the first program code, the second program code and third program code corresponding to the dataflow primitive in a memory medium.

The computer may compile the program to generate programming information for a user-selected target device. For example, the program may be compiled to generate programming information for a programmable hardware element, where the programming information is useable to configure the programmable hardware element to implement functionality defined by the program. Alternatively, the program may be compiled to generate executable code for one or more processors on a target hardware device.

The buffer may be a single-element buffer or a FIFO buffer.

The first graphical primitive may represent a pulse generator circuit, where the first digital timing signal is an output of the pulse generator circuit, where the data input terminal of the first graphical primitive is a pulse width terminal, a period terminal, a pulses-after-stop terminal, or a delay-after-start terminal.

Alternatively, the first graphical primitive may represent an analog trigger circuit for an analog input signal, where the data input terminal of the first graphical primitive defines a trigger parameter for the analog trigger circuit.

As yet another alternative, the first graphical primitive may represent a multiplexer, where the first digital timing signal is the output of the multiplexer, where the data input terminal is a source selection terminal for the multiplexer.

In some embodiments, a computer-readable memory medium is configured to store program instructions. The program instructions are executable to implement the method X, where method X is any of the method embodiments described herein (or any combination of the method embodiments described herein).

A memory medium is a medium configured for the storage of information. Examples of memory media include various kinds of magnetic media (e.g., magnetic tape, magnetic disk, magnetic strips, and magnetic film); various kinds of optical media (e.g., CD-ROM); various kinds of semiconductor RAM and ROM; various media based on the storage of electrical charge and/or other physical quantities; etc.

In some embodiments, a computer system may be configured to include a processor and a memory medium. The memory medium may be configured to store program instructions. The processor may be configured to read and execute the program instructions. The program instructions may be executable to implement method X, where method X is any of the various method embodiments described herein. The computer system may be realized in any of various forms. For example, the computer system may be a personal computer (in any of its various forms), a computer on a card, a server computer, a client computer, etc.

Figure 1D:
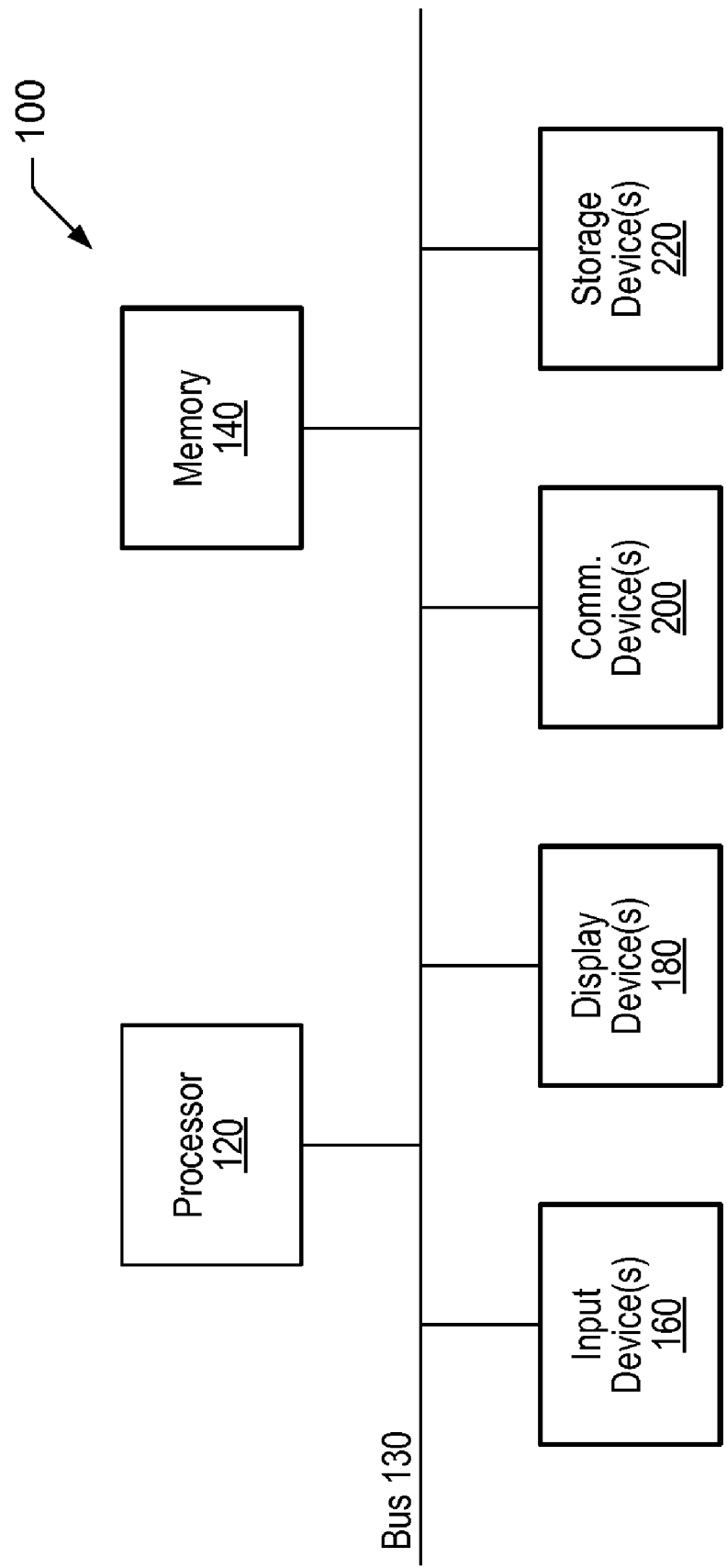
FIG. 1D illustrate one set of embodiments of a computer system.

In one set of embodiments, a computer system 100 may be configured with a processor 120 (or a set of processors), a system bus 130, memory 140, one or more input devices 160 and one or more display devices 180, e.g., as suggested in FIG. 1D. The processor 120 (or set of processors) may be realized by any of a wide variety of processor types provided by any of a wide variety of processor manufacturers. The memory 140 may include a combination of semiconductor RAM and ROM. The input devices 160 may be devices such as a keyboard, a mouse, a touch-sensitive pad and a data glove. The display devices 180 may be devices such as a monitor, a projector, a head-mounted display, etc.

In some embodiments, the computer system 100 may include (or couple to) one or more communication devices 200 such as a network interface card, a modem, a radio, a mobile phone, etc.

In some embodiments, the computer system may include (or couple to) one or more storage devices 220, e.g., devices such as hard disk drives, floppy disk drives, CD-ROM drives, DVD-ROM drive, magnetic tape drives, etc.

The computer system 100 may be equipped with operating system software to facilitate the execution of various user-desired processing tasks. The computer system may also be equipped with software that allows a user to build and execute graphical programs. Such software is referred to herein as a graphical program development environment. In one embodiment, the graphical program development environment includes LabVIEW and the LabVIEW FPGA add-on module.

The graphical program development environment (GPDE) is configured to build a graphical program in response to user inputs that are provided using the one or more input devices and to display the graphical program in a window on a display screen. The graphical program may be represented in the window as a set of icons that are interconnected by wires of different kinds. (The term "wire" and the term "connection" are used interchangeably herein.) Thus, the window may be referred to herein as a block diagram.

The user may select instances of graphical primitives (of various kinds) from one or more displayed palettes, drop the instances on the block diagram, and wire the instances together to specify a graphical program. Each of the graphical primitives may represent a different kind of processing operation. The set of graphical primitives provided by the GPDE may represent a rich diversity of processing operations so that user can freely realize any desired processing objective.

Some of the graphical primitives may be controls that represent user input to the graphical program. For example, controls include graphical user interface (GUI) elements such as buttons, switches, sliders, numeric input boxes (of various kinds). A wide variety of controls are contemplated. Furthermore, some of the graphical primitives may be indicators that represent program output to be displayed (or otherwise provided) to the user. For example, indicators include GUI elements such as numeric output fields, on/off indicators, graphs of various kinds, color indicators. Any of a wide variety of indicators are contemplated. The use of controls and indictors is familiar to uses of LabVIEW and LabVIEW FPGA.

The controls and the indicators may be displayed in the block diagram along with other graphical primitives as part of a graphical program. However, it may be convenient for the controls and indicators (or some subset of the controls and indicators) to also be displayed in a second window referred to herein as the "front panel".

The GPDE allows the user to compile a graphical program for "execution" on a target device (or a set of target devices). For example, a graphical program may be compiled into a form suitable for configuring (i.e., programming) a programmable hardware element (PHE) such as a field programmable gate array (FPGA). After configuration, the PHE is read to implement the functionality specified by the graphical program. As another example, the graphical program may be compiled into a form suitable for execution by a processor (or set of processors) embedded in a target device, e.g., a peripheral device coupled to the computer system. As yet another example, the graphical program may be translated into a set of configuration commands (e.g., register write commands) for one or more ASICs.

In the situation where a graphical program includes a user interface (e.g., user controls and/or indictors), the user interface portion of the graphical program may execute on the host computer and interact with the embedded portion (of the graphical program) that operates on the target device. For example, the user interface portion may receive input data provided by a user through one or more controls (e.g., in a front panel) and then invoke the transfer of the input data to the embedded portion. Furthermore, the embedded portion may send output data to the user interface portion and then the user interface portion may display (or otherwise present) the output data to the user through one or more indicators (e.g., in a front panel). Thus, the GPDE may operate on the graphical program to generate user-interface code (for execution on the host processor of the computer system) in addition to target code (for deployment on the target device) during the compilation process.

Figure 2:
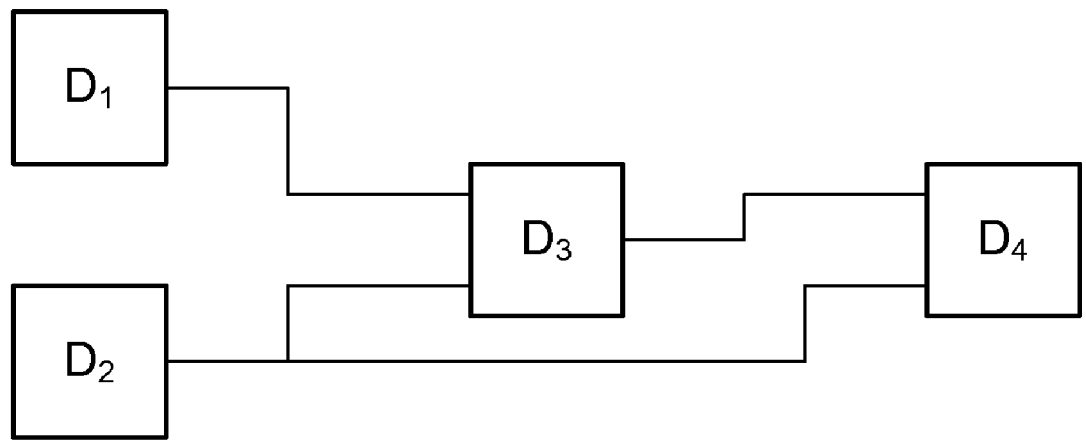
FIG. 2 illustrates the notion of dataflow ordering dependencies being imposed by dataflow connections between dataflow nodes.

The GPDE may provide a set $S_{BASE}$ of graphical primitives that respect dataflow semantics. The graphical primitives of the set $S_{BASE}$ are referred to herein as dataflow primitives. Dataflow primitives connect to each other through dataflow wires (also referred to herein as dataflow connections). The dataflow wires define data dependencies among the dataflow primitives. Thus, in the dataflow graphical program illustrated in FIG. 2, dataflow primitive $D_3$ would not execute before dataflow primitives $D_1$ and $D_2$ generate their respective output operands. Similarly, dataflow primitive $D_4$ would not execute until dataflow primitives $D_2$ and $D_3$ have generated their respective output operands.

In one embodiment, the set $S_{BASE}$ may include the set of graphical primitives supported by LabVIEW FPGA. In another embodiment, the set $S_{BASE}$ may include the set of graphical primitives supported by LabVIEW plus the set of graphical primitives supported by LabVIEW FPGA as it currently exists. LabVIEW and LabVIEW FPGA are software products sold by National Instruments.

Furthermore, the GPDE may provide a set $S_{CIR}$ of graphical primitives that represent circuit entities such as electrical terminals or functional blocks of circuitry. The primitives of the set $S_{CIR}$ may be referred to herein as "circuit-like primitives". Examples of circuit-like primitives include: pulse generators, multiplexers, demultiplexers, counters, analog-to-digital input primitives, digital-to-analog output primitives, digital input primitives, digital output primitives, input terminal primitives, and output terminal primitives.

A user may freely select instances of the circuit-like primitives and instances of the dataflow primitives and connect these instances together (using wires of different kinds) to specify a graphical program in the block diagram. For example, in some embodiments, the GPDE may allow a user to drag and drop instances of the circuit-like primitives and instances of the dataflow primitives from one or more palettes onto the block diagram and wire the instances together to specify a graphical program.

As described above, the dataflow primitives connect to each other through dataflow wires. In contrast, circuit-like primitives may connect to each other through wires of a different nature, in that they do not impose dataflow ordering dependencies between primitives. Such wires are referred to herein as "asynchronous wires". Asynchronous wires may also be used to establish connections between circuit-like primitives and dataflow primitives. Thus, the circuit-like portion and the dataflow portion of a graphical program can communicate with each other.

In some embodiments, the GPDE supports two different types of asynchronous wire: the asynchronous signal wire and the asynchronous data wire. The asynchronous signal wire is meant to represent a conductive pathway (i.e., signal paths) that carries a digital signal from a circuit-like primitive to another primitive. (In some embodiments, the destination primitive of the asynchronous signal wire must be a circuit-like primitive.) The asynchronous data wire allows the transfer of data to or from a circuit-like primitive.

Of course, there is no requirement that a graphical program must include both a circuit-like portion and a dataflow portion. The GPDE also allows the user to create graphical programs including only circuit-like primitives and graphical programs including only dataflow primitives.

The dataflow connections and asynchronous signal connections may be illustrated differently on the display, e.g., using different colors, densities, thicknesses or textures.

Furthermore, the asynchronous signal connections and the asynchronous data connection may be illustrated differently on the display.

The GPDE may include a set of scripting modules, i.e., one scripting module for each of the circuit-like primitives in the set $S_{CIR}$. Each of the scripting modules may be configured for execution on the host processor 120 of the computer system. In response to user inputs, the scripting module of a circuit-like primitive may (a) generate and modify the onscreen appearance of the circuit-like primitive and (b) generate and modify scripted code for the circuit-like primitive. The scripted code is the code that becomes part of the graphical program and realizes the functionality of the corresponding circuit-like primitive.

In some embodiments, the scripting modules may be written using a graphical programming language. For example, in some embodiments, the scripting modules may be realized as XNodes in LabVIEW. For more information on XNodes and their use in graphical programming, please refer to:

U.S. patent application Ser. No. 10/094,198, entitled "Self-Determining Behavior Node for Use in Creating a Graphical Program", invented by Kodosky, Gabbert and Rogers.

The scripted code for a circuit-like primitive may be graphical program code or text-based program code. The term "text-based program code" refers to program code that is written using lines of text. Examples of text-based code include C, C++, Fortran, Basic, Perl, and any of various assembly languages. In one embodiment, the scripted code may be graphical program code written in LabVIEW or LabVIEW FPGA.

In response to a user command, the graphical program (or the circuit-like portion of the graphical program) may be deployed onto a programmable hardware element. For example, the graphical program may be deployed onto an FPGA by: compiling the graphical program into VHDL (or some other hardware description language); compiling the VHDL into a bit stream for a target FPGA; and downloading the bit stream to the FPGA. The deployed graphical program may then be "executed" by enabling the FPGA.

The programmable hardware element may reside in a target device that includes other resources such as any combination of the following: A/D converters, D/A converters, digital input ports, digital output ports, clocks, memory, one or more processors, one or more ASICs, etc. The deployed circuit-like portion of the graphical program may generate one or more digital signals. The digital signals may be used in any of a variety of ways. For example, a digital signal may be directed to an A/D converter to control sampling times; directed to a D/A converter to control conversion times; directed to digital input port to control times of data reception from a source external to the target device; directed to a digital output port to control times of data transmission to a sink external to the target device; exported to a digital output terminal of the target device.

In some embodiments, the circuit-like portion and/or the dataflow portion of the graphical program may be deployed on a target other than a programmable hardware element. For example, the circuit-like portion may be deployed (i.e., implemented) by writing configuration registers in one or more ASICs of a hardware device (e.g., of a data acquisition device). If the hardware device includes an embedded processor, the circuit-like portion may be deployed by compiling the circuit-like portion into executable code and downloading the executable code to a memory of the hardware device for execution by the embedded processor. The dataflow portion of the graphical program may be deployed on the hardware device and/or on the host processor of the computer system.

The user may place instances of the circuit-like primitives in the block diagram and configure these instances in various ways. For example, the user may provide inputs to bind (i.e., associate) an instance of a digital pin primitive to: an external terminal of a hardware device. As another example, the user may provide inputs to specialize an instance of a multiplexer/demultiplexer primitive into a multiplexer node or a demultiplexer node, and, to configure functional features of the multiplexer node or demultiplexer node. As yet another example, the user may provide inputs to configure functional features of an instance of a pulse generator primitive, e.g., functional features such as a start trigger, a start delay, a pulse width count, and a stop trigger. (The pulse delay is the delay between successive output pulses of the pulse generator primitive.)

The size of a graphical program may be constrained by the capabilities of the target device. For example, if an FPGA is being targeted, the size of the graphical program may be constrained by the size of the FPGA. Furthermore, the number of instances of certain circuit-like primitives may be constrained by the circuit resources available in a target device. For example, the number of instances of the analog input primitive used in a graphical program may be limited by the number of A/D converters in the target device.

Figure 3:
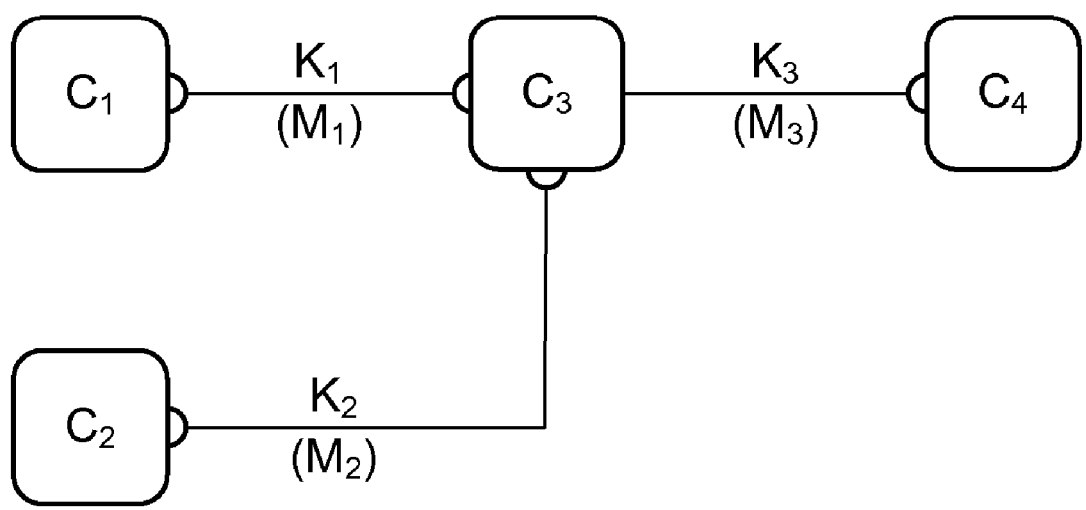
FIG. 3 illustrates a graphical program including circuit-like primitives connected by so-called asynchronous signal wires.

As noted above, the scripting module for each circuit-like primitive may generate and modify scripted code for the circuit-like primitive in response to user inputs. In some embodiments, the scripted code for each circuit-like primitive is configured as a loop structure (e.g., a while loop). When the graphical program is deployed on a target device, the loop structure for each circuit-like primitive behaves as follows. In each iteration of the loop structure, the internal logic of the loop structure may (a) read from registers corresponding to asynchronous signal connections that terminate on the circuit-like primitive and (b) write to registers corresponding to asynchronous signal connections that emanate from the circuit-like primitive. For example, in the circuit-like graphical program shown in FIG. 3, the loop structure corresponding to circuit-like primitive $C_1$ would write once per iteration to register $R_1$ corresponding to asynchronous signal connection $K_1$, and the loop structure corresponding to circuit-like primitive $C_2$ would write once per iteration to register $R_2$ corresponding to asynchronous signal connection $K_2$. The loop structure corresponding to circuit-like primitive $C_3$ would read once per iteration from registers $R_1$ and $R_2$ and write once per iteration to a register $R_3$ corresponding to asynchronous signal connection $K_3$. Each of the registers may be configured to store one bit. Thus, the values written into and read from each register may be interpreted as Boolean values (i.e., logical ones and zeros). Therefore, a circuit-like primitive receives a digital signal, represented as a stream of Boolean values, from each asynchronous signal wire that terminates on it, if any. Furthermore, a circuit-like primitive supplies a digital signal, represented as stream of Booleans, to each asynchronous signal wire that emanates from it, if any.

Each of the loop structures is configured to run freely, i.e., without regard to the operation of other primitives (e.g., other loop structures). For example, when the graphical program is compiled and deployed on a programmable hardware element, the loop structure for each circuit-like primitive may iterate at the rate of the master clock of the programmable hardware element. A loop structure may read from its supplying registers once per iteration without waiting for other loop structures to write to those registers. For example, circuit-like primitive $C_3$ may read from registers $R_1$ and $R_2$ once per iteration without regard for when circuit-like primitives $C_1$ and $C_2$ write to registers $R_1$ and $R_2$.

The digital pin primitive is a circuit-like primitive that represents either a source or a sink of a digital signal. In the source case, the pin primitive may receive a digital signal from a source specified by the user and supply the digital signal to one or more other circuit-like nodes. The source may be selected from a set of external data pins of the target hardware device. In the sink case, the pin primitive receives a digital signal from another circuit-like primitive and supplies the digital signal to a sink specified by the user. The sink may be selected from a set of external data pins of the target hardware device. The asynchronous signal terminal may appear on the right of the primitive's icon in the source case, and on the left in the sink case.

The directionality (source vs. sink) may be chosen after dropping the digital pin primitive onto the block diagram. Furthermore, the binding to an external data pin may be chosen after dropping.

In some circumstances, the user may wish to use a clock signal in his/her graphical program, e.g., a clock signal that is derivable from the base clock of the programmable hardware element. Thus, in one set of embodiments, the digital pin primitive may have the following additional behavior. In the source case, the user may be offered the option to select a clock rate from a set of supported clock rates (as an alternative to selecting one of the external data pins). In response to the selection of a clock rate, the pin primitive will be configured to receive the base clock signal and generate an output clock signal having the selected clock rate.

Figures 4, 5:
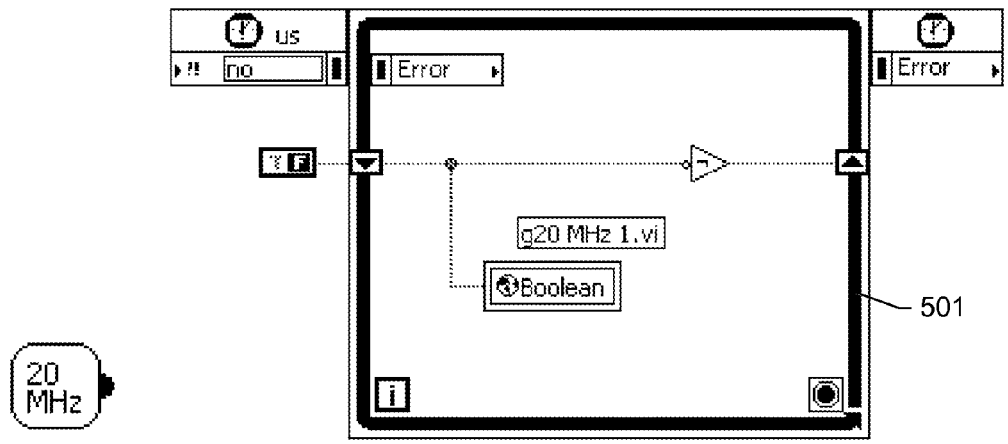
FIG. 4 illustrates an instance of a circuit-like primitive configured to generate a 20 MHz clock.
FIG. 5 illustrate one embodiment of scripted code corresponding to the primitive of FIG. 4.

The primitive illustrated in FIG. 4 is configured to supply a 20 MHz clock signal (with a duty cycle of 50% by default). The rate of 20 MHz has been selected by the user.

FIG. 5 illustrates scripted code for this pin primitive, written in LabVIEW FPGA, under the assumption that the base clock of the targeted FPGA runs at 40 MHz. The loop 501 is a timed loop, configured to iterate at the base clock rate, i.e., once every 25 nanoseconds. Each iteration of the loop writes the value of a Boolean variable to a memory location, toggles the value of the Boolean variable and stores it for use in the next iteration of the loop. This embodiment uses a LabVIEW global variable named "g20_MHz_1.vi" as the memory location. However, other embodiments of the memory location are contemplated.

For the sake of discussion, in some of the examples presented herein, the base clock of the programmable hardware element will be assumed to be a 40 MHz clock. However, one skilled in the art will understand that the inventive principles described herein are not constrained to any particular value of the base clock rate.

Figures 6, 7:
FIG. 6 illustrates a digital pin primitive configured to output a digital timing signal onto the DIO 1 pin.
FIG. 7 illustrates a graphical program that causes a 20 MHz clock signal to appear at the DIO 1 pin.

The sink-type pin primitive 601 in FIG. 6 will supply a digital signal (from the graphical program) to the DIO 1 pin. The DIO 1 pin has been selected by the user from a set of external pins of the target device.

The action of connecting the 20 MHz pin primitive to the DIO 1 pin primitive with an asynchronous signal path wire, as suggested in FIG. 7, induces transfer of the name of the memory location from the scripting code of the 20 Mz pin primitive to the scripting code of the DIO 1 pin primitive. Thus, the scripting code of the DIO 1 pin primitive can configure the scripted code of the DIO 1 pin primitive to read from that memory location.

From the user's point of view, the graphical program shown in FIG. 7 may be interpreted as follows. The 20 MHz pin primitive represents a circuit node within the target device where a 20 MHz clock signal is available. The DIO 1 pin primitive represents a physical pin of the target device. The thick line connecting them is meant to suggest a physical wire or trace that is transmitting the 20 MHz signal between the circuit node and the physical pin.

Figure 8:
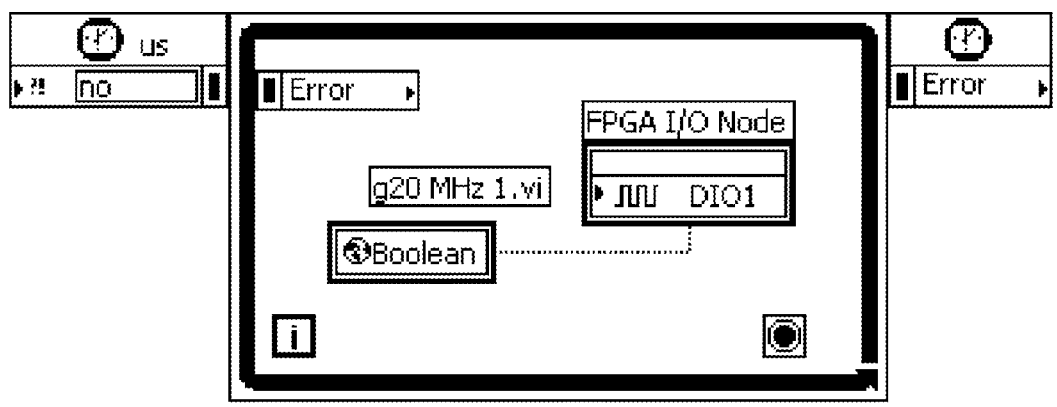
FIG. 8 is one embodiment of scripted code corresponding to the pin primitive of FIG. 6.

In one embodiment, the scripted code for the DIO 1 pin primitive may be realized as shown in FIG. 8. The loop in FIG. 8, also running at 40 MHz, reads the same memory location as that written to by the loop in FIG. 5. The data read from the memory location is then written to the physical DIO 1 pin using the FPGA I/O Node.

In response to a user command to execute the graphical program of FIG. 7, the scripted code of FIGS. 5 and 8 may be compiled to VHDL (or some other hardware description language) and the VHDL code may be compiled to generate a bitstream. The bitstream may be downloaded to an FPGA on the target device in order to configured the FPGA. When the configured FPGA is enabled, a 20 MHz digital signal appears on the DIO 1 pin of the targeted device. Any external device (outside the target device) listening to the DIO 1 terminal would sense the 20 MHz signal generated by the graphical program.

In one set of embodiments, the example given above may be implemented as follows:

1. The scripting code of the 20 MHz pin primitive instantiates a global variable that the corresponding scripted code will write its data to. This global variable has a name by which it is accessed.
2. The scripting code of the 20 MHz pin primitive names the output terminal of the 20 MHz pin primitive after the name of the global variable.
3. When a wire is connected from the 20 MHz pin primitive to the input terminal of the DIO 1 pin primitive, LabVIEW makes a function call into the scripting code of the DIO 1 pin primitive and gives it information including the name of the output terminal that is on the other end of the wire.
4. Using this name, the DIO 1 pin primitive instantiates an instance of the same global variable and configures the scripted code (of FIG. 8) to read from that global variable.

Figure 9B:
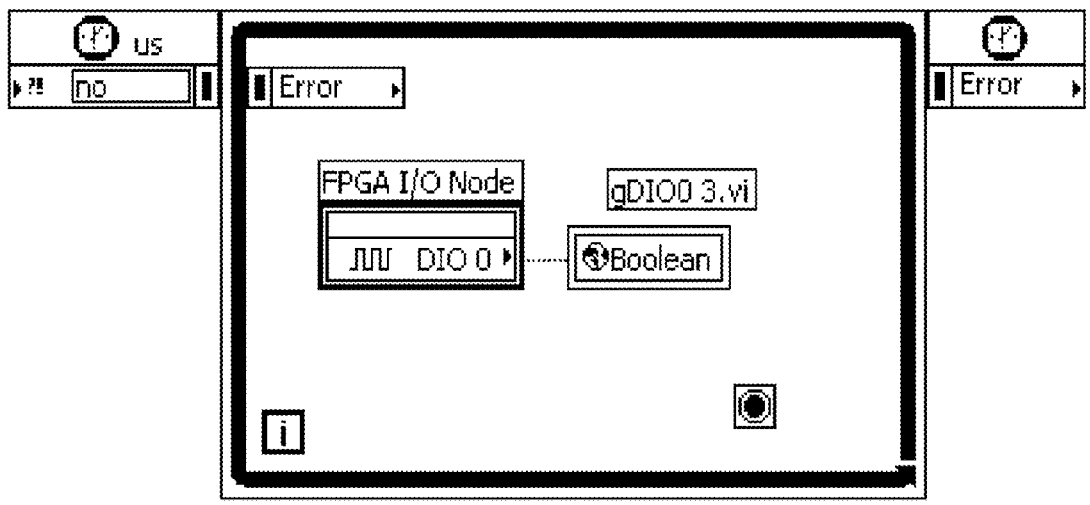
FIG. 9B illustrates one embodiment of scripted code corresponding to the digital pin primitive of FIG. 9A.
Figure 9A:
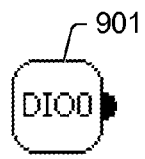
FIG. 9A is a digital pin primitive configured to input a digital timing signal from the DIO 0 pin.

The pin primitive 901 shown in FIG. 9A will supply the signal present at the DIO 0 pin of the target device to one or more other circuit-like primitives. In one embodiment, scripted code such as that shown in FIG. 9B will be generated for the pin primitive 901. The loop in FIG. 9B, also running at the FPGA base clock rate, uses the FPGA I/O Node to read from the device's DIO 0 pin and write the value obtained to a memory location (e.g., the memory location defined by the global named "gDIO0 3.vi"). A graphical program such as that in FIG. 10 will be executable to connect the DIO 0 pin to the DIO 1 pin, so that the digital signal present at the DIO 0 pin will forwarded to the DIO 1 pin (with some delay) via the shared memory location.

As described above, an asynchronous signal wire between a first primitive and a sink primitive may be realized using shared memory. When the graphical program is to be compiled and realized on an FPGA, one technique for implementing the asynchronous signal wire is to generate a memory location (i.e., a register) on the FPGA that is connected to the first primitive by a first physical wire (conductive pathway) and to the second primitive by a second physical wire (conductive pathway) in the FPGA. Another technique for implementing the asynchronous signal wire is to use a global variable as the shared memory.

In other embodiments, different devices may be targeted, requiring the compilation of the graphical program into different forms.

The multiplexer primitive is a circuit-like primitive used to select (e.g., dynamically select during run-time) one digital input signal from a set of digital input signals and to forward the selected signal to an output terminal. There are two selection methods. The first method provides random access selection from the set of digital input signals. The second method steps to the next digital input signal (e.g., in a round robin fashion) in response to active edges of a trigger signal.

The number of sources (i.e., digital inputs signals received by the multiplexer) may be increased or decreased by the user. Each source may be driven by a digital signal (e.g., a digital signal supplied by another circuit-like primitive), connected to a Boolean constant, or connected to a Boolean control. Sources may be numbered from top to bottom beginning at zero. If a source is removed from the set of sources, the remaining sources may be renumbered to maintain a gap-free consecutive order.

In the random access method of source selection, the multiplexer primitive selects the source that is indicated by the integer value received at a source select terminal of the multiplexer primitive. In the step trigger method of source selection, the multiplexer primitive is responsive to a trigger signal provided to a step trigger terminal of the multiplexer primitive. In particular, the multiplexer primitive advances to the next source in response to an active edge of the step trigger signal. A polarity control next to the step trigger terminal allows the user to determine whether the active edges of the step trigger signal are the rising edges, the falling edges, or all edges.

The user may configure the multiplexer primitive to use (a) the random access method, (b) the step trigger method, or (c) a combination of the random access method and the step trigger method.

In case (a), only the source select terminal may be present on the lower boundary of the multiplexer primitive. The multiplexer primitive selects a new source immediately upon receiving a different integer value at the source select terminal.

In case (b), only the step trigger terminal may be present on the lower boundary of the multiplexer primitive. The multiplexer primitive selects source (n+1) modulo N when the active edge of the trigger signal occurs, where N is the number of sources and n is the current source.

In case (c), both the source select terminal and the step trigger terminal may be present on the lower boundary of the multiplexer primitive. The multiplexer primitive does not change its selection state unless an active edge of trigger signal occurs, and then, only if the integer value at the step trigger terminal has changed.

The switch displayed on the multiplexer primitive may be clicked on to determine the initial source selection. However, if the random access selection method is enabled, the initial selection state will be determined by the initial integer value received from the source select terminal, and not the initial position of the switch.

A dataflow node may connect to the source select terminal and supply the integer selection index. Alternatively, the source select terminal may be "exposed" in a satellite node. The satellite node may be placed inside a loop structure and a dataflow node inside the loop structure may write to the satellite node to provide dynamic control of the integer selection index. As yet another alternative, a circuit-like nodes may connect to the source select terminal and supply the integer selection index.

Likewise the step trigger terminal may be exposed via a satellite node, or, by a circuit-like node.

Figure 11A:
FIGS. 11A-C illustrate three instances of the multiplexer primitive.
Figure 11B:
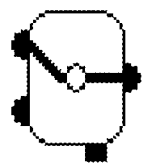
Figure 11C:

The FIGS. 11A-C show instances of the multiplexer primitive having two inputs.

Scripted code for the multiplexer primitive reads from a memory location dictated by the choice of source (from the set of sources) and writes that data to the memory location serving as the output. The step trigger method of choosing among the possible input signals is illustrated in FIG. 11A, where the primitive is configured to switch to the next input upon receiving a falling edge of the signal connected to the step trigger terminal which is illustrated as a semicircle on the bottom left of the primitive's icon.

The random access method for source selection is illustrated in FIG. 1B, where the number of the desired source is input to the source select input which is illustrated as a square at the bottom right of the primitive's icon.

FIG. 11C shows a primitive configured to use method (c), where the source named by the value supplied to the source select terminal is used upon receipt of a falling edge at the step trigger terminal.

Figure 12:
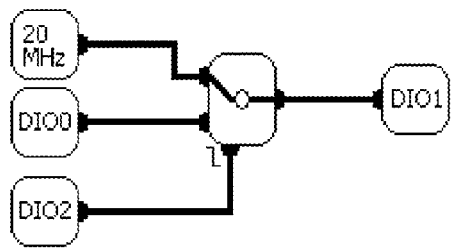
FIG. 12 illustrates a graphical program using a multiplexer primitive.

The graphical program in FIG. 12 is executable to use the signal present at the DIO 2 pin to choose between the 20 MHz clock signal or the signal present at the DIO 0 pin for routing to the DIO 1 pin. The 20 MHz clock primitive has scripted code as shown in FIG. 5. The DIO 0 and DIO 2 primitives each generate scripted code similar to that shown in FIG. 10.

Figure 13:
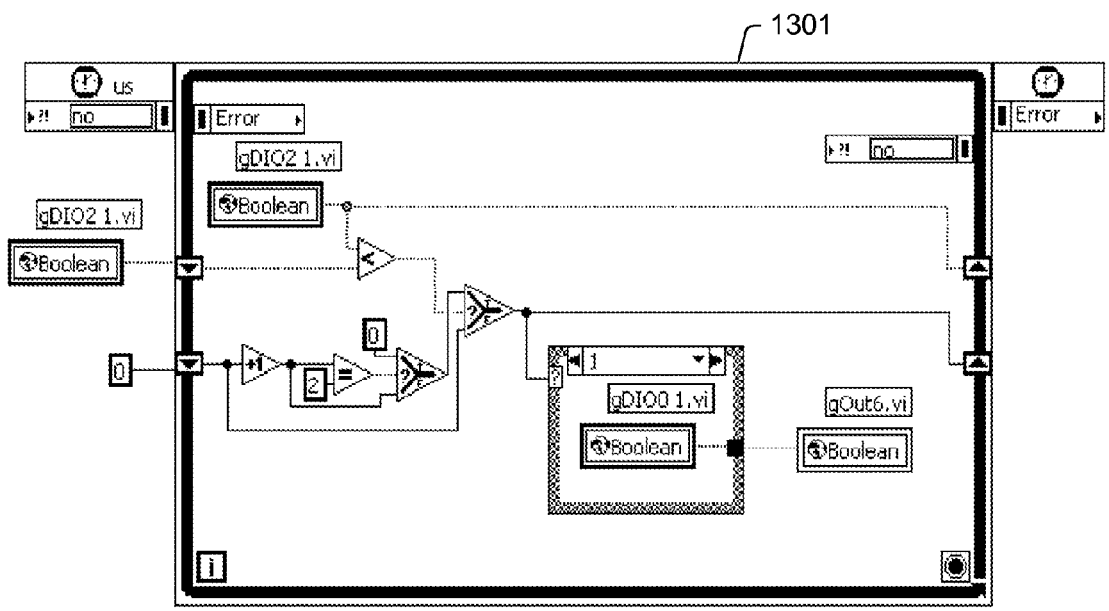
FIG. 13 illustrates one embodiment of scripted code for multiplexer primitive.
Figure 13B:
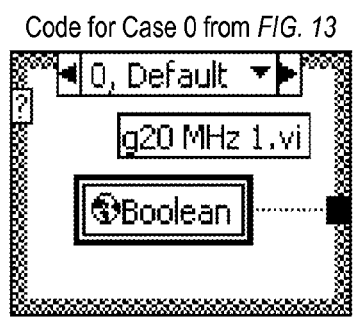
FIG. 13B illustrates "Case 0" for the scripted code of FIG. 13.

The multiplexer primitive generates scripted code as shown in FIG. 13. The loop 1301 is configured to read the Boolean data at the memory location named by the "gDIO2 1.vi" global. The DIO 2 primitive, connected to the step trigger terminal of the multiplexer, writes to this same global. When a falling edge is detected, the next index into the case structure is selected. If a falling edge is not detected, the same index is used. Inside the case structure, one of the "g20 MHz 1.vi" or the "gDIO0 1.vi" memory locations are read. These are the same memory locations written to by the 20 MHz and DIO 0 primitives connected to the source inputs of the multiplexer. Whichever is read, the resulting data is written to the gOut6.vi memory location. This is the memory location that will be read by the DIO 1 primitive connected to the output of the multiplexer.

The number of inputs may be increased by increasing the limit on the index calculation (set to 2 in FIG. 13) and by adding more cases to the case structure.

Figure 14:
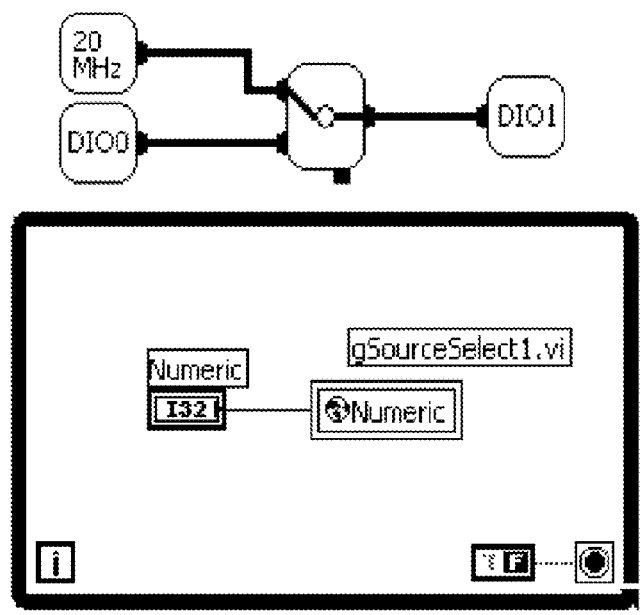
FIG. 14 illustrates a graphical program using the random access mode of selecting a multiplexer source.

Random Access Example: The program in FIG. 14 is executable to use the input to the gSourceSelect1.vi global memory location to choose between the 20 MHz signal or the signal present at the DIO 0 pin for routing to the DIO 1 pin. The gSourceSelect1.vi is the name of the memory location that the multiplexer is reading from to determine which of the two sources to select. The gSourceSelect1.vi global memory location icon is obtained by user interaction with the multiplexer primitive, such as by a right click on the primitive and selection of a menu item labeled "Create runtime Source Select control".

Figure 10:
FIG. 10 is a graphical program that forwards the signal present at the DIO 0 pin to the DIO 1 pin.
Figure 15:
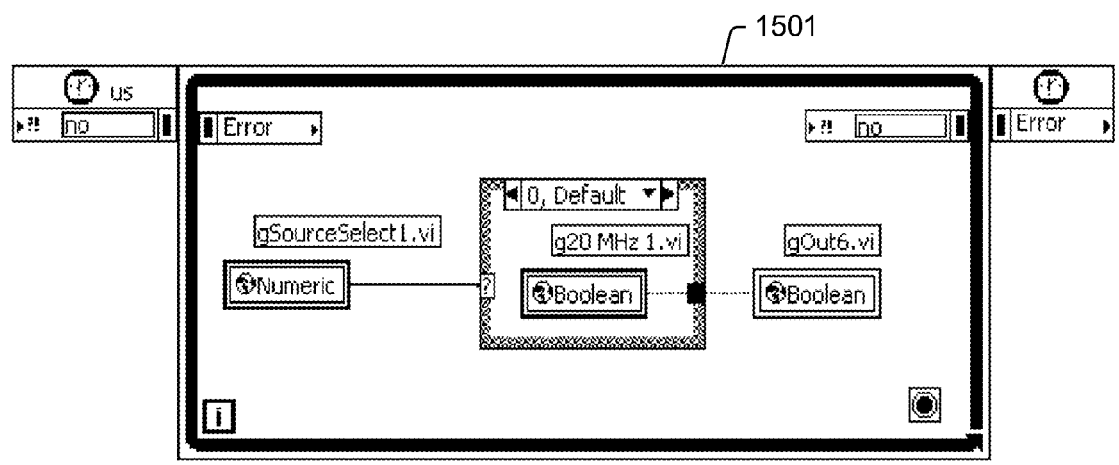
FIG. 15 is one embodiment of scripted code for the multiplexer of FIG. 14.

The 20 MHz clock generates scripted code as shown in FIG. 5. The DIO 0 and DIO 2 pins generate scripted code as shown in FIG. 10. The multiplexer primitive will generate scripted code as shown in FIG. 15.

The loop 1501 reads the data from the memory location labeled gSourceSelect1.vi and uses it as an index into the case structure to select from among the source inputs. Additional input choices are added by adding more cases to the case structure.

Figure 15A:
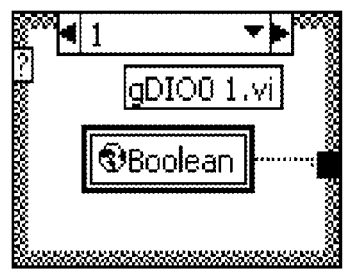
FIG. 15A illustrates "Case 0" for the scripted code of FIG. 15.
Figure 16:
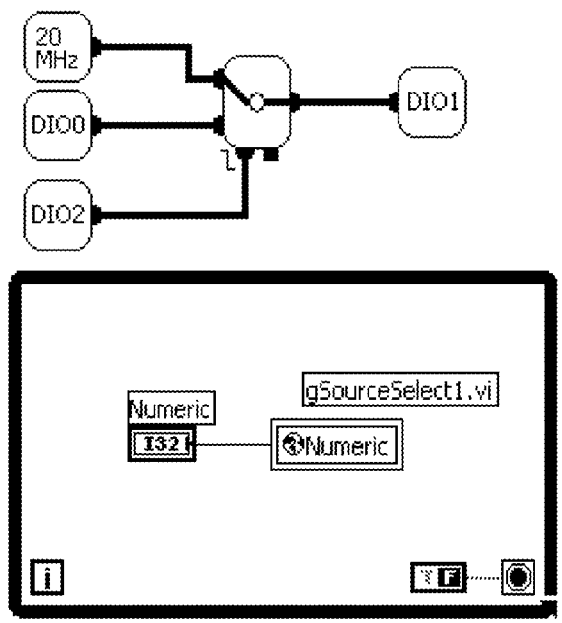
FIG. 16 is a multiplexing example that illustrates use of both triggering and random access source selection.
Figure 17:
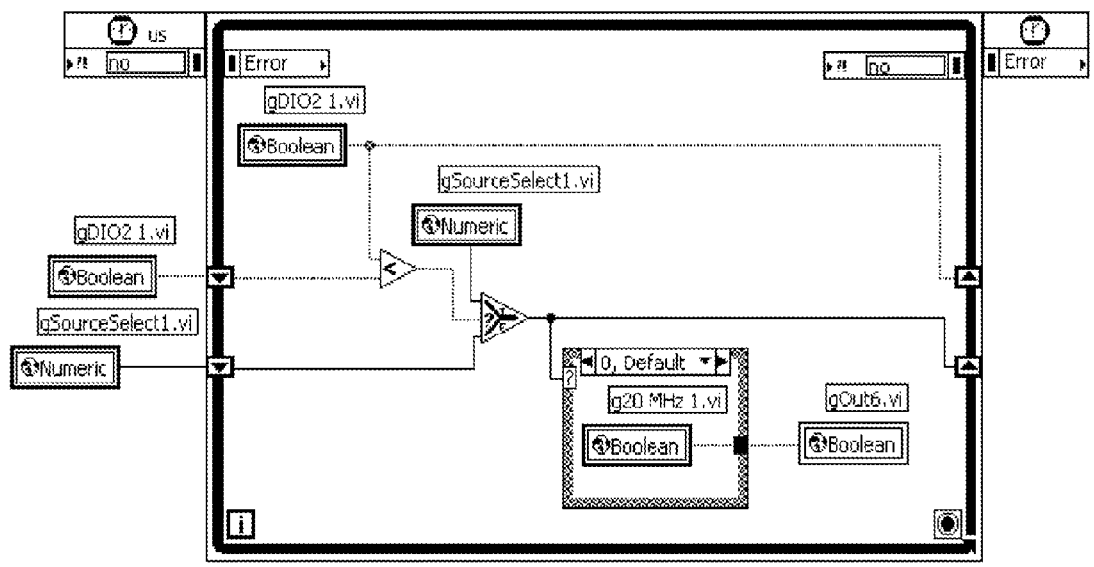
FIG. 17 illustrates one embodiment of scripted code for the multiplexer of FIG. 16.

Step Trigger in Conjunction with Source Select Example: The graphical program in FIG. 16 uses combination method (c) for source selection. In this case, the multiplexer primitive may generate the scripted code shown in FIG. 17. The code for case 1 of FIG. 17 is the same as that shown in FIG. 15A. When a falling edge is detected from reading the memory location named gDIO2 1.vi, the current value of the gSourceSelect1.vi memory location is used as the index for the case structure. This value from gSourceSelect1.vi is also stored for use in future iterations of the loop until a subsequent falling edge is detected, whereupon this process is repeated.

The demultiplexer primitive is a circuit-like primitive that has one input and a set of outputs. The demultiplexer primitive is used to routes the digital input signal present at the input to a selected one of the outputs. The demultiplexer primitive has functionality that mirrors the multiplexer primitive. As with the multiplexer primitive, the demultiplexer primitive may have a source select terminal and/or a step trigger terminal (with active edge polarity control). These terminals may be exposed upon user request (e.g., by right clicking on the demultiplexer primitive and selecting the corresponding feature from a drop down menu).

The FIGS. 18A-C show instances of the demultiplexer primitive where the number of outputs is two. However, it is noted that arbitrary numbers of outputs are supported.

The scripted code for the demultiplexer primitive may be similar the scripted code examples for the multiplexer. However, where the multiplexer reads from signal input (the sources), the demultiplexer writes to signal outputs (the sinks). Furthermore, where the multiplexer writes to a unique output, the demultiplexer reads from a unique input.

The pulse generator primitive is a circuit-like primitive used to generate a digital output signal including one or more pulses based on a source signal. The source signal may be a digital input signal (e.g., provided by another circuit-like primitive) or the base clock of the programmable hardware element (e.g., an FPGA).

FIG. 19 illustrate one instance of the pulse generator primitive. The source input on the left accepts a digital input signal which is to be operated on. If the pulse generator is based off an internal FPGA clock, the source input is hidden.

The source polarity control (e.g., glyph) is clickable to change the edge sensitivity with respect to the source signal. As shown, falling edges of the source signal will be counted.

If the pulse generator is based off an internal FPGA clock, the source polarity control is also hidden.

The pulse delay input is used to specify the number of source edges that are to be counted between successive pulses of the output signal. In the case where the source timing signal is periodic, the frequency of the signal at the output is equal to the frequency of the source signal divided by the value of the pulse delay. If the pulse generator is based off an internal FPGA clock, the units for the pulse delay are in ticks of the internal FPGA clock.

The output terminal is where the digital output signal is made available. The output polarity glyph is clickable to change the polarity of the output pulses. For the state of the polarity glyph shown in FIG. 19, the output pulses will be positive.

FIG. 20 illustrates additional features of the pulse generator primitive. The pulse width input specifies the number of edges of the source signal that are counted before an output pulse, once started, is concluded. Thus, the pulse width defines the width on the output pulse. When the output polarity control indicates positive (negative) output, the pulse width control determines the length of time the output remains in the positive (negative) state. When the pulse width control is absent, the pulse width may default to one.

The second output is either equal to or complementary to the first output, depending on the state of the second output polarity control.

While the pulse width feature and the second output features appear together in FIG. 20, the user may select one without the other, if he/she so desires.

Figure 21:
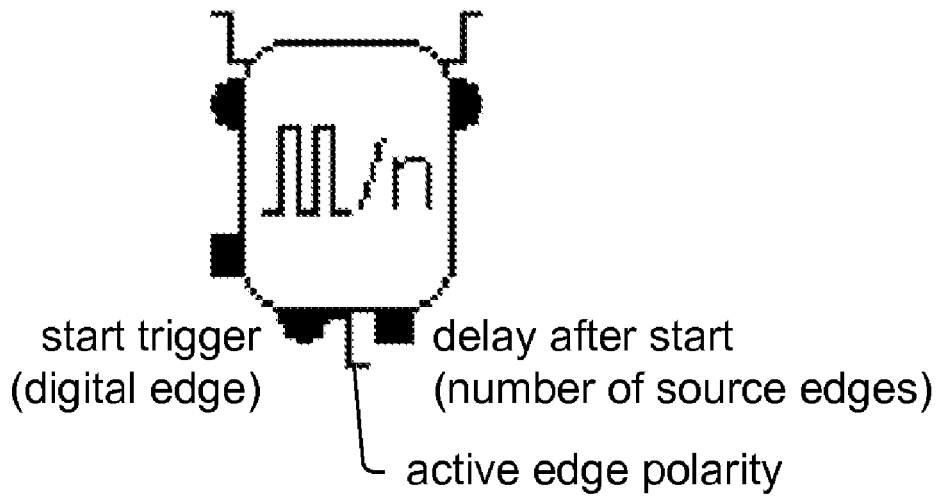
FIG. 21 illustrates start trigger and delay-after-start features of the pulse generator primitive.

FIG. 21 illustrates the start trigger and start delay features. The start trigger input enables control over the timing of the start of the pulse generation. When absent, the pulse generation begins when the graphical program begins execution. The active edge polarity glyph is clickable to change the edge sensitivity with respect to the start trigger. As shown, a falling edge at the start trigger input will begin the pulse generation.

The delay-after-start input enables creation of a delay between the arrival of the active edge at the start trigger and the beginning of the pulse generation. The delay-after-start input is applicable even in the absence of the start trigger input. Delay-after-start is specifies in number of clock ticks when the source is the base clock of the FPGA, or, number of source edges when source is a digital input signal.

Figure 22:
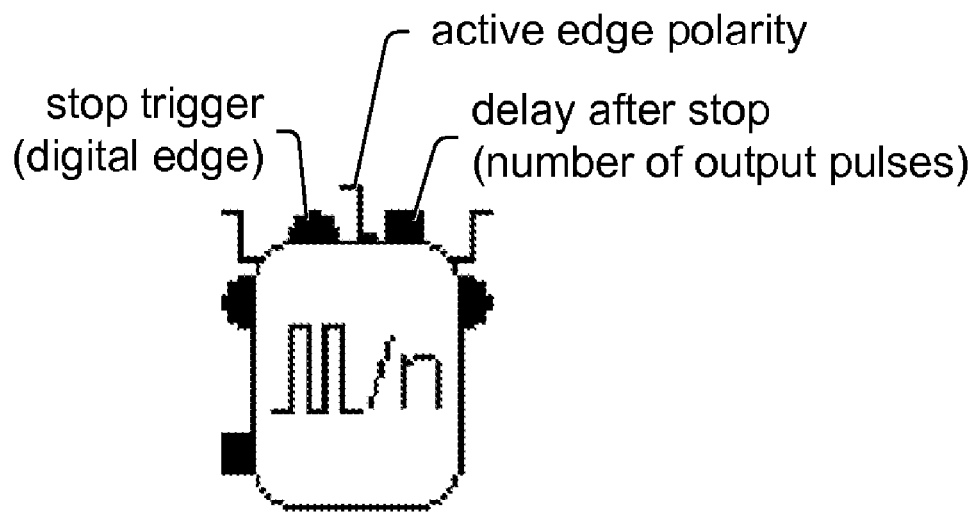
FIG. 22 illustrates stop trigger and delay-after-stop features of the pulse generator primitive.

FIG. 22 illustrates the stop trigger and delay-after-stop features. The stop trigger input enables control over the timing of halting the pulse generation. When absent, the pulse generation is continuous and may be configured to stop when the program stops or to continue until power is cycled to the hardware or the hardware is rebooted in some fashion. The active edge polarity glyph is clickable to change the edge sensitivity of the stop trigger. As shown, a falling edge at the stop trigger input will halt the pulse generation.

The delay-after-stop input is used to postpone stopping the pulse generation until some time after the proscribed edge appears at the stop trigger. This time is in units of pulses produced by the pulse generator. Thus a value of 100 for the delay-after-stop will result in an additional 100 pulses being produced after receiving the stop trigger before the pulse generation halts.

Figure 23:
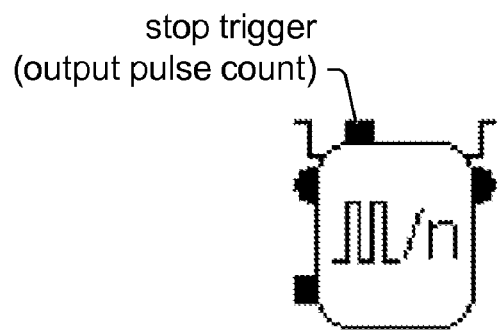
FIG. 23 illustrates an input for supplying an output pulse count to the pulse generator primitive.

FIG. 23 illustrates the pulse count feature. The pulse count input specifies the number of output pulses to be generated before the pulse generation halts. Specifying a value of 100 for the pulse count causes the pulse generator to produce exactly 100 pulses and then stop.

The user may configure the start trigger feature to be "retriggerable" in this sense: after the pulse generator stops generating pulses (for whatever reason), a next active edge on the start trigger may restart the pulse generation.

Figure 24:
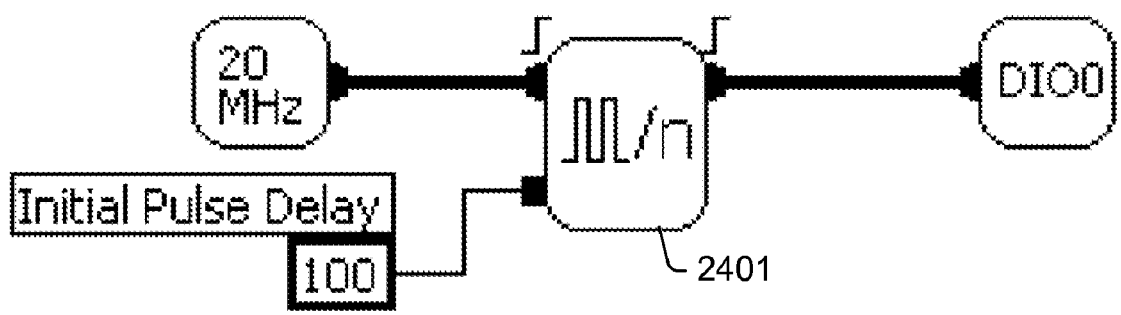
FIG. 24 is an example of pulse generator primitive in a graphical program.

Continuous Pulse Generation Example: The graphical program shown in FIG. 24 is executable to produce one pulse at the DIO 0 pin for every 100 rising edges received from the 20 MHz clock primitive. The middle node 2401 is a pulse generator primitive.

Figure 25:
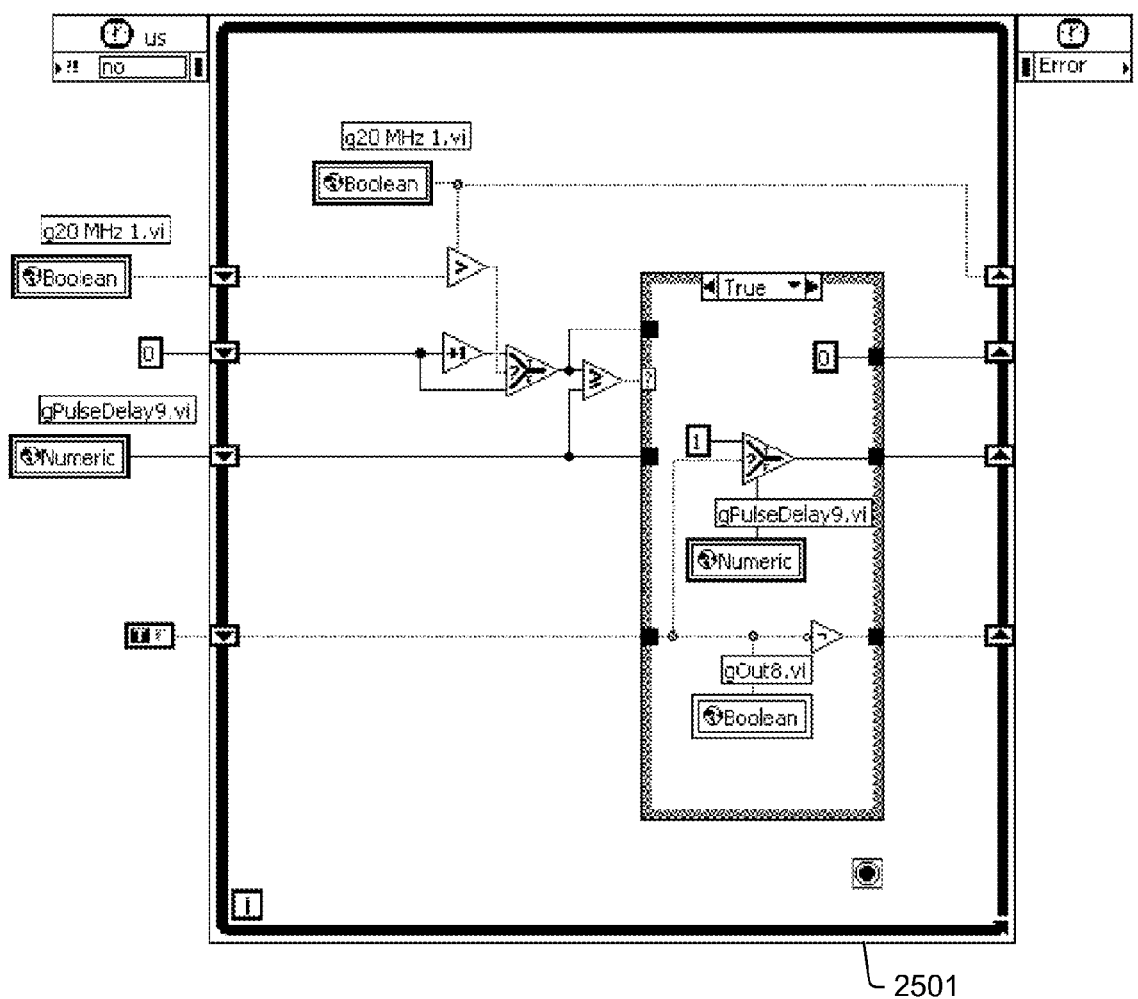
FIG. 25 is one embodiment of scripted code for the pulse generator of FIG. 24.

FIG. 25 illustrates scripted code for the pulse generator primitive 2401. The loop 2501 monitors the data at memory location g20 MHz 1.vi (where the 20 MHz primitive is writing its data). When a rising edge is detected it is counted. The cumulative count is compared with the stored value read from the gPulseDelay9.vi memory location (where the initial pulse delay value of 100 from FIG. 24 was written to). When the number of counted rising edges reaches this value, the code inside the case structure executes, resulting in the following actions:

1. The current Boolean value is written to gOut8.vi (which will be read by the DIO 0 primitive in FIG. 24).
2. The Boolean value is toggled and stored for the next time this case executes.
3. The next value for the number of edges to count is fetched and stored. This will be either a 1 for the default pulse width or the current value of the data at memory location gPulseDelay9.vi.
4. The cumulative count is reset to 0.

Figure 26:
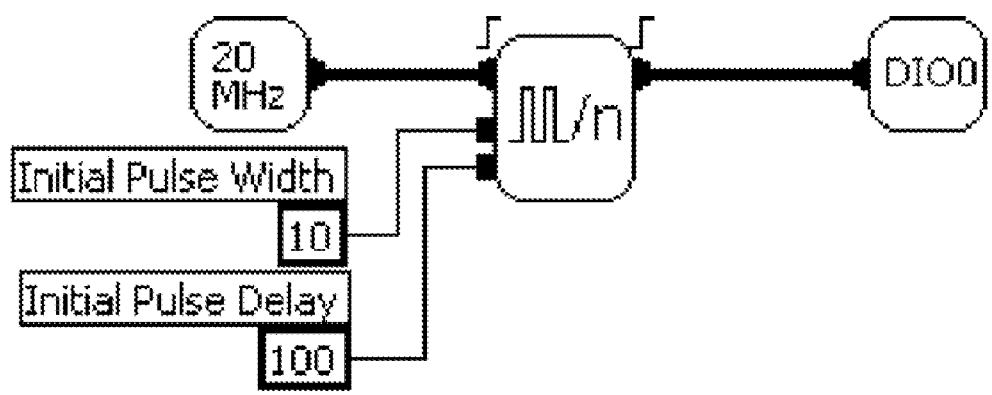
FIG. 26 is a graphical program using the pulse width and pulse delay features of the pulse generator.
Figure 27:
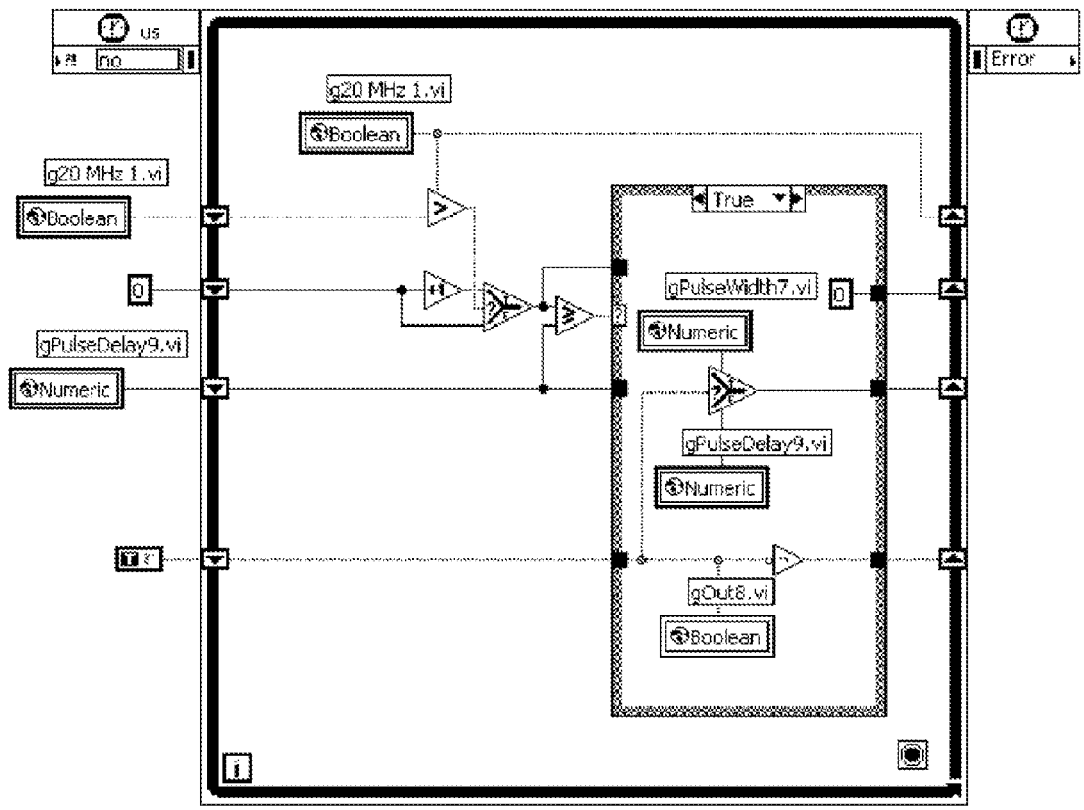
FIG. 27 is one embodiment of scripted code for the pulse generator of FIG. 26.

Continuous Square Wave Generation Example: The graphical program in FIG. 26 is executable to produce one pulse at the DIO 0 pin each time 100 rising edges of the signal produced by the 20 MHz clock primitive are counted. Each pulse thus produced at the DIO 0 pin will last until 10 rising edges of the signal produced by the 20 MHz clock primitive are counted. The pulse generator primitive shown in FIG. 26 may be realized by the scripted code shown in FIG. 27. This scripted code is identical to that of FIG. 25 with the exception that the 1 in the case structure of FIG. 25, that represented the default pulse width is here (in FIG. 27) replaced with a read of the gPulseWidth7.vi memory location. This is the memory location written to by the Initial Pulse Width control of FIG. 26.

Figure 25A:
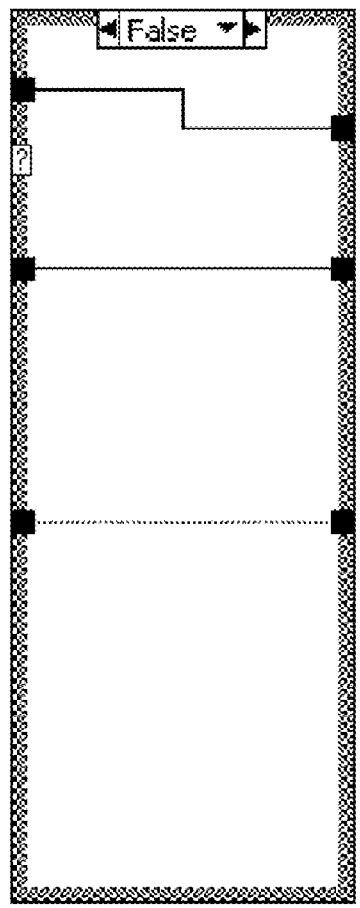
FIG. 25A illustrates the False case from FIG. 23.
Figure 28:
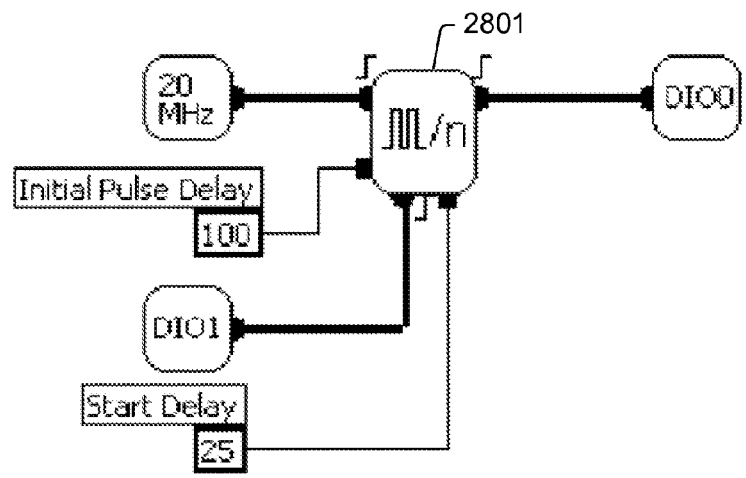
FIG. 28 is a graphical program illustrating the pulse delay, start trigger and start delay features of the pulse generator primitive.
Figure 29A:
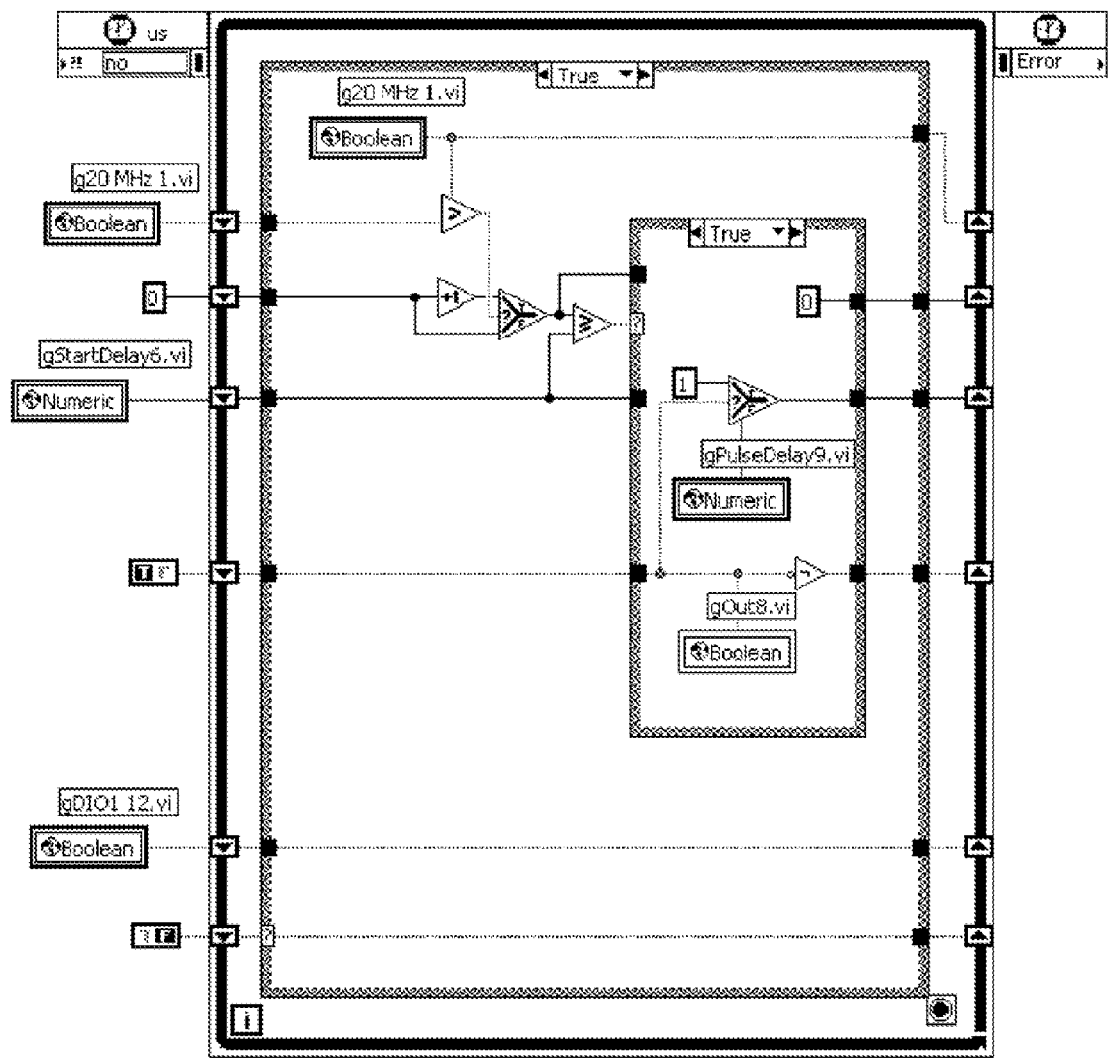
FIG. 29A is one embodiment of scripted code for the pulse generator of FIG. 28.
Figure 29B:
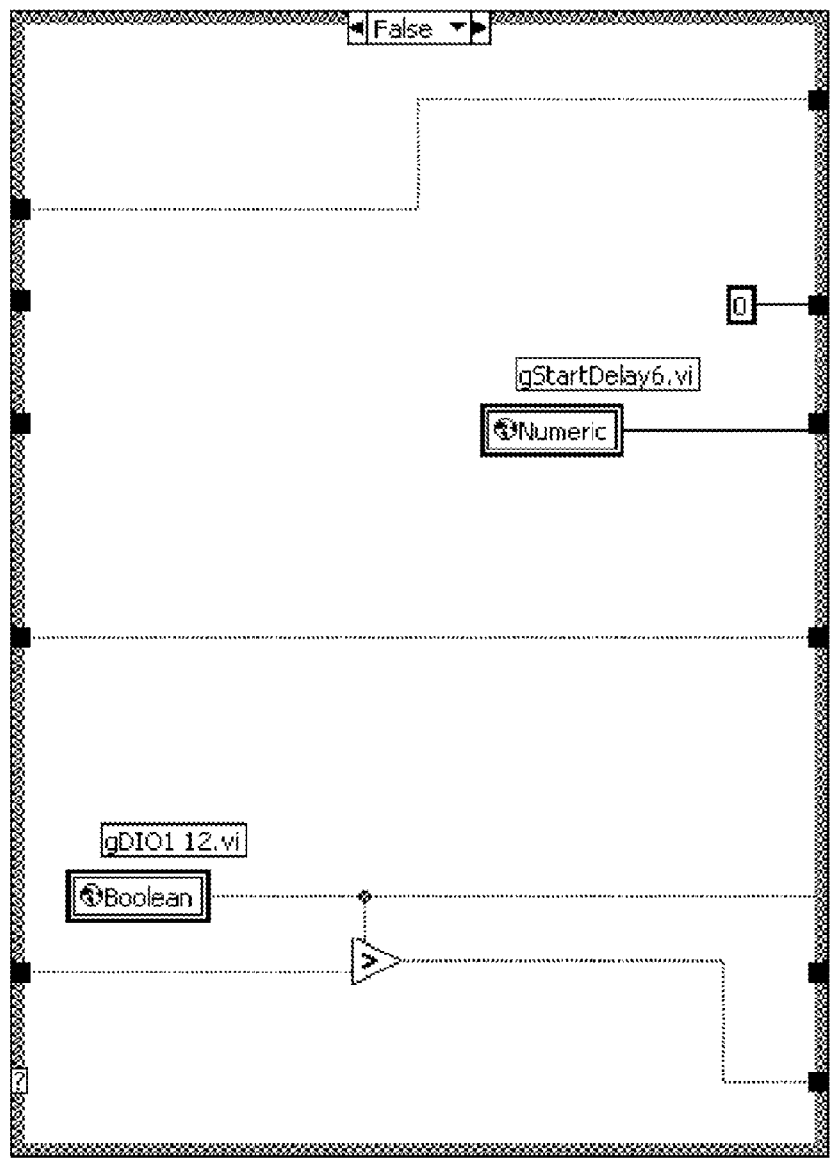
FIG. 29B illustrates the False Case of the outer Case structure in FIG. 29A.

Continuous Pulse Generation with Start Trigger and Delay Example: The graphical program in FIG. 28 is executable to produce one pulse at the DIO 0 pin each time 100 rising edges of the signal produced by the 20 MHz clock are counted. These pulses will not begin until a rising edge from the DIO 1 pin occurs. Once a rising edge from the DIO 1 pin occurs, 25 rising edges of the signal from the 20 MHz clock will be counted before the pulse generation to DIO 0 pin will begin. FIGS. 29A and 29B illustrate scripted code for the pulse generator primitive 2801 of FIG. 28. The code for the False case of the inner case structure of FIG. 29A may be identical (or similar) to that of FIG. 25A.

With the exception of the additional surrounding case structure, the code in FIG. 29A is identical to that in FIG. 25. Once the program in FIG. 28, for which this code is generated, begins generating pulses, it operates identically to the program in FIG. 24. The code of FIG. 29A includes an additional case structure however. This case structure determines when the program begins generating pulses. The false case is shown in FIG. 29B. This is the code that detects the start trigger condition from memory location gDIO1 12.vi (where the DIO 1 primitive is writing its data) and subsequently reads the value of the start delay from memory location gStartDelay6.vi.

Figure 30:
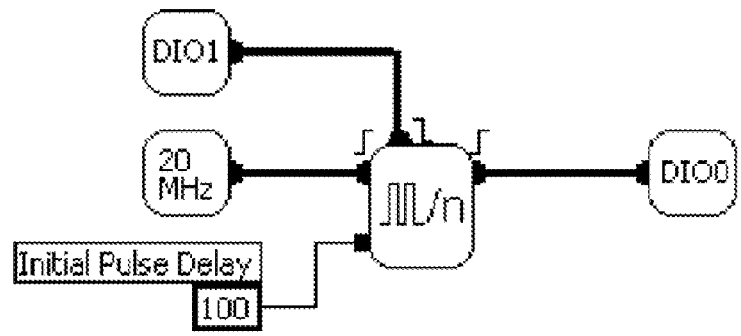
FIG. 30 illustrates a graphical program that uses the stop trigger feature.
Figure 31:
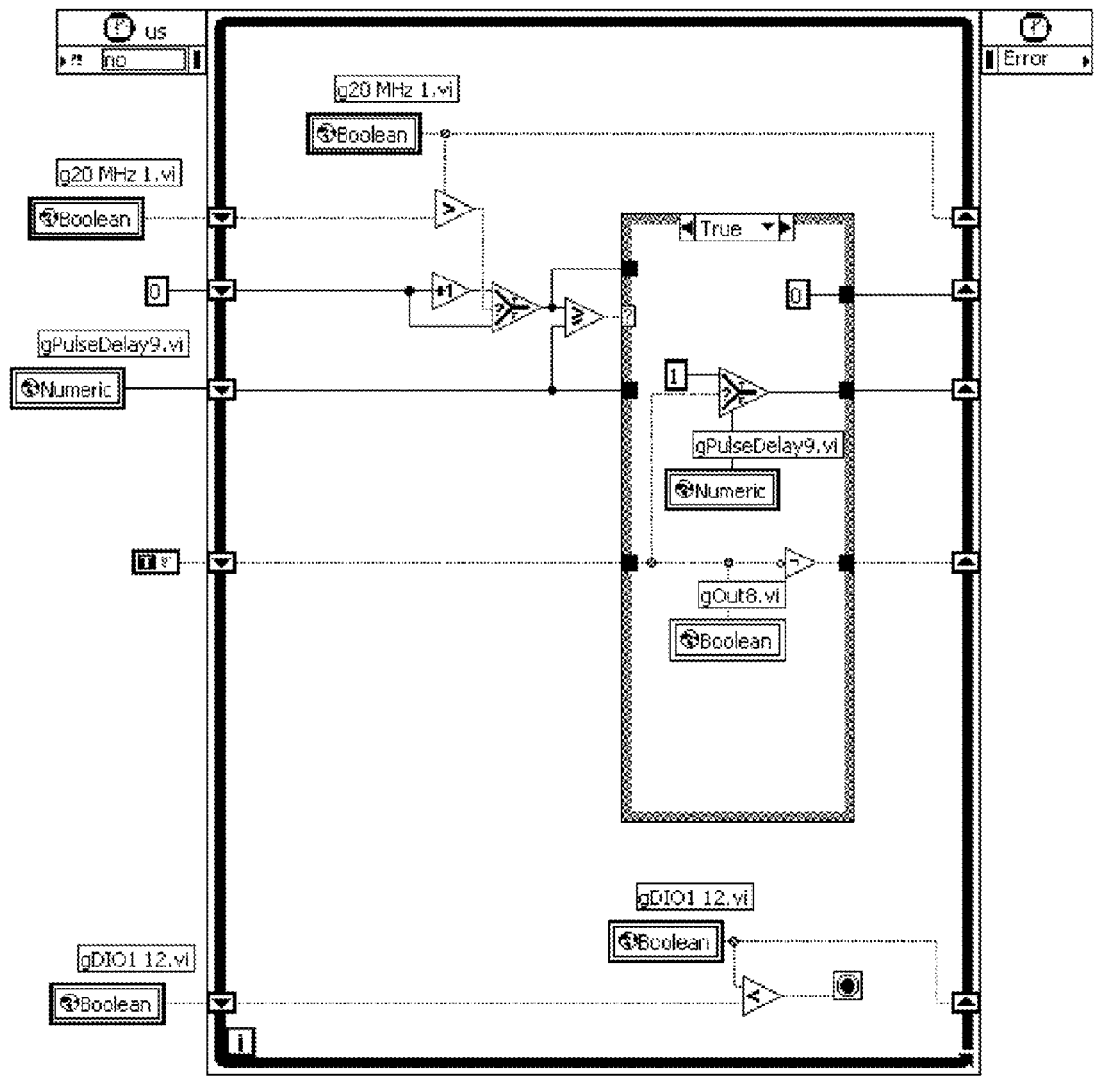
FIG. 31 is one embodiment of scripted code for the pulse generator of FIG. 30.

Pulse Generation until Stop Trigger Example: The graphical program in FIG. 30 is executable to produce one pulse at the DIO 0 pin each time 100 rising edges of the signal produced by the 20 MHz clock primitive are counted. These pulses will continue to be produced until a falling edge is detected from the signal at the DIO 1 pin. FIG. 31 illustrates scripted code for the pulse generator primitive of FIG. 30. The code in the False case of FIG. 31 is identical to that of FIG. 25A.

The code in FIG. 31 is identical to that of FIG. 25 with the exception of how the loop is stopped. The loop in FIG. 25 runs continuously and does not stop. The loop of FIG. 31 will stop when a falling edge is detected at memory location gDIO1 12.vi, which is where the DIO 1 primitive from FIG. 30 is writing its data.

Figure 32:
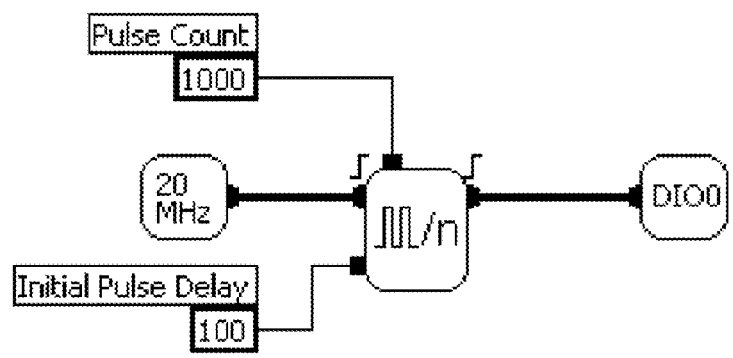
FIG. 32 is a graphical program illustrating use of the pulse count stop condition.
Figure 33:
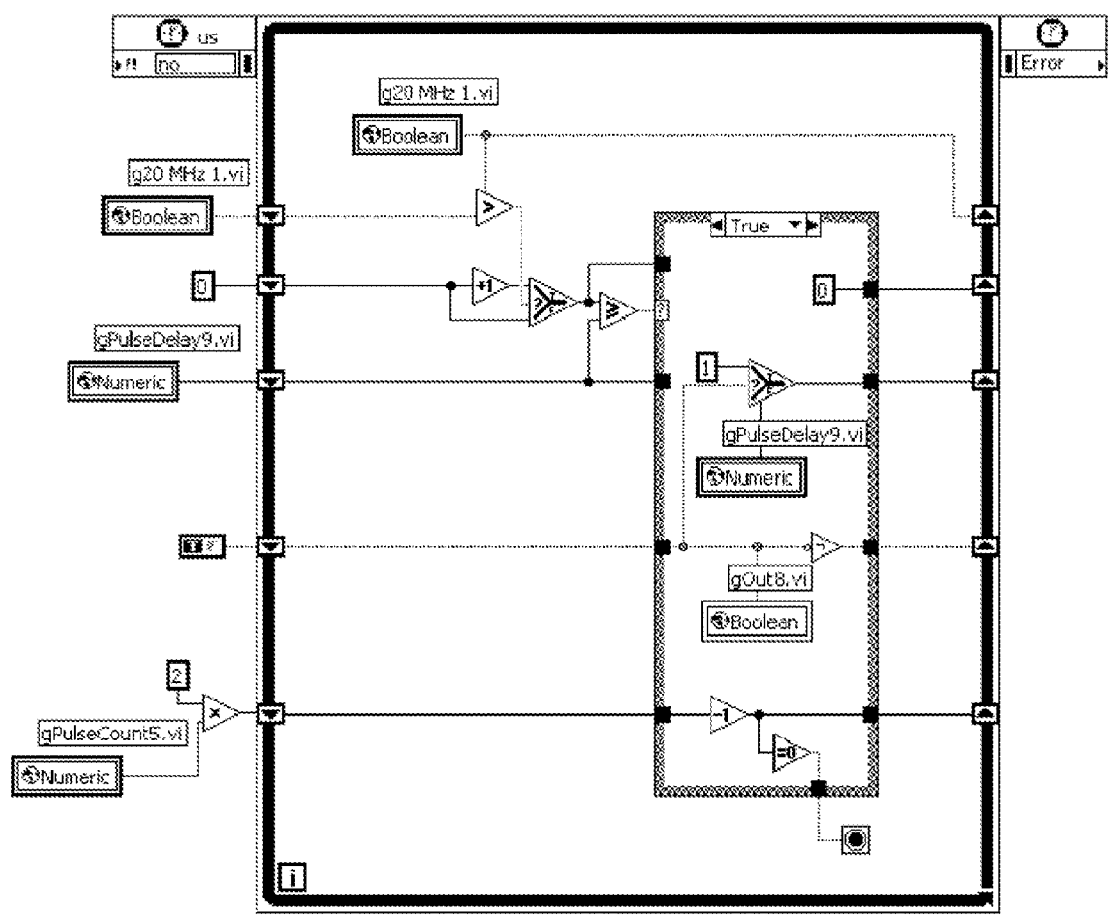
FIG. 33 is one embodiment of scripted code for the pulse generator of FIG. 32.
Figure 33A:
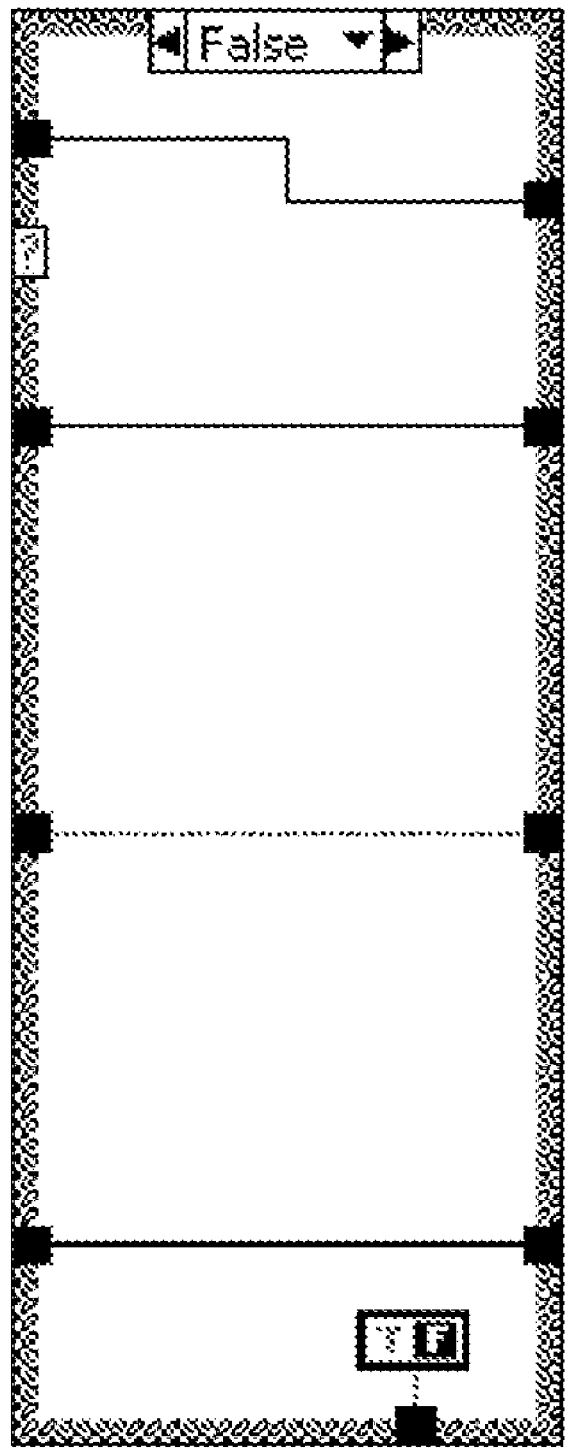
FIG. 33A illustrates the False case for the case structure of FIG. 33.

Finite Pulse Generation Example: The graphical program in FIG. 32 is executable to produce one pulse at the DIO 0 pin each time 100 rising edges of the signal produced by the 20 MHz clock are counted. Exactly 1000 of these pulses will be produced. FIG. 33 shown scripted code for the pulse generator primitive of FIG. 32. The desired number of pulses is read from memory location gPulseCount5.vi. Since each pulse has two edges and this code counts edges, the value is multiplied by two. Inside the True case, which executes when an edge is produced and a new value is written to gOut8.vi, the desired number of edges is decremented and the result stored for the next execution of the True case. Once this value reaches zero, the loop is terminated.

Figure 34:
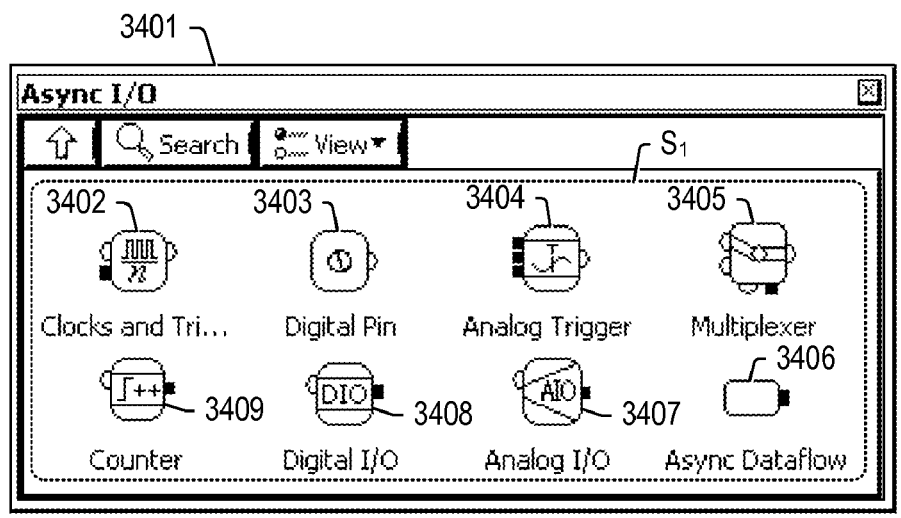
FIG. 34 illustrates one embodiment of a graphical palette 3401 containing a set $S_1$ of graphical primitives.

In one set of embodiments, the GPDE may support a set $S_1$ of primitives as shown in FIG. 34, in addition to the primitives of the set $S_{BASE}$ (not shown). Each primitive of the set $S_1$ may be a circuit-like primitive or a primitive capable of being specialized (in response to user configuration choices) into either a circuit-like primitive or a dataflow primitive. The primitives of the set $S_1$ may be arranged on a palette 3401. The user may drag and drop instances of the $S_1$ primitives and instances of the $S_{BASE}$ primitives from their respective palettes onto a block diagram window, configure the instances, and interconnect the instances (using wires of different kinds) to generate a graphical program. The graphical program may then be compiled and executed on a target device (e.g., an FPGA) as described variously above.

In some embodiments, wires may come in three fundamental varieties: dataflow wires, asynchronous signal wires and asynchronous data wires.

The asynchronous signal wire is meant to abstract the notion of an electrical wire that carries a digital signal. The digital signal may be realized as a stream of Boolean values as described above. The digital signal may be used to control the timing of events or operations such as A/D conversion, D/A conversion, digital input, digital output, starting and stopping of measurements, etc. (Thus, the digital signal carried by an asynchronous signal wire may be referred to as a timing signal.)

Asynchronous signal wires may participate in cycles within the circuit-like portion of the graphical program.

In some embodiments, the asynchronous signal wire can only connect from one circuit-like primitive to another circuit-like primitive.

The asynchronous data wire carries data. The asynchronous data wire may connect: (a) from one circuit-like primitive to another circuit-like primitive; (b) from a circuit-like primitive to a cast primitive; or (c) from a cast primitive to a circuit-like primitive. The cast primitive is used to translate between the dataflow domain and the asynchronous circuit domain. On one side, the cast primitive couples to a dataflow node through a dataflow wire. On the other side, the cast primitive couples to a circuit-like primitive through an asynchronous data wire. Cast primitives may be used to send data from dataflow code to circuit-like primitives, and, to send data from circuit-like primitives to dataflow code. The cast primitive will be explained in more detail later.

Neither type of asynchronous wire imposes a dataflow ordering dependency on its consumer (i.e., on the primitive at its output end) as would a dataflow wire.

Both types of asynchronous wire may be distinguished from dataflow wires by their appearance and behavior. In one embodiment, the asynchronous wires may be thicker than dataflow wires. Furthermore, the asynchronous signal wire may be distinguished in appearance from the asynchronous data wire, e.g., by color and/or texture.

The terminals of the circuit-like primitives may be specialized in appearance to indicate which type of asynchronous wire they are configured to connect to. For example, terminals that are configured to source or sink asynchronous signal wires may be rounded (i.e., semicircular) whereas terminals that are configured to source or sink asynchronous data wires may be square (or rectangular). In addition, the asynchronous signal terminals may be represented in a first color (e.g., green) and the asynchronous data terminals may be represented in a second different color (e.g., blue).

In some embodiments, it is possible to write to an asynchronous signal terminal (of a circuit-like primitive) from dataflow code only when you have created a 'satellite' dataflow node that is bound to that terminal.

Asynchronous data wires may cross the boundaries of structures (e.g., while loops) without producing tunnels. Data may travel across these structure boundaries in both directions even while the structure is executing. (However, data travels in only one direction on any given asynchronous data wire.)

Asynchronous data wires have configurable buffering policies which determine their read/write behavior. A primitive that writes data into an asynchronous data wire supports two buffering policies with respect to that wire. A primitive that reads from an asynchronous data wire adapts to the policy set by the writer.

Buffering Policy (A): The buffer holds a single element. Thus, writes are destructive (i.e., a currently written value overwrites a previously written value). Reads are non-destructive because the data item held in the buffer is not changed by virtue of a read operation. Thus, the same data may be read multiple times. There is no guarantee that the consumer of the asynchronous data has read a written value before a subsequently written value erases it. The reader does not condition its read activity based on state of the buffer. Furthermore, the writer does not condition its read activity based on state of the buffer. In some embodiments, the single element buffer is implemented using a global variable.

Buffering Policy (B): The buffer holds multiple elements and is organized as a FIFO. The depth (number of elements) of the buffer is configurable. The blocking behavior of the writer (reader) depends on whether that writer (reader) is a circuit-like primitive or a cast primitive. Circuit-like primitives do not block based on state of the buffer. Where a circuit-like primitive is the reader of the buffer, if the buffer is empty upon reading, the last value read is used until new data appears. Where a circuit-like primitive is the writer, if the buffer is full upon writing, the new data is lost. In contrast, the cast primitive does indeed block on full when writing and on empty when reading. In other words, the cast primitive in the role of writer will suspend a write transaction to the buffer (and thus, suspend the activity of any structure in which it resides) if the buffer is full. Furthermore, the cast primitive in the role of reader will suspend a read transaction (and thus, suspend the activity of any structure in which it resides) if the buffer is empty. The write (read) is suspended until the buffer is no longer full (empty).

Some of the asynchronous data terminals of the circuit-like primitives may support connections to dataflow wires. When the output end (as opposed to the input end) of a dataflow wire is connected to such a terminal, the asynchronous data terminal may disappear and the dataflow wire may be extended to make direct contact with the boundary of the circuit-like primitive in order to indicate that this connection will impose a dataflow dependency on the circuit-like primitive.

The circuit-like primitives may be implemented as free-running entities, e.g., as free-running loops. In some embodiments, all the primitives of the set $S_1$ are circuit-like primitives except for: the cast node; the satellite node; the digital I/O primitive and analog I/O primitive when the sample clock is absent. As free-running entities, the circuit-like primitive cannot be placed inside structures or inside subVIs which are in turn placed inside structures or are expected to return to their calling VI. (VI is an acronym for "Virtual Instrument", a term very familiar to users of LabVIEW. A Virtual Instrument is a graphical program. A subVI is a graphical subprogram.)

If a dataflow wire is connected to a circuit-like node, the dataflow dependency thereby implied will be obeyed and the circuit-like node will not begin its operation until that dependency is satisfied. Any asynchronous wires connected to a circuit-like node do not impose a dataflow dependency. If a circuit-like primitive receives only asynchronous wires, it will begin its operation immediately, when the graphical program begins its execution.

Polymorphic Behavior: Most of the primitives of the set $S_1$ may be configurable as to the number and types of their terminals. These different configurations may be achieved by adding and removing terminals via right click menu options. (The menu appears when the user right clicks on the primitive.) Terminals for the input of sample clocks are accompanied by a FIFO depth, and thus, may be added through a dialog box.

Controls on the Diagram: There may be clickable control elements associated with several of the circuit-like primitives. These controls may be used to select the active edge of an incoming timing signal, the active polarity of an emitted timing signal, the initial selection of a multiplexer (or demultiplexer), and a selection mode for a multiplexer (or demultiplexer).

Editors Behind the Primitives: The pulse generator primitive may expose an arbitrary digital waveform editor in response to user selection. This editor may be used to create an arbitrary digital waveform. The analog trigger primitive may expose a trigger configuration editor. This editor aids in creating the settings for the analog trigger configuration.

Figure 35:
FIG. 35 illustrates two instances of a digital pin primitive, one configured for input, the other configured for output.

The digital pin primitive 3403 of FIG. 34 is a circuit-like primitive meant to represent a terminal on a hardware device (e.g., a terminal on an I/O connector of the hardware device). FIG. 35 illustrates two instances of the digital pin primitive. The digital pin primitive is used to import or export digital signals to/from the graphical program.

In some embodiments, it is not possible to write data from dataflow code to a digital pin primitive or to read data from a digital pin primitive to dataflow code.

Figure 36:
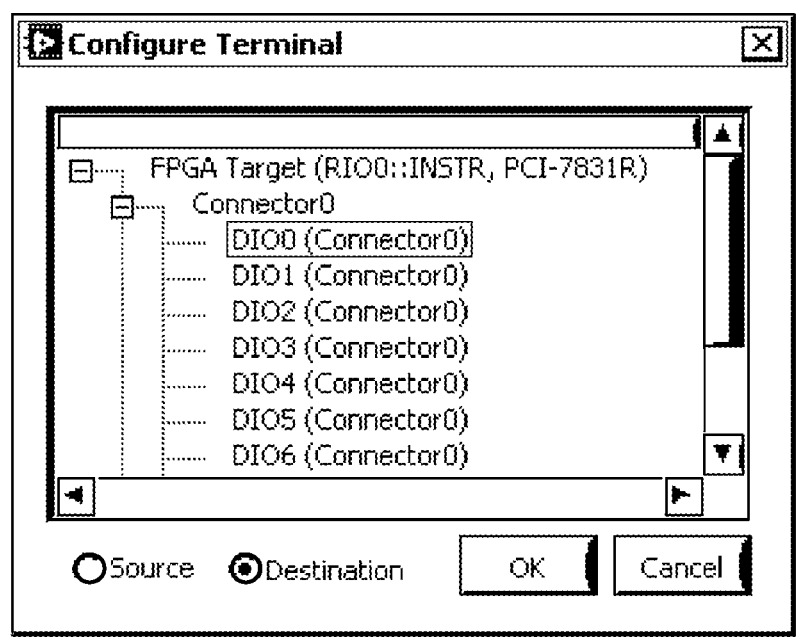
FIG. 36 illustrates dialog through which the user may select a direction for the digital pin primitive and bind the primitive to physical pin of a hardware device.

When the digital pin primitive 3403 is first dropped from the palette 3401, a dialog may appear, e.g., a dialog such as that shown in FIG. 36. The dialog may prompt the user to choose a physical digital line from a set of available physical digital lines of the hardware device. The dialog may also prompt the user for selection of a direction: source or destination. When "source" is selected, the physical digital line is to be used as a source of a digital signal for the graphical program. When "destination" is selected, the physical digital line is used as a destination for a digital signal generated by the graphical program.

The pin primitive 3501 is bound to digital input line #0. The pin primitive 3501 is bound to digital output line #0. Each digital pin primitive is bound to a single digital input line or single digital output line.

Figure 37:
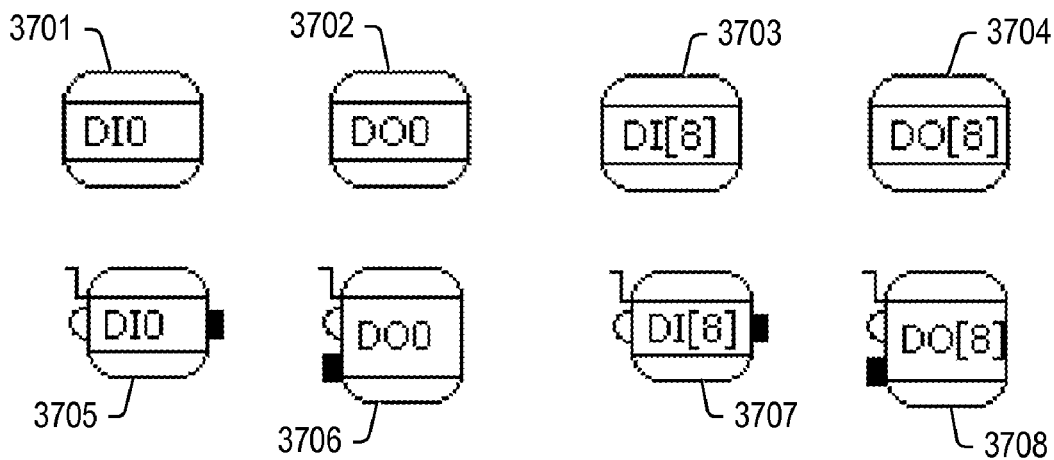
FIG. 37 illustrates a number of instances of the digital I/O primitive.
Figure 38:
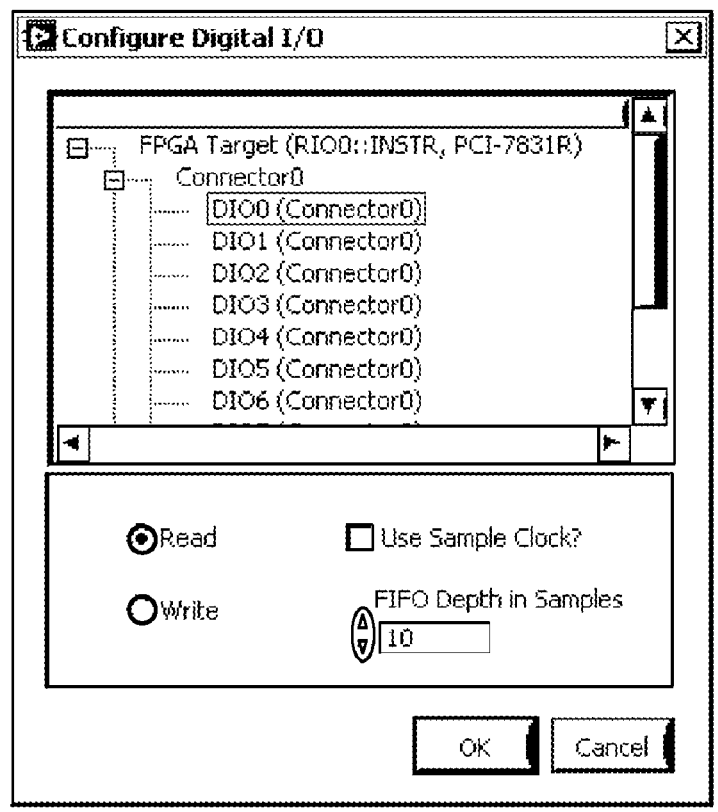
FIG. 38 illustrates a dialog used to configure the digital I/O primitive.

The digital I/O primitive 3408 of FIG. 34 is used for reading and writing digital data. FIG. 37 illustrates various instances of the digital I/O primitive. When the digital I/O primitive is first dropped from the palette 3401, a dialog may appear, e.g., a dialog such as the one shown in FIG. 38. The dialog may prompt the user to choose: a physical digital line or set of physical digital lines; whether the digital I/O primitive will read data from the line(s) or write data to the line(s); and whether data transfers to/from the line(s) will occur in response to a sample clock signal supplied by another circuit-like primitive.

When the "no sample clock" option is selected, the digital I/O primitive specializes into a dataflow primitive, e.g., as suggested by the instances 3701-3704 of FIG. 37. Dataflow primitives have no asynchronous behavior. Thus, when the digital I/O primitive specializes into a dataflow primitive, all asynchronous terminals disappear. If configured as an input, the digital I/O primitive will read samples from the connected lines and transfer the samples as a Boolean array to another dataflow node through a dataflow wire. If configured as an output, the digital I/O primitive will receive an array of Booleans from a connected dataflow wire and transfer the Boolean values of the array to the connected lines.

When the "sample clock" option is selected, an asynchronous signal terminal with an active edge control may appear on the icon of the digital I/O primitive, e.g., as suggested by the instances 3705-3708 of FIG. 37. The active edge control (shaped, e.g., like a small whisker) may determine which edge of the sample clock causes data movement. In addition, an asynchronous data terminal may appear on the icon of the digital I/O primitive. The asynchronous data terminal receives or emits digital data through an asynchronous data wire. In some embodiments, the asynchronous data terminal must connect to a FIFO-based asynchronous data wire. (See the description of the cast primitive for details on exchanging data between the digital I/O primitive and the dataflow portion of a graphical program.) When using a sample clock and reading data, the dialog may force the user to select the depth of the FIFO associated with the asynchronous data wire. Each sample is one Boolean from one digital line. If the digital I/O primitive is bound to eight lines, each active edge of the sample clock will produce eight samples.

Figure 39:
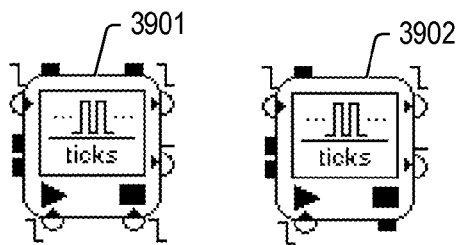
FIG. 39 illustrates two instances of the pulse generator primitive.

The pulse generator primitive 3402 of FIG. 34 is a circuit-like primitive and may be used for dividing down a timing signal, e.g., to produce a clock signal or a trigger signal. FIG. 39 illustrates two specialized instances of the pulse generator primitive.

The pulse generator primitive may have a number of configuration options available, e.g., via a right click menu. In one embodiment, the configuration options may include a digital waveform editor for creation of complex pulse trains.

Figure 40:
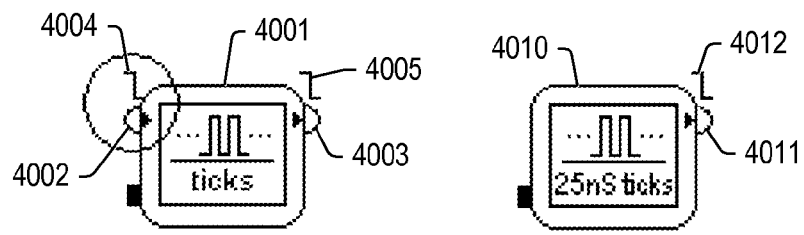
FIG. 40 illustrates two instances of the pulse generator primitive, one configured to use a timebase signal input, the other configured to use a base clock available in the target hardware device.

As illustrated in FIG. 40, the asynchronous signal terminal 4002 at the upper left of the pulse generator primitive 4001 receives a timebase signal as input for the pulse generator primitive. The pulse generator primitive divides down the timebase signal to generate an output signal which is made available at asynchronous signal terminal 4003. The polarity control 4004 next to the asynchronous signal terminal 4002 may determine which edges (i.e., rising edges, falling edges or all edges) of the timebase signal are counted. The selected edges is referred to as active edges. In some embodiments, a right click option allows the base clock of an FPGA to be chosen as the timebase signal. When the master clock is chosen, the asynchronous signal terminal 4002 and its polarity control 4004 may disappear and the pulse generator primitive may change its appearance to indicate that ticks of the master clock are being counted, e.g., as illustrated by pulse generator primitive 4010. In the embodiment shown, primitive 4010 assumes that a 40 MHz base clock is being used by the programmable hardware element, and thus, displays an indication that the ticks of the base clock are 25 nsec apart.

As shown in FIG. 40, the asynchronous signal terminal 4003 at the upper right of pulse generator primitive 4001 is the output terminal where the output signal is made available. The polarity control 4005 determines if the output pulses are asserted in a positive going fashion or negative going fashion. In the pulse generator primitive 4010, where the base clock has been selected instead of an input timing signal, the output signal is presented at asynchronous signal terminal 4011 with pulse polarity determined by polarity control 4012.

Figure 41:
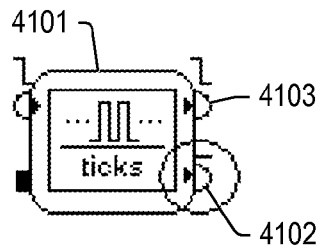
FIG. 41 illustrates the inverted output feature.

As shown in FIG. 41, the asynchronous signal terminal 4102 at the lower right is the inverted output of the pulse generator primitive 4101. The polarity of the inverted output is complementary to the polarity of the primary output at terminal 4103. The inverted output terminal may be added and removed by user selection, e.g., by a right click menu option.

Figure 42:
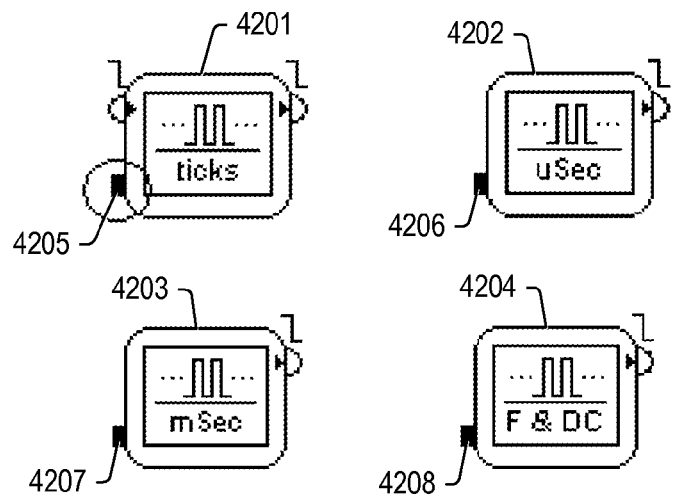
FIG. 42 illustrates several instances of the pulse generator primitive, each of which is configured to use a period (or frequency) input.

As shown in FIG. 42, the asynchronous data terminal at the lower left of each of pulse generator primitives 4201-4204 receives period (or a frequency) input. If the 40 MHz clock has been selected as the timebase, another right click menu choice allows units of microseconds, milliseconds or frequency for the pulse generator. Regardless of the choice of timebase, the pulse generator supports the use of ticks as units. The effects of the different units on the operation of the pulse generator are as follows.

(A) Ticks: A tick is one active edge of the timebase signal. The leading edges of the pulses produced at the output are "period" ticks apart, where "period" is the value supplied to the asynchronous data terminal 4205. The default pulse width, in effect when no pulse width is specified, is 25 nanoseconds (i.e., one period of the FPGA base clock). The minimum period value is dependent on the timebase source. For the 40 MHz timebase the minimum is 2 ticks. Any value less than 2 acts as 2. For any other timebase the minimum value is 1 tick.

(B) Microseconds: This option is available only when the timebase is the 40 MHz base clock. The period of the generated output signal, regardless of the pulse width, is exactly "period" microseconds, where "period" is the integer value supplied to the asynchronous data terminal 4206. The default pulse width is 25 nanoseconds (i.e., one tick of the 40 MHz timebase).

(C) Milliseconds: This option is available only when the timebase is 40 MHz. The period of the generated output signal, regardless of the pulse width, is exactly "period" milliseconds, where "period" is the integer value supplied to the asynchronous data terminal 2407. The default pulse width is 25 nanoseconds (i.e., one tick of the 40 MHz timebase).

(D) Frequency: This option is available only when the timebase is 40 MHz. The frequency of the generated signal is specified in Hz. The default pulse width is determined by a 50% duty cycle. Of the four units, this option takes the most space when an FPGA is targeted.

Figure 43:
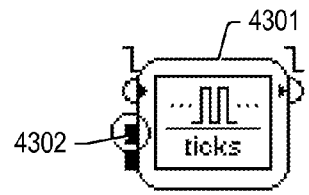
FIG. 43 illustrates the pulse width terminal of the pulse generator primitive.

As shown in FIG. 43, the asynchronous data terminal 4302 at the middle left of the pulse generator primitive 4301 receives a pulse width (or duty cycle) input of the pulse generator primitive. This terminal may be added and removed, e.g., by a right click menu choice. Changing the pulse width does not affect the period. The units used for this terminal may be the same as the units specified for the pulse generator.

As mentioned above, the period and pulse width terminals accept three types of wires: dataflow wires, single-element asynchronous data wires and FIFO-based asynchronous data wires. When a dataflow wire is connected to one of these asynchronous data terminals, the asynchronous data terminal disappears indicating an ordinary dataflow connection has been established. In some embodiments, the dataflow dependency must be satisfied before the pulse generator will begin its operation. This dependency can be used to control the start up of a pulse generator. When either type of asynchronous data wire is connected, input value may be changed while the pulse generator is running. Each time a new period or pulse is begun, the pulse generator will read a value from the asynchronous data wire. In the case of a FIFO-based asynchronous data wire, when the FIFO is empty, the last value read will be reused. In some embodiments, the FIFO-based asynchronous data wire is disallowed for connection to these data inputs when the frequency and duty cycle units are chosen.

Figure 44:
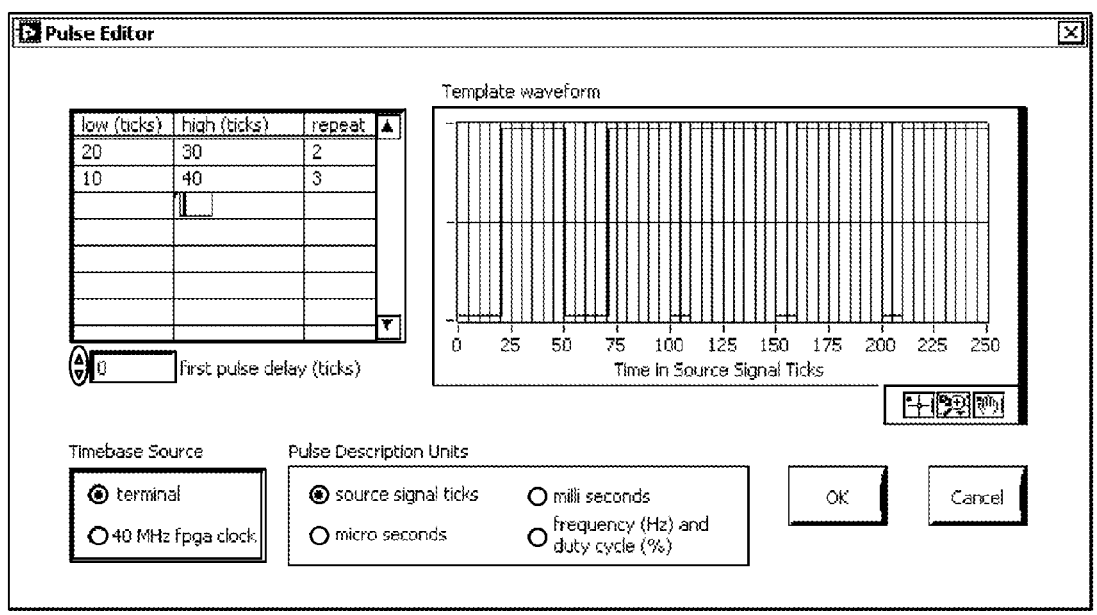
FIG. 44 illustrates a pulse editor for specifying a digital waveform to be generated by the pulse generator primitive.

Another way to specify the period and pulse width is to use the pulse editor, e.g., as shown in FIG. 44. The pulse editor is a type of digital waveform editor. When the units are ticks, microseconds or milliseconds, the values entered are low time and high time as opposed to a period and pulse width. A repeat value is the third item. Once all three items are entered for a given line, that part of the pulse train is drawn on the plot. When the pulses are controlled by the pulse editor, the period, pulse width and first pulse delay terminals are no longer visible on the pulse generator icon. When a pulse-count stop condition is enabled for the pulse generator primitive and the pulse editor is in use, the units of the value written to the pulse-count terminal are iterations of the template waveform as shown on the editor.

The template waveform may be stored in a buffer on an FPGA. The size of the buffer may depend on the extent in time covered by the template waveform. Thus, a template waveform of long duration may be expensive in terms of the amount FPGA resources consumed.

Figure 45:
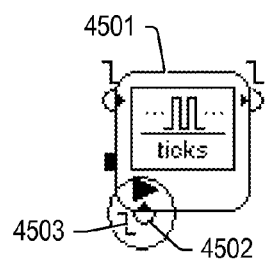
FIG. 45 illustrates the start trigger terminal of the pulse generator primitive.

As shown in FIG. 45, the asynchronous signal terminal 4503 at the bottom left of the primitive 4501 is a start trigger terminal configured to receive a timing signal (to control the start of pulse generation). The terminal 4503 may be added and removed by the user, e.g., via a right click menu option. The terminal 4503 may accept only a asynchronous signal wire. The polarity control 4503 determines which edge of the timing signal will enable the pulse generator to begin its operation.

Figure 46:
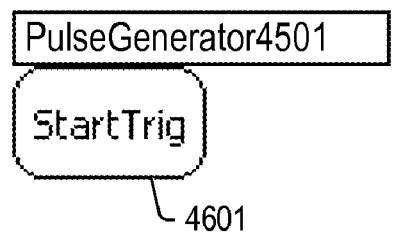
FIG. 46 illustrates a satellite node corresponding to the start trigger terminal.

One way to arrange for software control of start trigger input is to create a dataflow node corresponding to the start trigger input. Such dataflow nodes, created to represent asynchronous signal inputs are referred to herein as "satellite" nodes. A satellite node may be written to by dataflow code. A satellite node is typically placed inside a while loop or other structure so that dataflow code may write to the satellite node repeatedly. FIG. 46 illustrates a satellite node 4601 created for the start trigger input of pulse generator primitive 4501. A satellite node may be created in response to user input, e.g., via a right click menu option.

Figure 47:
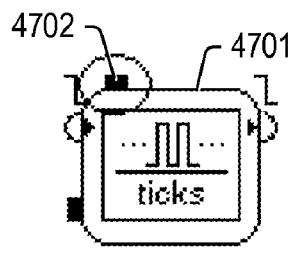
FIG. 47 illustrates the first-pulse-delay input terminal of the pulse generator primitive.

As shown in FIG. 47, the asynchronous data terminal 4702 at the top left of the pulse generator primitive 4701 is the first pulse delay input. It may be added and removed via a right click menu option. Its units may be the units chosen for the pulse generator, possibly with the exception of the frequency and duty cycle mode. In that case the first pulse delay may be in microseconds. This terminal acts to add a delay from the active edge of the start trigger (of from the start of execution if the start trigger is absent) before the first pulse is asserted at the output. This terminal only accepts dataflow and single-element asynchronous wires.

Figure 48:
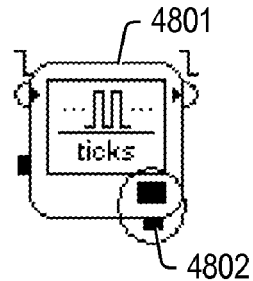
FIG. 48 illustrates the pulse-count stop terminal of the pulse generator primitive.

As shown in FIG. 48, the asynchronous data terminal 4802 at the bottom right of the pulse generator primitive 4801 is the pulse count stop condition. This terminal may be added or removed, e.g., via a right click menu option. It accepts dataflow and single-element asynchronous wires. When this terminal is present, the pulse generator will stop when the specified number of pulses has been generated at the output. When the digital waveform editor is controlling the pulse generator, the units of this terminal are in 'editor templates', meaning for example that if your editor specifies 5 pulses and you have wired a 10 to the pulse count stop terminal, the pulse generator will generate the 5 pulses specified in the editor 10 times for a total of 50 pulses. After stopping, if the start trigger is present, the pulse generator will begin looking for the start trigger again.

Figure 49:
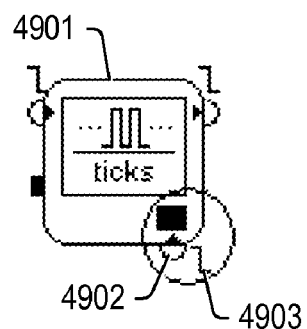
FIG. 49 illustrates the stop trigger terminal of the pulse generator primitive.
Figure 50:
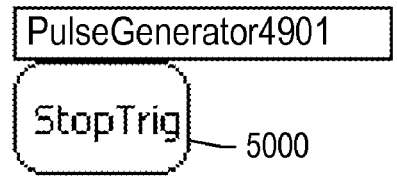
FIG. 50 illustrates a satellite node corresponding to the stop trigger terminal.

As shown in FIG. 49, the asynchronous signal terminal 4902 on the bottom right of the pulse generator primitive 4901 is the stop trigger input. It may be added and removed by user selection, e.g., via a right click menu option. It may accept only an asynchronous signal wire. Its polarity control 4903 determines which edge of this provided signal will cause the pulse generator to stop its operation. One way to issue a software stop is to create a satellite node corresponding to the stop trigger input, e.g., via a right click menu option. FIG. 50 illustrates a satellite node 5000 that has been created for the stop trigger input of pulse generator primitive 4901. The dataflow portion of the graphical program may write to the satellite node 50 into order to control the stop trigger input.

Figure 51:
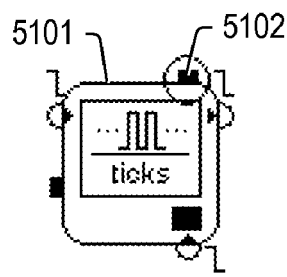
FIG. 51 illustrates the pulses-after-stop terminal of the pulse generator primitive.

As shown in FIG. 51, the asynchronous data terminal 5102 at the top right of the pulse generator primitive 5101 is the pulses-after-stop terminal. It may be added by user selection (e.g., via a right click menu) if the "stop trigger" stop condition has been previously chosen. After the arrival of the stop trigger, the pulse generator will generate an additional number of pulses equal to the value supplied to the pulses-after-stop terminal 5102.

Figure 52:
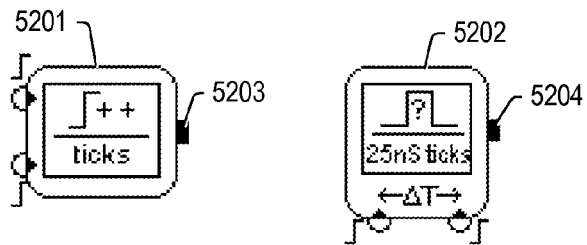
FIG. 52 illustrates two instances of the counter primitive, one configured to count edges of a supplied timebase signal, the other configured to measure the time between a rising edges of a first signal and the rising edge of a second signal.

The counter primitive 3409 shown in FIG. 34 is a circuit-like primitive that may be used for counting and measuring timing signals. It has two different modes. In the first mode, it performs edge counting. In the second mode, it measures the time elapsed between two timing events. FIG. 52 illustrates two instances of the pulse generator primitive. Primitive 5201 is configured for the edge counting mode. Primitive 5202 is configured for the elapsed time mode. There are many configuration options available to the user, e.g., via a right-click menu.

Figure 53:
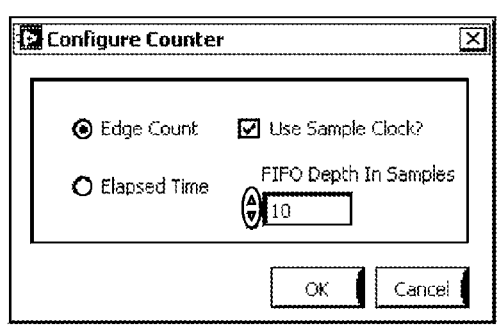
FIG. 53 illustrates a dialog through which the user may configure properties of the counter primitive.

When the counter primitive 3409 is first dropped on the diagram, a dialog may prompt the user for the selection of an initial mode of the counter (i.e., one of edge counting or elapsed time), e.g., as suggested by FIG. 53. A sample clock terminal may be opted for in the edge counting mode. If the sample clock is enabled or the elapsed time model is chosen, the size of the data buffer for the asynchronous data output becomes configurable.

Figure 54:
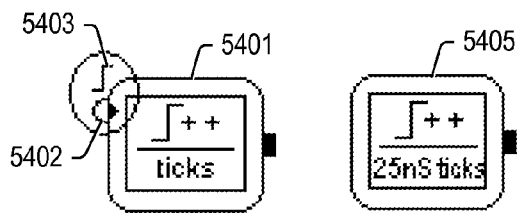
FIG. 54 illustrates two instances of the counter primitive, one configured to count rising edges of a timebase signal, the other configured to count ticks of a hardware base clock.

FIG. 54 illustrates two instances of the counter primitive configured for the edge counting mode. As exemplified by the counter primitive 5401, the asynchronous signal terminal 5402 may appear at the upper-left of the primitive if the 40 MHz base clock has not been selected. The terminal 5402 receives a timebase signal for the counter primitive. The terminal 5402 may accept only an asynchronous signal wire. The polarity control 5403 indicates the type of edge (of the timebase signal) that will be counted. As exemplified by the counter primitive 5405, when the 40 MHz base clock has been selected, the counter primitive may count the number of 25 nanosecond intervals that have transpired. (Whenever the 40 MHz clock is used, the counter primitive may be configured to also count in microseconds or milliseconds.)

Figure 55:
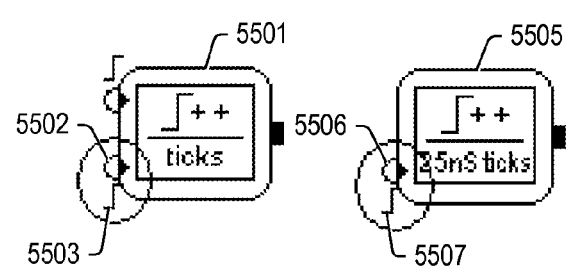
FIG. 55 illustrates the sample clock feature of the counter primitive.

FIG. 55 illustrates two instances of the counter primitive configured for the edge counting mode in the case where the sample clock option has been selected. Primitive 5501 illustrates the subcase where an externally supplied timebase is being used. Primitive 5501 illustrates the subcase where the 40 MHz clock is the timebase. The asynchronous signal terminal 5502 (5506) at the lower left of the counter 5501 (5505) is the sample clock terminal, where a sample clock signal is provided. The sample clock terminal may be configured to accept only an asynchronous signal wire. The sample clock signal indicates when the counter 5501 (5505) should write its count value to the output. The polarity control 5503 (5507) indicates on what edge of the source clock signal the data movement is to occur.

Figure 56:
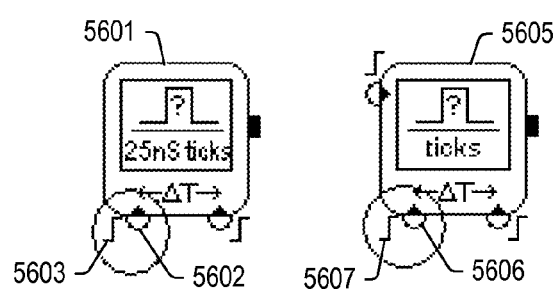
FIG. 56 illustrates the start trigger feature of the counter primitive.

FIG. 56 illustrates two instances of the counter primitive configured for the elapsed time mode. Primitive 5601 is configured for the case where the 40 MHz base clock is to be used, and primitive 5605 is configured for the case where an externally supplied timebase is to be used. The asynchronous signal terminal 5602 (5606) at the lower left of the primitive 5601 (5605) is the first edge trigger. It may be configured to accept only an asynchronous signal wire. When the first edge terminal detects the edge indicated by the polarity control 5603 (5607), the counter resets to zero and begins to count. If the timebase terminal is present, as it is in primitive 5605, the primitive will count in ticks of the timebase signal. This option (timebase terminal or 40 MHz clock) may user selectable, e.g., from a right-click menu.

Figure 57:
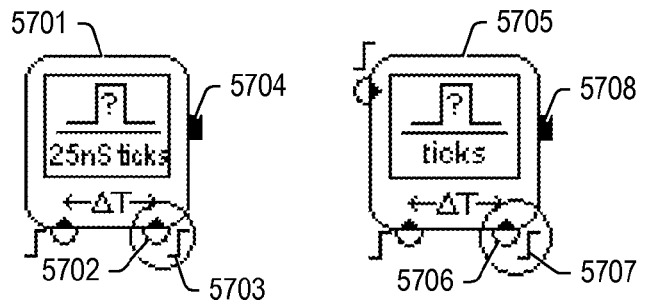
FIG. 57 illustrates the stop trigger feature of the counter primitive.
Figure 58:
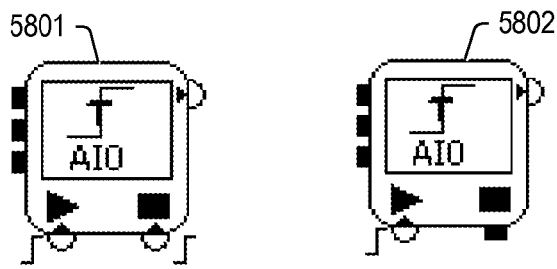
FIG. 58 illustrates two instances of the analog trigger primitive, one configured to use start and stop triggers, the other configured to use a start trigger and a stop count.

FIG. 57 illustrates two instances of the counter primitive configured for the elapsed time mode. Primitive 5701 is configured for the case where the 40 MHz base clock is to be used, and primitive 5705 is configured for the case where an externally supplied timebase is to be used. The asynchronous signal terminal 5702 (5706) as the lower-right of the primitive 5701 (5705) is the second edge. It may be configured to accept only an asynchronous signal wire. This edge is ignored until the first edge is triggered. When the first edge is trigger, the counter continues to increment until the second edge terminal detects the edge indicated by the polarity control 5703 (5707). When the indicated edge of the second edge terminal is detected, the measurement (i.e., the count value) is recorded in the output FIFO corresponding to output terminal 5704 (5608), the count value is reset to zero, and the counter begins to wait for the first edge condition again. Note that if the first edge condition occurs on the exact same cycle as the second edge, the counter will immediately begin counting again.

In either the edge counting mode or the elapsed time mode, the asynchronous data terminal on the right side is the output of the counter. (See, e.g., terminals 5203 and 5204 of the primitives 5201 and 5202, respectively, in FIG. 52.) In edge counting mode without a sample clock, the counter is configured to write to the output whenever the count increments (i.e., at the rate of the 40 MHz base clock.) In this situation, the asynchronous output terminal may impose the single-element buffering policy on any asynchronous data wire that couples to it, and thus, on any consumer that couples to the opposite end of that wire. In edge counting mode with a sample clock or in elapsed time mode, the asynchronous output terminal may impose the FIFO-based buffering policy on any asynchronous data wire that couples to it, and thus, on any consume that couples to the opposite end of that wire. In the former case, the FIFO is written to whenever the sample clock event occurs. In the elapsed time mode, the FIFO is written to whenever the second edge event occurs. If the FIFO is full, the data is lost in both cases.

The analog trigger primitive 3404 shown in FIG. 34 is a circuit-like primitive and may be used for examining analog signals for trigger conditions. When the configured trigger condition is met, the analog trigger primitive outputs a rising edge at its output terminal that can be used to clock or trigger other circuit-like primitives.

Figure 59:
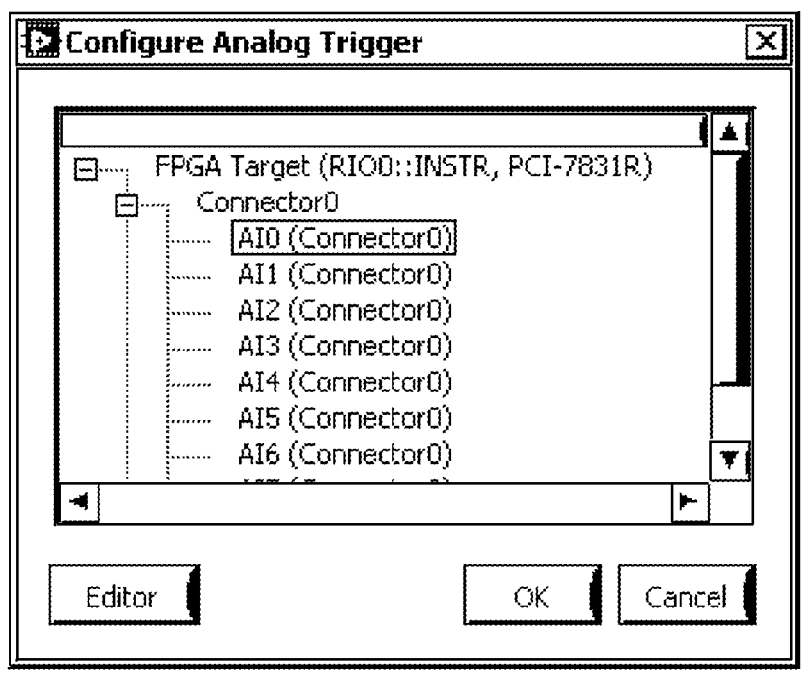
FIG. 59 illustrates a dialog which allows the user to associate the analog trigger primitive to an analog input channel.
Figure 60:
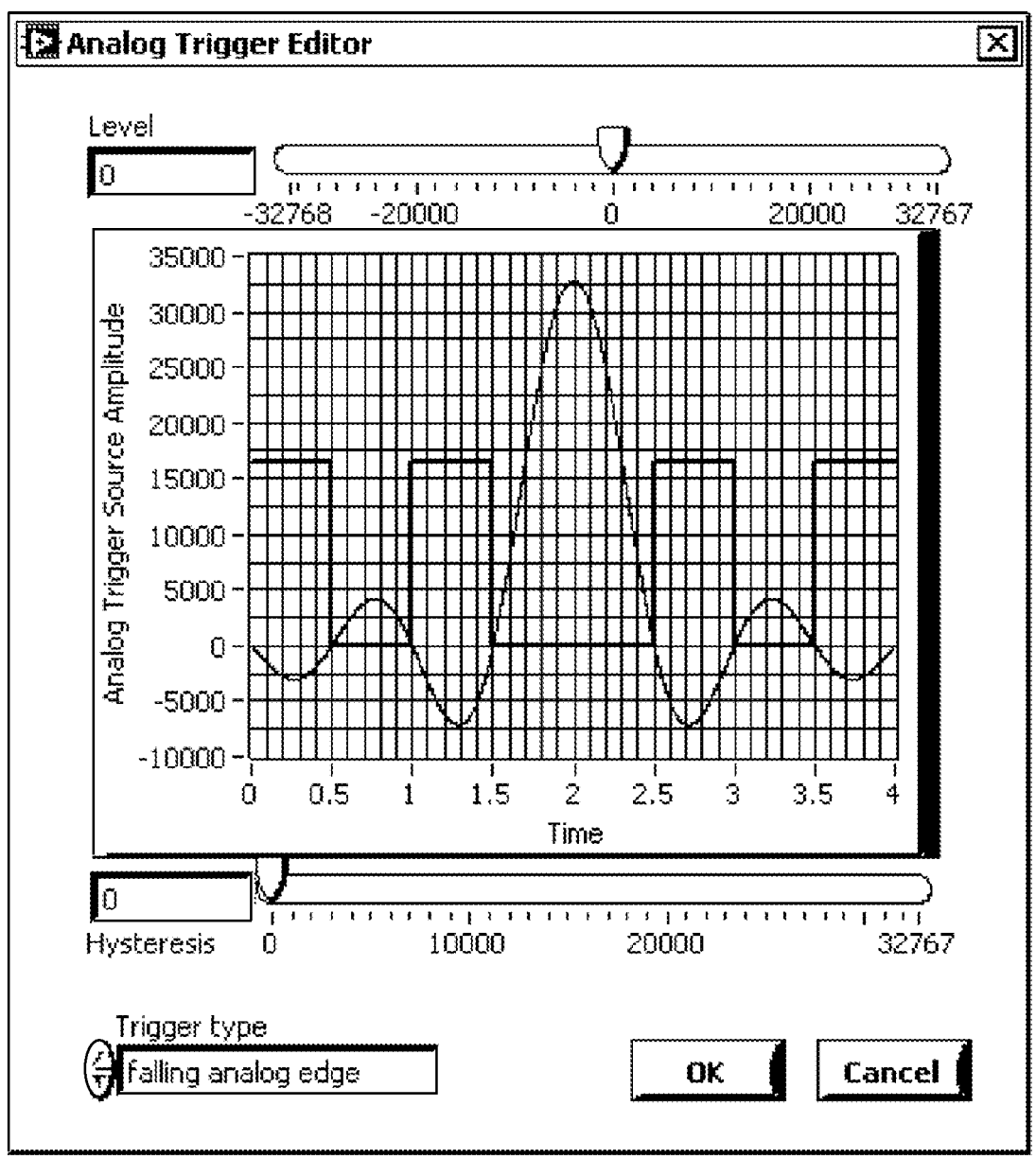
FIG. 60 is an analog trigger editor through which the user may configure properties of the analog trigger primitive.

When first dropped from the palette 3401, a dialog appears that asks the user to choose an analog input channel, e.g., as suggested in FIG. 59. Clicking on the editor button brings up an analog trigger editor. The analog trigger editor is designed to assist the user in configuring the trigger conditions of the analog trigger primitive, e.g., as suggested in FIG. 60. Use of the editor is optional.

When not using the editor, the analog trigger primitive may be placed in either an edge mode or a window mode, e.g., using a right-click menu selection. The editor may also be accessed from the right-click menu as is the option to revert to using the input terminals.

Figure 61:
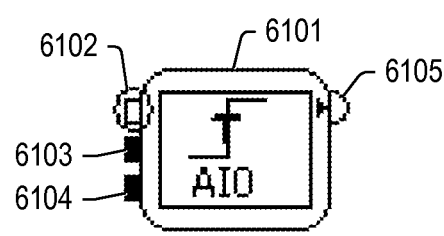
FIG. 61 illustrates various terminals of the analog trigger primitive.

FIG. 61 illustrates an analog trigger primitive 6101 in the case the editor is not being used to configure the trigger conditions. The asynchronous data terminal 6102 at the upper left is the slope/window terminal and is configured to accept Boolean input. In edge mode, a true (false) value at this terminal configures the primitive 6101 to trigger on rising (falling) edges. In window mode, a true (false) value is used for entering a window and the false value for leaving a window.

The asynchronous data terminal 6103 at the middle left is the level/window-top terminal and is configured to accept integer data. In edge mode, this value is the level which the signal must cross to cause a rising edge. In window Mode, this value defines the top of the window entered/left.

The asynchronous data terminal 6104 at the lower left is the hysteresis/window-bottom terminal. This terminal takes an integer input. In edge mode, this value is an offset from the level of what a signal must cross to cause a falling edge. In window mode, this value defines the bottom of the window entered/left.

Each of the terminals 6102, 6103 and 6104 are configured to accept dataflow wires, single-element asynchronous data wires and FIFO-based asynchronous data wires. In the FIFO-based case, the FIFOs are read from on start-up and whenever the trigger deactivates (i.e., the output produces a falling edge). If the FIFO is empty, the previous value is used. Also, these terminals may be hidden if the editor is in use as the editor defines the values corresponding to these terminals.

The asynchronous signal terminal 6105 on the right is the output of the analog trigger primitive. The analog trigger primitive may be configured to assert a rising edge at the output in response to the trigger condition being satisfied. (In other embodiments, the output may have a polarity control to determine the sense of the output pulses.) FIG. 62 illustrates two instances of the analog trigger primitive in the case where the start trigger feature has been selected. The asynchronous signal terminal 6202 (6206) at the bottom left of analog trigger primitive 6201 (6205) is a start trigger terminal for receiving a start trigger signal. It may be added and removed by user selection, e.g., via a right-click menu option. It is configured to accept an asynchronous signal wire. Its polarity control 6203 (6207) determines which edge of the start trigger signal will cause the analog trigger to begin looking for the specified trigger conditions. One way to issue a software start is to create a satellite node corresponding to the start trigger terminal (e.g., via a right click menu option) as suggested in FIG. 63. Dataflow code may write to this satellite node and issue a start trigger thereby. The satellite node is typically placed inside a while loop or other structure.

As shown in FIG. 64, the asynchronous data terminal 6402 at the bottom right of the analog trigger primitive 6401 is a terminal for receiving an integer pulse count value. This terminal may be added and removed by user selection, e.g., via a right click menu option. In some embodiments, it accepts only dataflow and single-element asynchronous data wires. When this feature is used, the analog trigger will stop when the specified number of triggers (i.e., rising edges at the output) has occurred. After stopping, if the start trigger terminal is present, the analog trigger will begin looking for the start trigger again.

As shown in FIG. 65, the asynchronous signal terminal 6502 at the bottom right of the analog trigger primitive 6501 is the stop trigger terminal. The stop trigger terminal is configured to receive a stop trigger signal. The stop trigger terminal may be added and removed by user selection, e.g., via right click menu option. In some embodiments, the stop trigger terminal accepts only an asynchronous signal wire. The polarity control 6503 determines which edge of the stop trigger signal will cause the analog trigger to stop its operation. One way to issue a software stop of the analog trigger primitive is to create a satellite node corresponding to the stop trigger input (e.g., via a right click menu option) as suggested by the satellite node 6601 of FIG. 66. The label of the satellite node indicates that it has been created for analog trigger primitive 6501. A dataflow primitive may write to the satellite node, and thus, the start trigger may be controlled by dataflow code.

Figure 67:
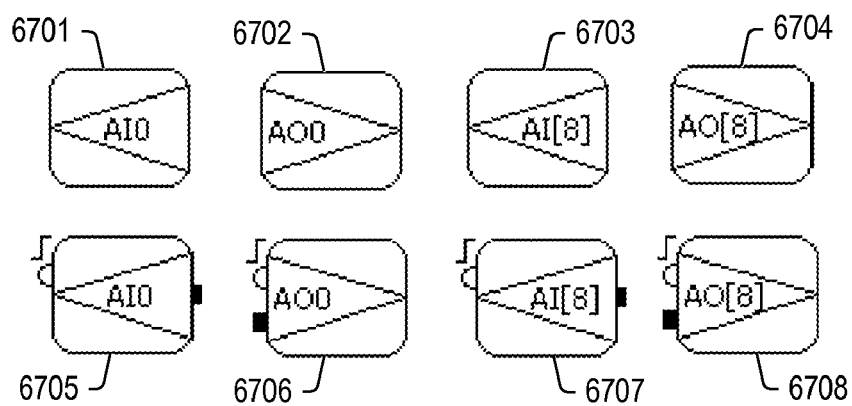
FIG. 67 illustrates a number of instances of the analog I/O primitive for reading from A/D channels and writing to D/A channels.

The analog I/O primitive 3407 shown in FIG. 34 is used for reading data from an analog input channel (i.e., from the output of an A/D converter) or writing data to an analog output channel (i.e., to the input of a D/A converter). FIG. 67 illustrates eight instances 6701-6708 of the analog I/O primitive, each illustrating a different set of configuration choices.

Figure 68:
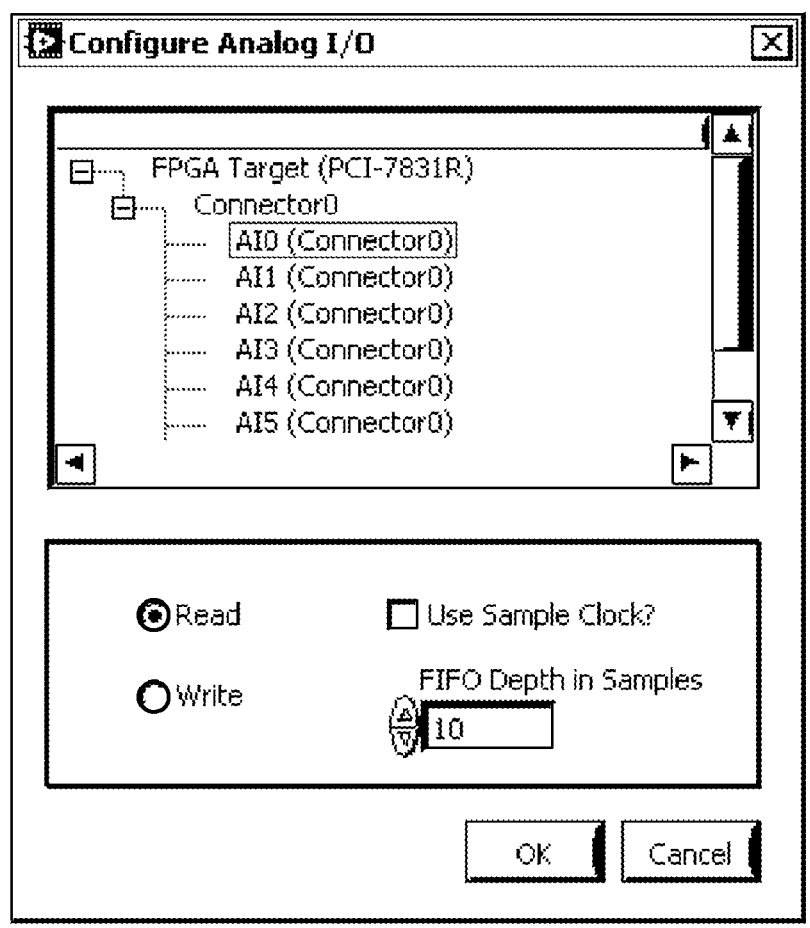
FIG. 68 illustrates a dialog through which one may associate an analog channel with an analog I/O primitive.

When the analog I/O primitive 3407 is first dropped from the palette 3401, a dialog appears that prompts the user to make a number of selections, e.g., as suggested in FIG. 68. The user may be asked to select: a physical analog line (or set of lines), whether the primitive will be used to read or write data, and whether the primitive will use a sample clock to move the data in or out of the target device.

When the sample clock is not being used, as is the case with instances 6701-6704, the analog trigger primitive may be displayed without any of asynchronous signal terminals or asynchronous data terminals. In this "no sample clock" case, the analog I/O primitive will have no asynchronous behavior and is used exactly as the FPGA I/O node of LabVIEW. When multiple lines are used without a sample clock, the dataflow wire connecting to the analog I/O primitive is an array of integers.

When the sample clock is being used, as is the case with instances 6705-6708, an asynchronous data terminal with an active edge control appears at the upper left of the primitive. The active edge control determines which edge of the sample clock causes data movement. In addition, an asynchronous data terminal appears at the middle right or the lower left, depending on whether the analog I/O primitive is configured for input or output. The asynchronous data terminal receives or emits data and is configured for connection to a FIFO-based asynchronous data wire. See the description of the read/write cast primitive for details on exchanging data between the analog I/O primitive and the dataflow portion of the block diagram.

When using a sample clock and reading data, the user must select the depth of the FIFO. Each sample is an integer from one analog line. Thus, if the analog input primitive is bound to eight lines, each tick of the sample clock produces eight integer samples.

Figure 69:
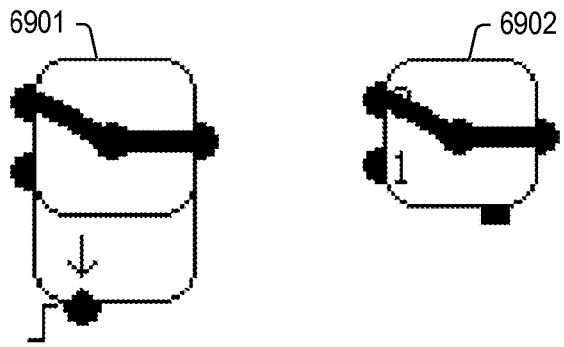
FIG. 69 illustrates two instances of a multiplexer primitive, one configured to use the triggered mode of source selection, the other configured to use the random access mode of source selection.

The multiplexer primitive 3405 of FIG. 34 is a circuit-like primitive and is useful for runtime selection of timing signals and for injecting triggers into the system. There are two switching modes available for controlling which source timing signal input connects to the output. These are the triggered mode and random access mode, and they are available by user selection, e.g., via a right click menu option. In FIG. 69, primitive 6901 is an example of the triggering mode and primitive 6902 is an example of the random access mode.

Figure 70:
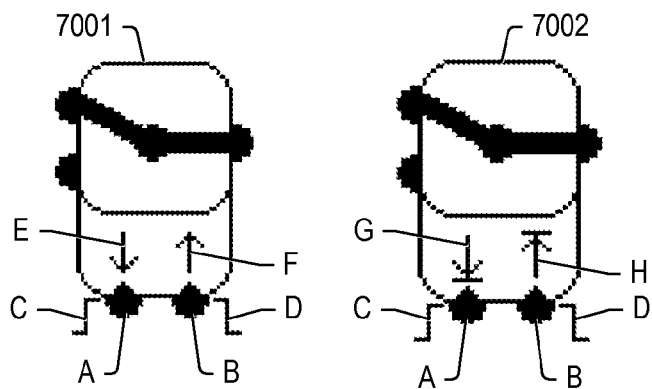
FIG. 70 illustrates two instances of the multiplexer primitive, one configure to use continuous stepping, the other configured to use saturated stepping.

As shown in FIG. 70, in the triggered mode, one or two triggers (A at bottom left and B at bottom right) determine the position of the switch. The second trigger (i.e., trigger B) may be added and removed by user selection, e.g., via a right click menu choice. Each trigger has a clickable active edge polarity control. (Polarity control C corresponds to trigger A, and polarity control D corresponds to trigger B.) In addition, each trigger has a clickable direction and stop/continue glyph that determine what, if anything, happens when the active edge for that trigger occurs. The four options are:

1. Down and continue: An active edge causes the multiplexer to move down to the next source input. If the multiplexer is already at the bottom-most source input, it moves to the top-most.
2. Down and stop: Same as down and continue except that, when the multiplexer is already at the bottom-most source input it does nothing and simply remains there.
3. Up and continue: Same as down and continue except the direction is reversed.
4. Up and stop: Same as down and stop except the direction is reversed.

In FIG. 70, glyph E is in the "down and continue" state. Glyph F is in the "up and continue" state. Glyph G is in the "down and stop" state. Glyph H is in the "up and stop" state.

When in the triggered mode, the initial position of the multiplexer may be determined by clicking on the switch. The switch will change position to indicate the initial position.

Figure 71:
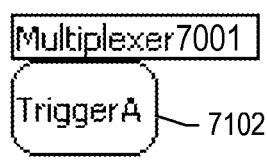
FIG. 71 illustrates a satellite node created for the trigger A input of the multiplexer 7001.
Figure 72:
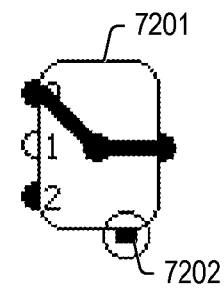
FIG. 72 illustrates a multiplexer configured to use the random access method of source selection. The source select input terminal is highlighted.

A satellite node may be created for either multiplexer trigger (A or B), e.g., by selecting a right click menu option. FIG. 71 illustrates a satellite node 7102 that has been created for the A trigger of multiplexer 7001. The dataflow portion of the graphical program may control the switching action of the multiplexer 7001 by writing to the satellite node. For example, the satellite node may be situated inside a structure (such as a while loop).

In the random access mode, a source is selected by writing its position index to the source select terminal. For example, multiplexer 7201 is in the random access mode. The asynchronous data terminal 7202 at the lower left is the source select terminal. In some embodiments, this terminal is configured to accept only the single-element asynchronous data wire. Thus, the user may drop a cast primitive inside a loop and connect the output of the cast primitive to the source select terminal in order to achieve dataflow control of the multiplexer's selection state.

In the random access mode, clicking on the switch to determine the initial switch position, while still operable, is ineffectual, as the value read from the source select input will be used to determine the actual position as soon as the primitive begins execution.

Timing signal source inputs may be added and removed, e.g., by selecting a right click menu option. Any timing signal source input may be fixed at logical high or logical low also by a right click menu option. Triggering (via one or more satellite nodes) or randomly accessing (via a cast node) a multiplexer with two source inputs, one set permanently high and the other permanently low, is a way to inject pulses into your system under the control of dataflow code.

Figure 73:
FIG. 73 illustrates two instances of the cast primitive.

This cast primitive 3406 of FIG. 34 serves as a bridge between the worlds of dataflow and asynchronous data. FIG. 73 illustrates two instances of the cast primitive.

Figure 74:
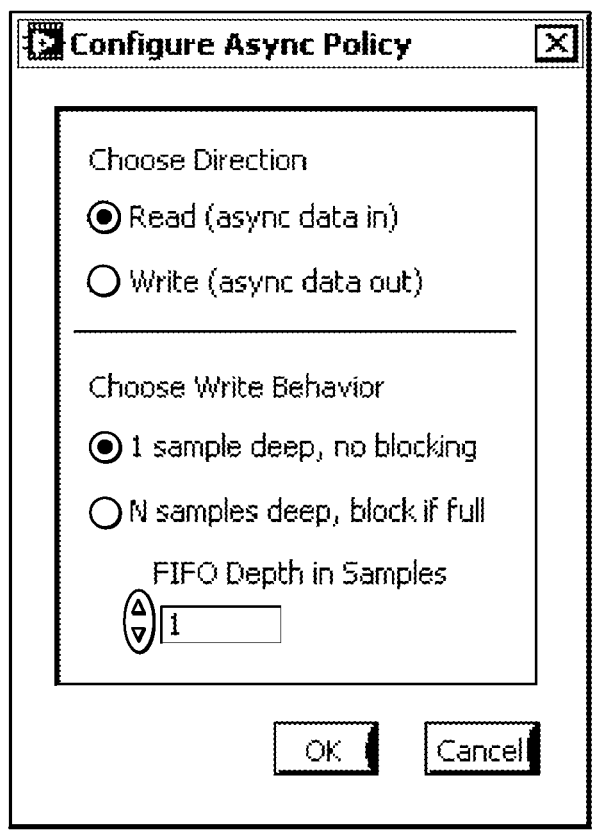
FIG. 74 illustrates a dialog through which the user may configure the cast primitive.

The cast primitive can be dropped inside a structure such as a while loop. When the cast primitive is first dropped, a configuration dialog is presented, e.g., a dialog as illustrated in FIG. 74. This dialog, subsequently accessed by double-clicking or a right-click menu option, configures the direction of the primitive. When configured to read, it takes asynchronous data in and emits dataflow. When configured to write, it does the opposite.

When configured to write, the user is asked to select one of two write behaviors. The "one sample deep, no blocking" behavior may use a global variable. Its policy may be described as 'destructive writes and non-destructive reads'. This means that the writes never block (i.e., never wait for the previous value to be consumed by the reader) and simply overwrite the previous value, thus 'destroying' it. There is no guarantee that the consumer of this data on the other end of the wire has ever read it. A read by the consumer on the other end of the wire does not remove the data, thus 'preserving' it. Thus, the consumer may read the same data again and again.

The "N samples deep, block if full" behavior uses a FIFO. The depth of the FIFO in samples, or elements, is also specified. This policy may be described as 'non-destructive writes and destructive reads'. Writes are non-destructive since a previously written value is never overwritten. If the FIFO is full, the primitive blocks, waiting for space to become available. The only way that space is created is for the consumer on the other end of the wire to read a value. Reads are destructive since the act of reading by the consumer removes the value from the FIFO. Thus, an element of data will only ever be read once.

When a cast primitive is writing asynchronous data into a FIFO (corresponding to an asynchronous data wire), its input may be an array. The cast primitive writes all the values into the FIFO as space becomes available. This is similar to the auto-indexing feature at the boundary of a For loop in LabVIEW.

Figure 75:
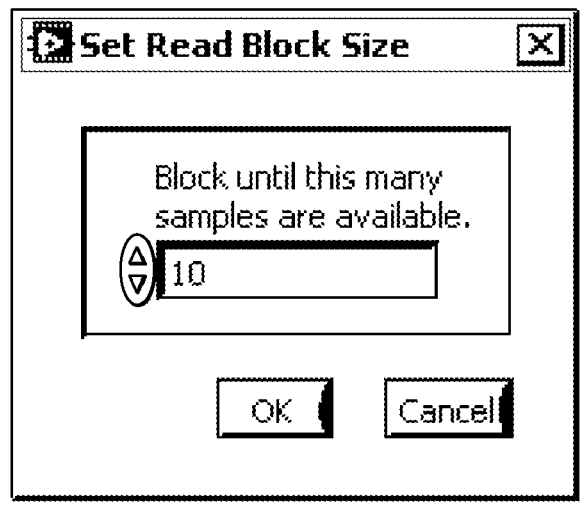
FIG. 75 illustrates a dialog through which the user may determine a read block size.

When a cast primitive is reading asynchronous data from a FIFO (corresponding to an asynchronous data wire), a right click menu option becomes enabled that offers the function of configuring a read block size. When this right click option is selected, a dialog appears, e.g., the dialog illustrated in FIG. 75. When a number greater than 1 is chosen, the cast primitive accumulates (blocks until) the desired number of values into an array. Again this is similar to the auto-indexing feature. When this situation exists, the output terminal of the cast primitive becomes an array. Due to the amount of memory that this feature can consume, in one embodiment, the size of the block may be limited to 256 bytes. Thus, if your FIFO width is 32 bits, the cast primitive may accumulate up to 64 samples.

Example Graphical Programs Using the Circuit-Like Primitives

Figure 76:
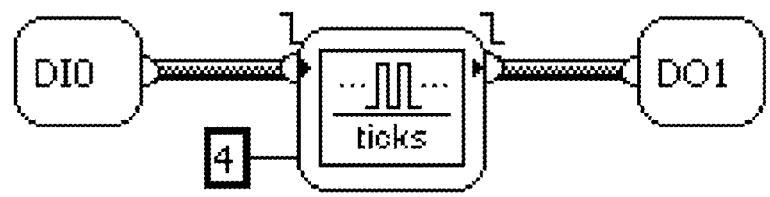
FIG. 76 illustrates a graphical program that realizes a frequency divider circuit.

FIG. 76 illustrates a graphical program that divides the frequency of the signal at terminal DIO 0 by four and emits the frequency divided signal at terminal DIO 1.

Figure 77:
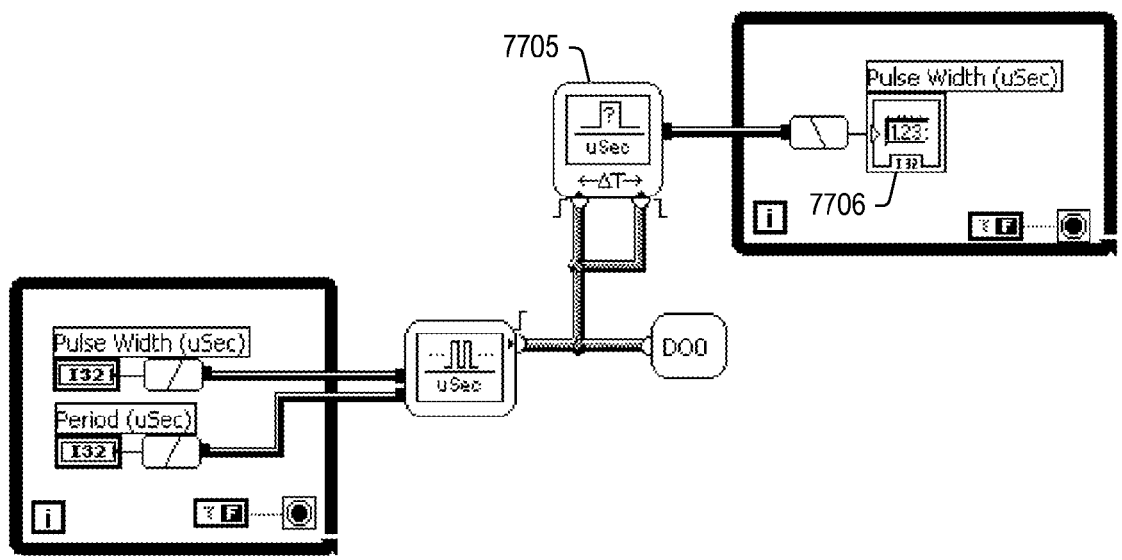
FIG. 77 illustrates a graphical program that generates a timing signal with user-controllable period and pulse width, measures with width of the pulses in the generated timing signal, and displays the measured pulse widths.

FIG. 77 illustrates a graphical program that allows the user to dynamically control the period and pulse width of a clock signal. The pulse widths of the clock signal are measured (by the counter primitive 7705) and displayed (via the indicator 7706). The clock signal is also exported to the DIO 0 pin.

It is noted that the asynchronous data terminals of the circuit-like primitives may be written to by cast nodes which are embedded in loop structures. In this fashion, dataflow code may have dynamic run time control of the parameters (corresponding to the asynchronous data terminals) of the circuit-like primitives.

Figure 78:
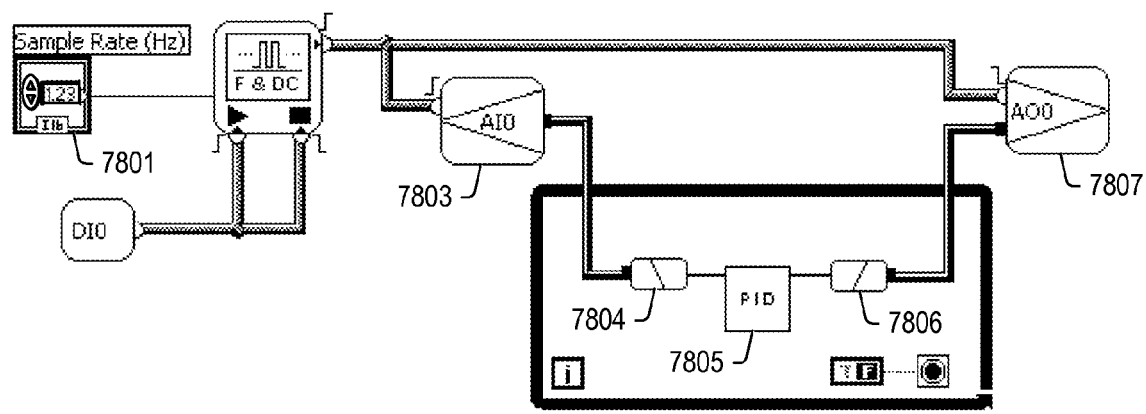
FIG. 78 illustrates a PID control circuit.

FIG. 78 illustrates a graphical program that implements a proportional-integral-derivative (PID) control loop. The node 7805 is dataflow code that implements a PID controller. The sample clock of the analog input primitive is signal at the DIO 0 pin. The sample rate is set by input control 7801. Sampled data from the analog input primitive 7803 is supplied to cast primitive 7804 through an asynchronous data wire. The cast primitive 7804 supplies the sampled data to the PID node 7805. The PID node 7805 supplies control data to the cast node 7806 through a dataflow wire. The cast node 7806 supplies the control data to the analog output primitive 7807 through an asynchronous data wire.

Figure 79:
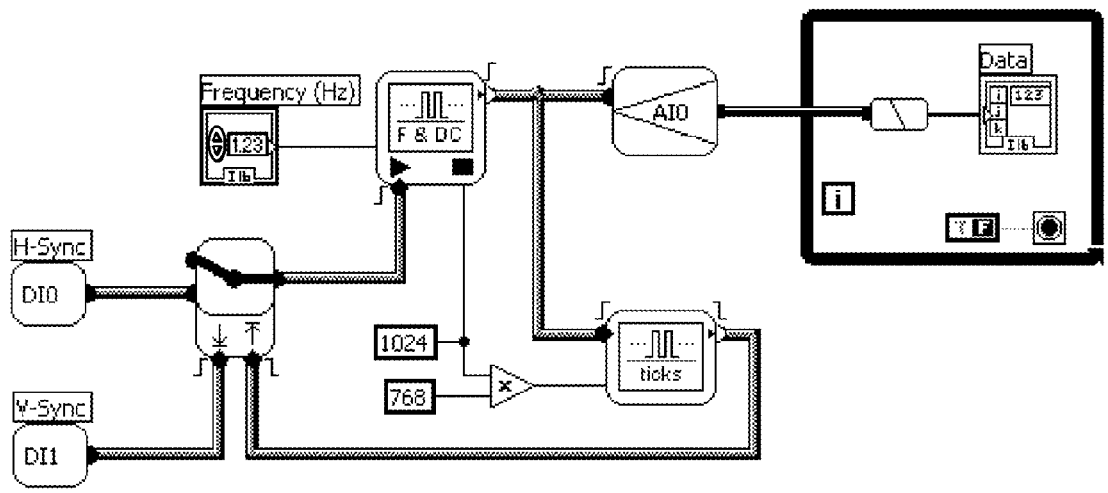
FIG. 79 illustrates a graphical program that implements a retriggerable two-stage trigger. A standard VGA signal is being sampled.

FIG. 79 illustrates a graphical program that implements a retriggerable two-stage trigger. A standard VGA signal is being sampled.

Figure 80:
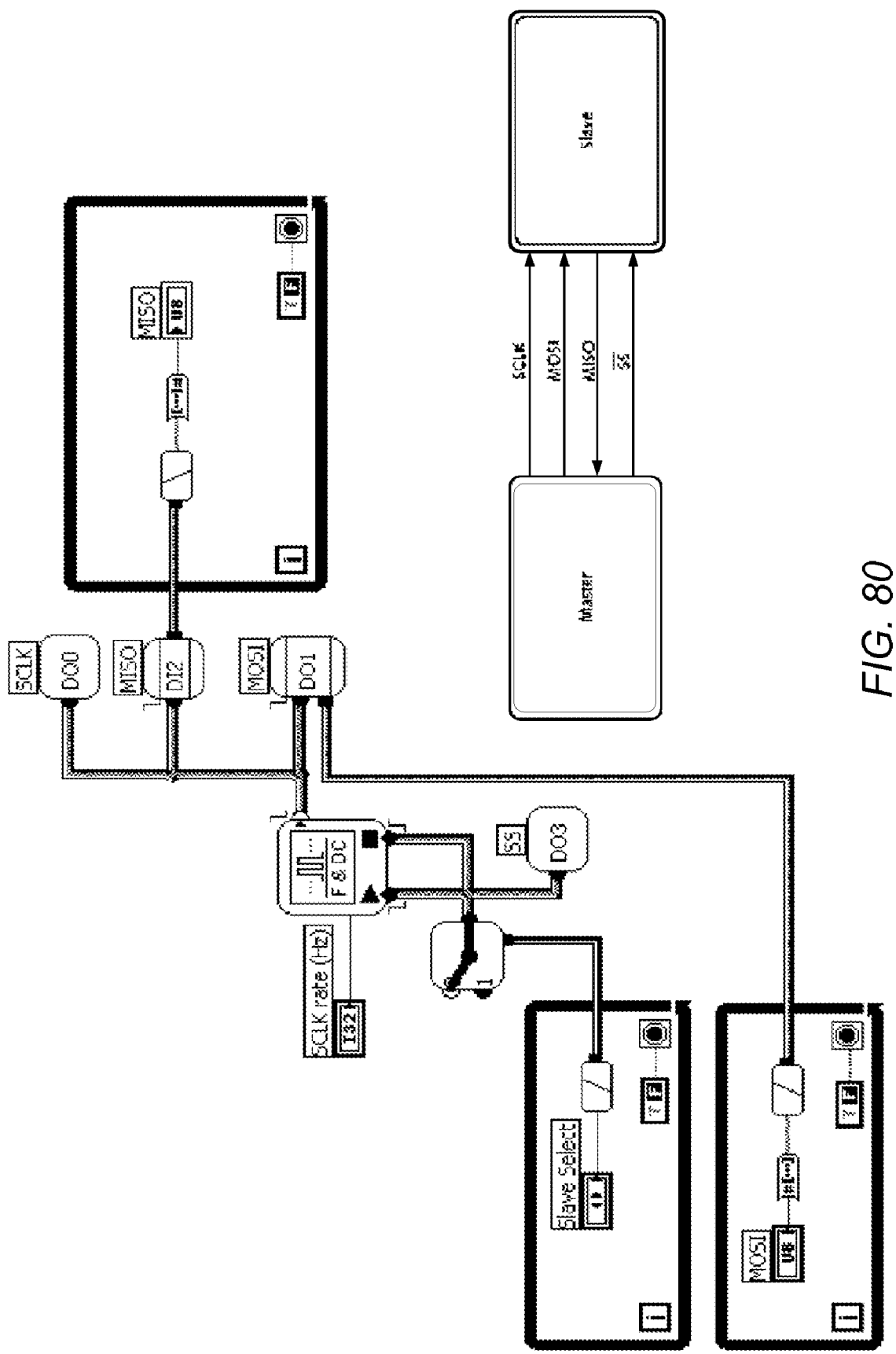
FIG. 80 illustrates an implementation of an SPI communication circuit.

FIG. 80 illustrates an implementation of an SPI communication circuit.

CONCLUSION

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium configured to store program instructions, wherein the program instructions are executable to implement:

receiving first user input selecting a first graphical primitive having an output terminal, wherein the first graphical primitive represents a first circuit entity that provides a first digital timing signal at the output terminal;

generating first program code for the first graphical primitive, wherein the first program code is configured as a first loop which writes values of the first digital timing signal to a first variable corresponding to the output terminal;

receiving second user input selecting a second graphical primitive having an input terminal, wherein the second graphical primitive represents a second circuit entity that receives a second digital timing signal;

generating second program code for the second graphical primitive, wherein the second program code is configured as a second loop;

receiving third user input connecting the output terminal of the first graphical primitive to the input terminal of the second graphical primitive with a first wire that does not impose a dataflow ordering dependency between the first program code and the second program code;

updating the second program code, in response to receiving said third user input, so that the second loop is configured to read the second digital timing signal from the first variable, wherein the second loop is configured to iterate independently of the first loop;

storing a program including the first program code and the second program code in a memory medium.

2. The memory medium of claim 1, wherein the first variable is a Boolean variable.

3. The memory medium of claim 1, wherein the program instructions are executable to further implement:

compiling the program to generate programming information for a programmable hardware element, where the programming information is useable to configure the programmable hardware element to implement functionality defined by the program.

4. The memory medium of claim 1, wherein the program instructions are executable to further implement:

compiling the program to generate executable code for one or more processors on a target hardware device.

5. The memory medium of claim 1, wherein the program instructions are executable to further implement:

receiving fourth user input connecting a data output terminal of the first graphical primitive or a data output terminal of the second graphical primitive to a data input terminal of a cast primitive with a second wire that does not impose a dataflow ordering dependency;

receiving fifth user input connecting an output of the cast primitive to a dataflow primitive with a third wire that does impose a dataflow ordering dependency;

generating third program code for the cast primitive, wherein the third program code is configured to read data from a buffer corresponding to the second wire and write the data to the third wire.

6. The memory medium of claim 5, wherein the buffer is a single-element buffer or a FIFO buffer.

7. The memory medium of claim 1, wherein the program instructions are executable to further implement:

receiving fourth user input connecting an output terminal of a dataflow primitive to the input terminal of a cast primitive with a second wire that imposes a dataflow ordering dependency;

receiving fifth user input connecting an output terminal of the cast primitive to a data input terminal of the first graphical primitive or a data input terminal of the second graphical primitive through a third wire that does not impose a dataflow ordering dependency;

generating third program code for the cast primitive, wherein the third program code is configured to receive data from the dataflow primitive and write the data to a buffer corresponding to the third wire.

8. The memory medium of claim 7, wherein the buffer is a single-element buffer or a FIFO buffer.

9. The memory medium of claim 1, wherein the second graphical primitive also includes an output terminal, wherein the second loop is also configured to use the second digital timing signal to determine a third digital signal and to write values of the third digital signal to a second variable corresponding to the output terminal of the second graphical primitive.

10. The memory medium of claim 1, wherein the first graphical primitive represents one of: a physical terminal of a hardware device, a clock generator circuit, a pulse generator circuit, a counter circuit, a multiplexer, or a demultiplexer.

11. The memory medium of claim 1, wherein the second graphical primitive represents one of: a physical terminal of a hardware device, a pulse generator circuit, a counter circuit, a digital input circuit, a digital output circuit, an analog trigger circuit, an analog input circuit, an analog output circuit, a multiplexer, a demultiplexer.

12. A computer-readable memory medium configured to store program instructions, wherein the program instructions are executable to implement:

receiving first user input selecting a first graphical primitive having a signal input terminal and a data output terminal, wherein the first graphical primitive represents a first circuit entity that receives a first digital timing signal at the signal input terminal and outputs data to the data output terminal;

generating first program code for the first graphical primitive, wherein the first program code is configured as a first loop which reads values of the first digital timing signal from a first variable corresponding to the signal input terminal;

receiving second user input connecting the data output terminal of the first graphical primitive to a data input terminal of a cast primitive with a first wire that does not impose a dataflow ordering dependency;

receiving third user input connecting an output of the cast primitive to a dataflow primitive with a second wire that does impose a dataflow ordering dependency;

generating second program code for the cast primitive, wherein the second program code is configured to read from a buffer corresponding to the first wire;

storing a program including the first program code, the second program code and program code corresponding to the dataflow primitive in a memory medium.

13. The memory medium of claim 12, wherein the first variable is a Boolean variable.

14. The memory medium of claim 12, wherein the program instructions are executable to further implement:
compiling the program to generate programming information for a programmable hardware element, where the programming information is useable to configure the programmable hardware element to implement functionality defined by the program.

15. The memory medium of claim 12, wherein the program instructions are executable to further implement:
compiling the program to generate executable code for one or more processors on a target hardware device.

16. The memory medium of claim 12, wherein the buffer is a single-element buffer or a FIFO buffer.

17. The memory medium of claim 12, wherein the first graphical primitive represents an analog-to-digital (A/D) conversion circuit that captures samples of an analog signal, wherein the first digital timing signal is a conversion clock for the A/D conversion circuit, wherein the data outputted to the data output terminal are the samples of the analog signal.

18. The memory medium of claim 12, wherein the first graphical primitive represents a digital input port that captures samples from a digital bus, wherein the first digital timing signal is a clock for the digital input port, wherein the data outputted to the data output terminal are the samples from the digital bus.

19. The memory medium of claim 12, wherein the first graphical primitive represents an edge counter circuit configured to count edges of the first digital timing signal, wherein the data outputted to the data output terminal are count values.

20. The memory medium of claim 12, wherein the first graphical primitive represents an elapsed time counter configured to count a number of ticks of a base clock intervening between an active edge of a start trigger signal and an active edge of a stop trigger signal, wherein the first digital timing signal is used as the start trigger signal, the stop trigger signal or both.

21. A computer-readable memory medium configured to store program instructions, wherein the program instructions are executable to implement:
receiving first user input selecting a first graphical primitive having a signal output terminal and a data input terminal, wherein the first graphical primitive represents a first circuit entity that provides a first digital timing signal at the signal output terminal and receives data at the data input terminal;

generating first program code for the first graphical primitive, wherein the first program code is configured as a first loop which write values of the first digital timing signal to a first variable corresponding to the signal output terminal;

receiving second user input connecting an output terminal of a dataflow primitive to the input terminal of a cast primitive with a first wire that imposes a dataflow ordering dependency;

receiving third user input connecting a data output terminal of the cast primitive to the data input terminal of the first graphical primitive with a second wire that does not impose a dataflow ordering dependency;

generating second program code for the cast primitive, wherein the second program code is configured to receive data from the dataflow node and write the data to a buffer corresponding to the second wire;

storing a program including the first program code, the second program code and third program code corresponding to the dataflow primitive in a memory medium.

22. The memory medium of claim 21, wherein the first variable is a Boolean variable.

23. The memory medium of claim 21, wherein the program instructions are executable to further implement:
compiling the program to generate programming information for a programmable hardware element, where the programming information is useable to configure the programmable hardware element to implement functionality defined by the program.

24. The memory medium of claim 21, wherein the program instructions are executable to further implement:
compiling the program to generate executable code for one or more processors on a target hardware device.

25. The memory medium of claim 21, wherein the buffer is a single-element buffer or a FIFO buffer.

26. The memory medium of claim 21, wherein the first graphical primitive represents a pulse generator circuit, wherein the first digital timing signal is an output of the pulse generator circuit, wherein the data input terminal of the first graphical primitive is a pulse width terminal, a period terminal, a pulses-after-stop terminal, or a delay-after-start terminal.

27. The memory medium of claim 21, wherein the first graphical primitive represents an analog trigger circuit for an analog input signal, wherein the data input terminal of the first graphical primitive defines a trigger parameter for the analog trigger circuit.

28. The memory medium of claim 21, wherein the first graphical primitive represents a multiplexer, wherein the first digital timing signal is the output of the multiplexer, wherein the data input terminal is a source selection terminal for the multiplexer.

29. A computer system comprising:
a memory configured to store program instructions;
a processor configured to read and execute the program instructions from the memory, wherein the program instructions are executable by the processor to implement:
receiving first user input selecting a first graphical primitive having an output terminal, wherein the first graphical primitive represents a first circuit entity that provides a first digital timing signal at the output terminal;

generating first program code for the first graphical primitive, wherein the first program code is configured as a first loop which writes values of the first digital timing signal to a first variable corresponding to the output terminal;

receiving second user input selecting a second graphical primitive having an input terminal, wherein the second graphical primitive represents a second circuit entity that receives a second digital timing signal;

generating second program code for the second graphical primitive, wherein the second program code is configured as a second loop;

receiving third user input connecting the output terminal of the first graphical primitive to the input terminal of the second graphical primitive with a first wire that does not impose a dataflow ordering dependency between the first program code and the second program code;

updating the second program code, in response to receiving said third user input, so that the second loop is configured to read the second digital timing signal from the first variable, wherein the second loop is configured to iterate independently of the first loop;

storing a program including the first program code and the second program code in a memory medium.

30. The computer system of claim 29, wherein the program instructions are executable to further implement:

compiling the program to generate programming information for a programmable hardware element, where the programming information is useable to configure the programmable hardware element to implement functionality defined by the program.

31. The computer system of claim 29, wherein the program instructions are executable to further implement:

compiling the program to generate executable code for one or more processors on a target hardware device.

* * * * *